US012655865B2

(12) United States Patent
Bae et al.

(10) Patent No.: US 12,655,865 B2
(45) Date of Patent: Jun. 16, 2026

(54) FOLDABLE DEVICE

(71) Applicant: SAMSUNG ELECTRONICS CO., LTD., Suwon-si (KR)

(72) Inventors: Yu-dong Bae, Suwon-si (KR); Ho-seong Seo, Suwon-si (KR); Wataru Kaihotsu, Seoul (KR); Toshikazu Takayanagi, Suwon-si (KR); Jin-hyoung Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/777,031

(22) Filed: Jul. 18, 2024

(65) Prior Publication Data

US 2024/0369098 A1     Nov. 7, 2024

Related U.S. Application Data

(63) Continuation of application No. 18/295,034, filed on Apr. 3, 2023, now Pat. No. 12,049,919, which is a
(Continued)

(30) Foreign Application Priority Data

Jun. 22, 2015     (KR) ......................... 10-2015-0088718
Jan. 6, 2016     (KR) ......................... 10-2016-0001703

(51) Int. Cl.
*F16C 11/04*          (2006.01)
*G06F 1/16*          (2006.01)
(52) U.S. Cl.
CPC ............ *F16C 11/04* (2013.01); *G06F 1/1616* (2013.01); *G06F 1/1652* (2013.01); *G06F 1/1681* (2013.01)

(58) Field of Classification Search
CPC ...... F16C 11/04; G06F 1/1616; G06F 1/1652; G06F 1/1681; E05D 3/06
(Continued)

(56)          References Cited

U.S. PATENT DOCUMENTS 3,961,664 A * 6/1976 Ward ..................... B22C 21/00
                                                            164/343
7,446,757 B2 11/2008 Mochizuki et al.
(Continued)

FOREIGN PATENT DOCUMENTS

CN          101202778 A     6/2008
CN          103228114 A     7/2013
(Continued)

OTHER PUBLICATIONS

Communication dated Aug. 27, 2020, issued by the Korean Intellectual Property Office in corresponding Korean Application No. 10-2019-0044485.
(Continued)

*Primary Examiner* — Mark Edwards
(74) *Attorney, Agent, or Firm* — Sughrue Mion, PLLC

(57)          ABSTRACT

A foldable device includes: a flexible display including a first portion, a second portion, and a third portion disposed between the first portion and the second portion; and a body including a first support portion which supports the first portion of the flexible display, a second support portion which supports the second portion of the flexible display, and a third support portion which supports the third portion of the flexible display, wherein the third support portion includes a first support wing rotatably connected to the first support portion and a second support wing rotatably connected to the second support portion.

7 Claims, 55 Drawing Sheets

Related U.S. Application Data continuation of application No. 17/589,144, filed on Jan. 31, 2022, now Pat. No. 11,624,400, which is a continuation of application No. 17/113,947, filed on Dec. 7, 2020, now Pat. No. 11,268,565, which is a continuation of application No. 16/406,554, filed on May 8, 2019, now Pat. No. 10,883,534, which is a continuation of application No. 15/399,410, filed on Jan. 5, 2017, now Pat. No. 10,365,691, which is a continuation-in-part of application No. 14/952,417, filed on Nov. 25, 2015, now Pat. No. 10,310,551.

(60) Provisional application No. 62/145,135, filed on Apr. 9, 2015.

(58) Field of Classification Search
USPC ........................................................ 345/173
See application file for complete search history.

(56) References Cited

U.S. PATENT DOCUMENTS

| | | | |
|---|---|---|---|
| 7,478,458 | B2 | 1/2009 | Tajima |
| 8,228,667 | B2 | 7/2012 | Ma |
| 8,804,324 | B2 | 8/2014 | Bohn et al. |
| 8,843,183 | B2 | 9/2014 | Griffin et al. |
| 8,908,365 | B2 | 12/2014 | Walters et al. |
| 8,938,856 | B1 | 1/2015 | Shin et al. |
| 8,971,031 | B2 | 3/2015 | Mok et al. |
| 9,009,919 | B1 * | 4/2015 | Chiang ................. G06F 1/1681 |
| | | | 16/303 |
| 9,013,864 | B2 | 4/2015 | Griffin et al. |
| 9,164,547 | B1 | 10/2015 | Kwon et al. |
| 9,204,565 | B1 | 12/2015 | Lee et al. |
| 9,348,450 | B1 * | 5/2016 | Kim .................... H04M 1/0268 |
| 9,557,771 | B2 | 1/2017 | Park et al. |
| 2004/0052044 | A1 | 3/2004 | Mochizuki et al. |
| 2006/0218750 | A1 | 10/2006 | Tajima |
| 2012/0044620 | A1 | 2/2012 | Song et al. |
| 2012/0149438 | A1 | 6/2012 | Kwon |
| 2012/0243207 | A1 | 9/2012 | Wang et al. |
| 2012/0264489 | A1 | 10/2012 | Choi et al. |
| 2012/0314399 | A1 | 12/2012 | Bohn et al. |
| 2013/0021762 | A1 | 1/2013 | van Dijk et al. |
| 2013/0037228 | A1 | 2/2013 | Verschoor et al. |
| 2013/0314611 | A1 | 11/2013 | Okutsu et al. |
| 2014/0042293 | A1 * | 2/2014 | Mok ...................... G06F 1/1679 |
| | | | 248/682 |
| 2014/0111954 | A1 | 4/2014 | Lee et al. |
| 2014/0126133 | A1 * | 5/2014 | Griffin .................. G06F 1/1652 |
| | | | 312/326 |
| 2014/0133076 | A1 * | 5/2014 | Verschoor ............. G06F 1/1652 |
| | | | 361/679.3 |
| 2014/0328041 | A1 * | 11/2014 | Rothkopf ............ H04M 1/0216 |
| | | | 361/807 |
| 2014/0355181 | A1 | 12/2014 | Jung et al. |
| 2014/0355195 | A1 | 12/2014 | Kee et al. |
| 2015/0013107 | A1 | 1/2015 | Shin et al. |
| 2015/0248149 | A1 * | 9/2015 | Yamazaki ............. G06F 1/1641 |
| | | | 361/679.27 |
| 2015/0366089 | A1 * | 12/2015 | Park .................... H04M 1/0268 |
| | | | 361/679.01 |
| 2016/0259379 | A1 * | 9/2016 | Uchiyama ............. G06F 1/1681 |

FOREIGN PATENT DOCUMENTS

| | | | |
|---|---|---|---|
| CN | 103294113 | A | 9/2013 |
| CN | 103608745 | A | 2/2014 |
| EP | 2696257 | A2 | 2/2014 |
| JP | 2004-109382 | A | 4/2004 |
| KR | 10-2006-0106697 | A | 10/2006 |
| KR | 10-2011-0002729 | A | 1/2011 |
| KR | 10-2012-0016873 | A | 2/2012 |
| KR | 10-1148397 | B1 | 5/2012 |
| KR | 10-2014-0050504 | | 4/2014 |
| KR | 10-1442622 | B1 | 9/2014 |
| KR | 10-2015-0006633 | A | 1/2015 |
| KR | 10-2015-0037383 | A | 4/2015 |

OTHER PUBLICATIONS

Communication dated Aug. 28, 2020, issued by the Indian Patent Office in counterpart Application No. 201717039119.

Communication dated Feb. 16, 2018, from the European Patent Office in counterpart European Application No. 16776955.3.

Communication dated Jan. 15, 2019, issued by the Korean Intellectual Property Office in counterpart Korean Application No. 10-2017-0080341.

Communication dated Jan. 4, 2023, issued by the India Intellectual Property Office in Indian Patent Application No. 201717039119.

Communication dated Jul. 27, 2016, issued by the Korean Intellectual Property Office in counterpart Korean application No. 10-2015-0088718.

Communication dated Jul. 30, 2019 issued by the European Intellectual Property Office in counterpart European Application No. 16 776 955.3.

Communication dated Jul. 4, 2023, issued by the European Patent Office for European Patent Application No. 21183044.3.

Communication dated Mar. 20, 2020, issued by the Korean Intellectual Property Office in counterpart Korean Application No. 10-2016-0001703.

Communication dated Nov. 28, 2018, issued by the State Intellectual Property Office of P.R. China in counterpart Chinese Application No. 201680000502.1.

Communication dated Nov. 30, 2016, issued by the Korean Intellectual Property Office in counterpart Korean application No. 10-2015-0088718.

Communication dated Oct. 31, 2022, issued by the China National Intellectual Property Administration in counterpart Chinese Application No. 201910791170.9.

Communication dated Sep. 16, 2020, from the European Patent Office in counterpart European Application No. 16776955.3.

Communication dated Sep. 28, 2021 issued by the European Patent Office in application No. 21183044.3.

Communication issued January Jul. 19, 2018, issued by the Korean Intellectual Property Office in counterpart Korean Patent Application No. 10-2017-0080341.

International Search Report (PCT/ISA/210) dated Jul. 29, 2016 issued by the International Searching Authority in counterpart International Application No. PCT/KR2016/003791.

Written Opinion (PCT/ISA/237) dated Jul. 29, 2016 issued by the International Searching Authority in counterpart International Application No. PCT/KR2016/003791.

Communication dated Feb. 25, 2025, issued by the European Patent Office in counterpart European Application No. 21183044.3.

* cited by examiner

FOLDABLE DEVICE

CROSS-REFERENCE TO THE RELATED APPLICATIONS

This application is a continuation of U.S. application Ser. No. 18/295,034, filed on Apr. 3, 2023, which is a continuation of U.S. application Ser. No. 17/589,144, filed on Jan. 31, 2022, now U.S. Pat. No. 11,624,400, issued on Apr. 11, 2023, which is a continuation of U.S. application Ser. No. 17/113,947, filed on Dec. 7, 2020, now U.S. Pat. No. 11,268,565, issued on Mar. 8, 2022, which is a continuation of U.S. application Ser. No. 16/406,554, filed on May 8, 2019, now U.S. Pat. No. 10,883,534, issued on Jan. 5, 2021; which is a continuation of U.S. application Ser. No. 15/399, 410, filed on Jan. 5, 2017, now U.S. Pat. No. 10,365,691, issued on Jul. 30, 2019 in the U.S. Patent and Trademark Office, which is a continuation-in-part of U.S. application Ser. No. 14/952,417, filed on Nov. 25, 2015, now U.S. Pat. No. 10,310,551, issued on Jun. 4, 2019 in the U.S. Patent and Trademark Office, and which claims priority from Korean Patent Application No. 10-2015-0088718, filed on Jun. 22, 2015, in the Korean Intellectual Property Office, Korean Patent Application No. 10-2016-0001703, filed on Jan. 6, 2016, in the Korean Intellectual Property Office, and which claims the benefit of U.S. Provisional Application No. 62/145,135, filed on Apr. 9, 2015, in the U.S. Patent and Trademark Office, the disclosures of which are herein incorporated by reference in their entireties.

BACKGROUND

1. Field

Apparatuses and methods consistent with exemplary embodiments relate to a foldable device including a flexible display.

2. Description of the Related Art

A portable foldable device (hereinafter, referred to as a mobile device) such as a communication terminal, a game console, a multimedia device, a portable computer, or a photographing apparatus generally includes a display device that displays image information and an input unit such as a keypad. Many mobile devices have a foldable structure that may be folded into a smaller size in order to improve the portability thereof. In such mobile devices, two bodies are connected to each other via the foldable structure. Since a related art display device is not foldable, the display device may be arranged on one of two bodies. Hence, it may difficult to implement a large display device to a mobile device having a foldable structure.

Along with the development of a flexible and bendable display device, there have been attempts to implement the display device to a mobile device having a foldable structure. In this case, since the flexible display may be arranged over two bodies to cross over the foldable structure, a large screen may be provided. However, although the flexible display may be bent, if the flexible display is sharply bent, the flexible display may be damaged. Hence, a curved portion having a predetermined curvature is formed at the center of the flexible display when the flexible display folds.

Therefore, the foldable device using a flexible display may need to provide a structure that accommodates a curved portion of the flexible display while the foldable device is being folded, and may need to support the curved portion of the flexible display to be flat while the foldable device is being unfolded.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments include a foldable device that has a small size and is portable.

One or more exemplary embodiments include a foldable device on which a flexible display is supported flat when the foldable device unfolds.

One or more exemplary embodiments include a foldable device that may reduce distortion of a screen when the foldable device unfolds at an obtuse angle.

One or more exemplary embodiments provide a flexible display that may withstand pressure or damage occurring when the flexible display of the foldable device is folded.

According to an aspect of an exemplary embodiment, there is provided a foldable device including: a hinge shaft that includes first and second hinge shafts; a flexible display that includes a first portion, a second portion, and a third portion between the first portion and the second portion; a first body that includes a first fixed portion to which the first portion is fixed, rotates around the first hinge shaft, and moves between a folding position and an unfolding position, and is movable to or from the first hinge shaft; a first support portion that is provided on the first body and moves between a support position and a receiving position, the support position enabling the first support portion to partially support the third portion, the receiving position enabling the third portion to be bent to form a curved receiving space in the first body; and a restriction unit configured to maintain the first support portion at the support position when the first body is in a position between the unfolding position and a start point of the receiving position and allow the first support portion to move to the receiving position when the first body folds beyond the receiving start position.

The foldable device may further include: a second body that includes a second fixed portion to which the second portion is fixed, rotates around the second hinge shaft, moves between a folding position and an unfolding position, and is movable to or from the second hinge shaft; and a second support portion that is provided on the second body and moves between a support position and a receiving position, the support position enabling the second support portion to partially support the third portion, the receiving position enabling the third portion to be bent to form a curved receiving space in the second body. The restriction unit may be configured to maintain the second support portion at the support position when the second body is in a position between the unfolding position and a start point of the receiving position and allow the second support portion to move to the receiving position when the second body folds beyond the receiving start position. The support position enabling the second support portion to partially support the third portion may correspond to the support position enabling the first support portion to partially support the third portion. The receiving position enabling the third portion to be bent to form a curved receiving space in the first body may correspond to the receiving position enabling the third portion to be bent to form a curved receiving space in the second body.

At the folding position, the first portion and the second portion may be located closer to each other than at the unfolding position, and face each other. The third portion may be bent from the first and second portions into the first and second bodies and received in the receiving space in a droplet shape.

The foldable device may further include a first gear portion and a second gear portion that are respectively provided on the first and second hinge shafts and are engaged with each other so that the first and second bodies synchronously rotate together.

The foldable device may further include a locking unit configured to lock the first body and the second body at least one inclined position between the unfolding position and the folding position. An opening angle between the first body and the second body at the receiving start position may be equal to or less than an opening angle between the first body and the second body at the at least one inclined position.

The restriction unit may include: a first support arm and a second support arm that respectively support the first support portion and the second support portion and respectively pivot about fixed positions with respect to the first hinge shaft and the second hinge shaft; a first guide pin and a second guide pin that are respectively provided on the first support arm and the second support arm; and a first guide slot and a second guide slot that respectively rotate around the first hinge shaft and the second hinge shaft along with the first body and the second body, respectively guide the first guide pin and the second guide pin, and include support parts that maintain the first support arm and the second support arm at a position at which the first support arm and the second support arm support the first support portion and the second support portion and receiving parts that allow the first support arm and the second support arm to move away from the first support portion and the second support portion so that the first support portion and second support portion are allowed to move to the receiving position.

Each of the first support arm and the second support arm may include: a first link arm that pivots about the fixed position; and a second link arm having one end portion that is pivotably connected to the first link arm by the first guide pin or the second guide pin and another end portion that is pivotably connected to the first support portion or the second support portion and supports the first support portion or the second support portion.

The restriction unit may include: a rotating cam that supports the first support portion and the second support portion and includes a first cam path corresponding to the support position and a second cam path corresponding to the receiving position; a pinion gear that is connected to the rotating cam; a rack gear that is engaged with the pinion gear; a pulley; and a connection member having one end portion that is connected to a fixed position with respect to the hinge shaft and another end portion that is connected through the pulley to the rack gear and moves the rack gear when the first body and the second body fold or unfold.

The connection member may have a strip shape having bending elasticity.

The connection member may include a wire, and the foldable device may further include a return spring that is connected to the rack gear and applies a tensile force to the wire.

The foldable device may further include a path difference compensating unit configured to restrict an amount of movement of at least one of the first body and the second body to or from the hinge shaft, and compensate for a path difference between the flexible display and the first body and a path difference between the flexible device and the second body while the foldable device folds or unfolds.

The path difference compensating unit may be further configured to enable at least one of the first body and the second body to move away from the hinge shaft during a period when the foldable device moves from the unfolding position to a changing position and enable at least one of the first body and the second body to move toward the hinge shaft during a period when the foldable device moves from the changing position to the folding position.

An opening angle between the first and second bodies at the changing position may be equal to an opening angle between the first and second bodies at the receiving start position.

The foldable device may further include: a first hinge unit that is pivotably connected to the first hinge shaft and is connected to the first body; and a second hinge unit that is pivotably connected to the second hinge shaft and is connected to the second body. The first body and the second body may be respectively connected to the first hinge unit and the second hinge unit so that the first body and the second body respectively move to or from the first hinge shaft and the second hinge shaft.

The first hinge unit and the second hinge unit may respectively include: a first hinge frame and a second hinge frame that are respectively rotatably connected to the first hinge shaft and the second hinge shaft; and a first movable frame and a second movable frame that are respectively supported on the first hinge frame and the second hinge frame so that the first movable frame and the second movable frame respectively move to or from the first hinge shaft and the second hinge shaft. The first body and the second body are respectively coupled to the first movable frame and the second movable frame.

The path difference compensating unit may include: a first restriction pin and a second restriction pin that have fixed positions with respect to the first hinge shaft and the second hinge shaft; and restriction slots into which the first restriction pin and the second restriction pin are respectively inserted and that respectively restrict amounts of movement of the first body and the second body according to rotation angles of the first body and the second body while the restriction slots pivot along with the first body and the second body.

According to an aspect of another exemplary embodiment, there is provided a foldable device including: a flexible display that includes a first portion, a second portion, and a third portion between the first portion and the second portion; a first body and a second body to which the first portion and the second portion are respectively fixed, and that move between an unfolding position and a folding position at which the first portion and the second portion are located closer to each other that at the unfolding position and face each other and the third portion is bent from the first portion and the second portion into the first body and the second body and is received in a receiving space in a droplet shape; and a first support portion and a second support portion that are respectively provided on the first body and the second body to support the third portion and are maintained at a support position at which the first support portion and the second support portion support the third portion when the first body and the second body are in a position between the unfolding position and a starting point of a receiving position and move to the receiving position at which the first support portion and the second support portion move away from the third portion to form the receiving space when the first body and the second body fold beyond the receiving start position.

The first body and the second body may respectively rotate about a first hinge shaft and a second hinge shaft and move between the unfolding position and the folding position. The foldable device may further include a first gear portion and a second gear portion that are respectively provided on the first hinge shaft and the second hinge shaft and are engaged with each other so that the first body and the second body synchronously rotate together.

The foldable device may further include a locking unit configured to lock the first body and the second body at least one inclined position between the unfolding position and the folding position. An opening angle between the first body and the second body at the starting point of the receiving position may be equal to or less than an opening angle between the first body and the second body at the at least one inclined position.

The first body and the second body may be respectively movable to or from the first hinge shaft and the second hinge shaft.

The foldable device may further include a path difference compensating unit configured to restrict an amount of movement of at least one of the first body and the second body to or from the first hinge shaft and the second hinge shaft, and compensate for a path difference between the flexible display and the first body and a path difference between the flexible display and the second body while the foldable device folds or unfolds.

According to an aspect of another exemplary embodiment, there is provided a foldable device including: a hinge unit including a hinge shaft, a restriction slot, and a restriction pin inserted into the restriction slot; and a body configured to be move between a folding position and a unfolding position and connected to the hinge unit through the restriction pin; wherein a position of the restriction pin changes along the restriction slot while the body moves between the folding position and the unfolding position, wherein the body moves away from the hinge shaft when the body moves from the unfolding position to the folding position.

According to an aspect of an exemplary embodiment, there is provided a foldable device including: a flexible display including a first portion, a second portion, and a third portion disposed between the first portion and the second portion; a body including a first support portion which supports the first portion of the flexible display, a second support portion which supports the second portion of the flexible display, and a third support portion which supports the third portion of the flexible display; a hinge including a first rotation axis which connects the first support portion to the third support portion, and a second rotation axis which connects the second support portion to the third support portion, the first rotation axis and the second rotation axis allowing the first support portion and the second support portion to rotate with respect to the third support portion when the flexible display changes from an open state to a closed state; and a slot hole which is disposed on at least one of the first support portion and the third support portion, and at least one of the second support portion and the third support portion, which is rotatably coupled with the first rotation axis and the second rotation axis, and which moves the first rotation axis and the second rotation axis when the first support portion and the second support portion rotate with respect to the third support portion.

The third support portion may include a first support wing rotatably connected to the first support portion and a second support wing rotatably connected to the second support portion.

The first rotation axis may be disposed on both sides of the first support wing, the second rotation axis may be disposed on both sides of the second support wing, and the slot hole may include a first slot hole disposed on the first support portion to receive the first rotation axis of the first support wing and a second slot hole disposed on the second support portion to receive the second rotation axis of the second support wing.

The first and second slot holes may have a shape of a straight line.

The slot hole may include a first slot hole disposed on both sides of the first support wing and a second slot hole disposed on both sides of the second support wing. The first rotation axis may be disposed on the first support portion and inserted to the first slot hole of the first support wing, and the second rotation axis may be disposed on the second support portion and inserted to the second slot hole of the second support wing.

The first and second slot holes may have a curved shape.

The slot hole may include a first slot hole disposed on both sides of the first support wing, a second slot hole disposed on both sides of the second support wing, a third slot hole disposed on the first support portion which faces the first slot hole of the first support wing, and a fourth slot hole disposed on the second support portion which faces the second slot hole of the second support wing. The first rotation axis may be inserted to the first slot hole of the first support wing and the third slot hole of the first support portion, and the second rotation axis may be inserted to the second slot hole of the second support wing and the fourth slot hole of the second support portion.

A fixing member which fixes a third portion of the flexible display may be fixed on an upper surface of the first and second support wings.

The fixing member may include a double-sided tape and an adhesive.

The foldable device may further include: a first reinforcing plate that covers a part of the first support portion and the third support portion, and supports a part of the flexible display; and a second reinforcing plate that covers a part of the second support portion and the third support portion, and supports a part of the flexible display.

The first and second reinforcing plates may be fixed on a rear surface of the flexible display.

The foldable device may further include: first and second guide slots and first and second support arms which allow the first and second support wings to move, according to movement of the first and second support portions, between a support position which supports that the third portion of the flexible display is in the same plane as the first and second portions, and a receiving position which forms a receiving space to receive a curved third portion of the flexible display between the first and second support portions.

The first and second guide slots may move along with the first and second support portions and the first and second support arms may move by the first and second guide slots.

The first and second support arms may include first and second guide pins which pass through the first and second guide slots and are extended to a bottom of the first and second support wings.

The third support portion may further include a central support member which supports a central portion of the third portion of the flexible display.

According to an aspect of another exemplary embodiment, there is provided a foldable device including: a flexible display including a first portion, a second portion, and a third portion disposed between the first portion and the second portion; a body including a first support portion which supports the first portion of the flexible display, a second support portion which supports the second portion of the flexible display, and a third support portion which supports the third portion of the flexible display; a hinge including a first rotation axis which connects the first support portion to the third support portion, a second rotation axis which connects the second support portion to the third support portion, the first rotation axis and the second rotation axis allowing the first support portion and the second support portion to rotate with respect to the third support portion when the flexible display changes from an open state to a closed state; and a movement restriction member that moves a part of the third portion of the flexible display along with the third support portion when the flexible display changes from the open state to the closed state.

The third support portion may include a first support wing rotatably connected to the first support portion and a second support wing rotatably connected to the second support portion.

The movement restriction member may include: a plurality of slot grooves disposed on upper surfaces of each of the first and second support wings; and a sliding gel which is received in the plurality of slot grooves and slidably moves the third portion of the flexible display while the third portion is attached to upper surfaces of the first and second support wings.

The sliding gel may include a lubricating oil and grease.

The movement restriction member may include: a first stiffener which is fixed on a rear side of a part of the third portion of the flexible display corresponding to the first support wing; and a second stiffener which is fixed on a rear side of a part of the third portion of the flexible display corresponding to the second support wing.

According to an aspect of another exemplary embodiment, there is provided a foldable device including: a flexible display including a first portion and a second portion which face each other when the flexible display is folded, and a third portion disposed between the first portion and the second portion; a support wing disposed below and fixed to the third portion of the flexible display; and a support plate that is integrated with the support wing, is disposed between the first portion and the third portion, and has a slot hole to which a rotation axis is inserted, wherein when the flexible display is folded, the slot hole moves toward the first portion along with the rotation axis.

BRIEF DESCRIPTION OF THE DRAWINGS

The above and/or other aspects will be more apparent by describing certain exemplary embodiments, taken with reference to the accompanying drawings, in which.

DETAILED DESCRIPTION

Figure 1:
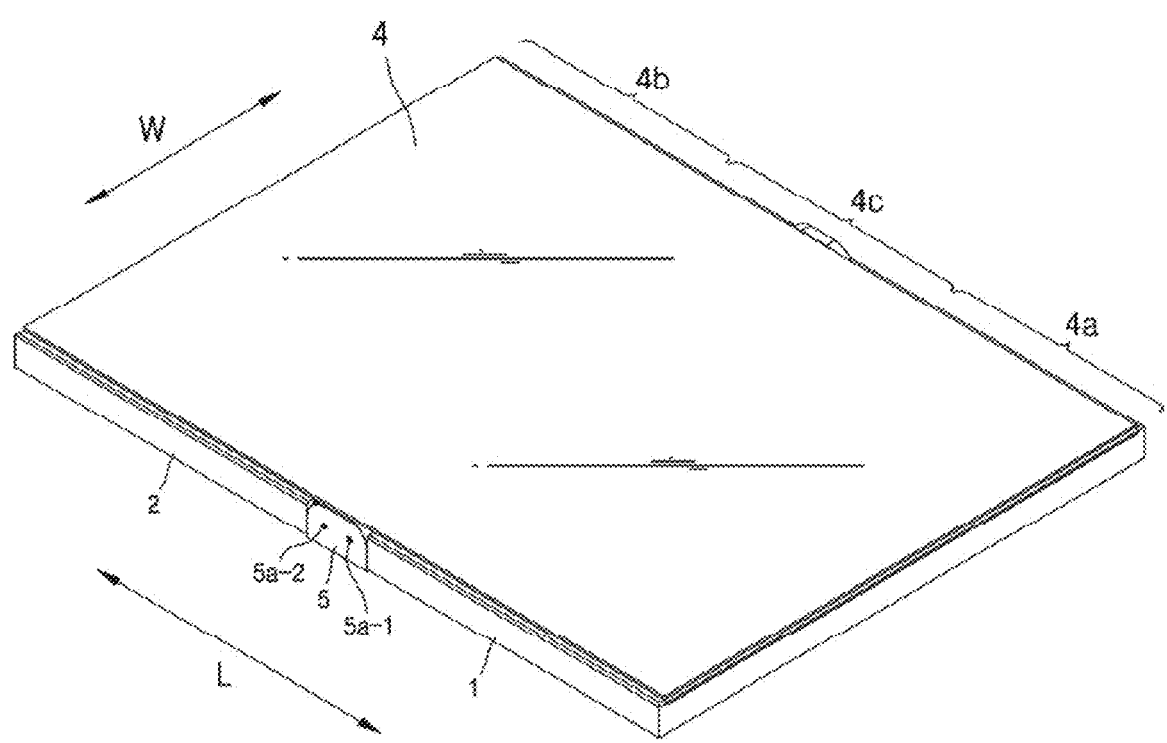
FIG. 1 is a perspective view illustrating an outer appearance of a foldable device according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of" when preceding a list of elements, modify the entire list of elements and do not modify the individual elements of the list.

Figure 2:
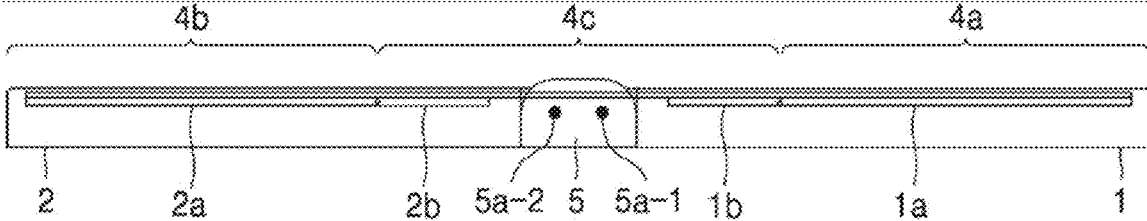
FIG. 2 is a side view illustrating an unfolding state of the foldable device of FIG. 1 according to an exemplary embodiment.
Figure 3:
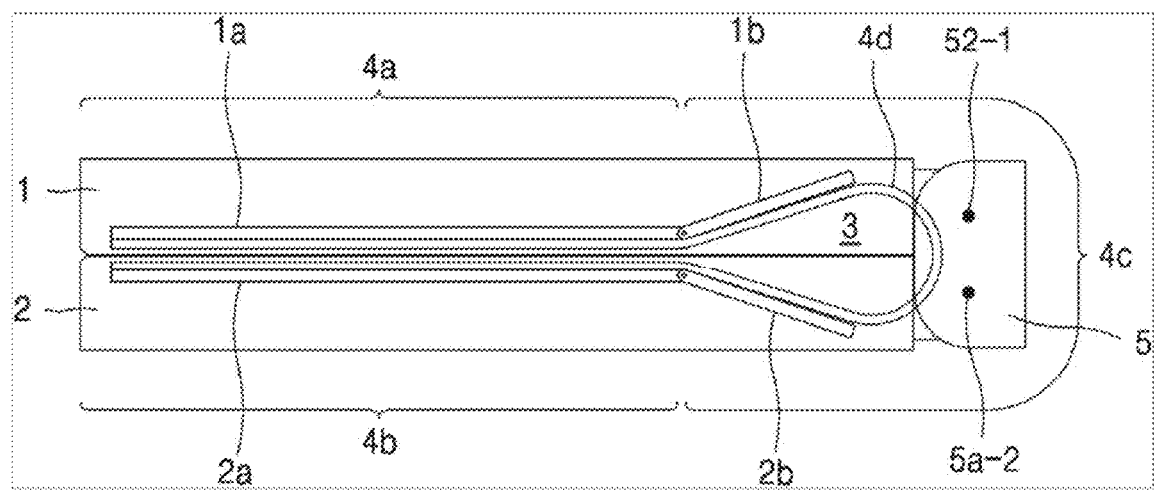
FIG. 3 is a side view illustrating a folding state of the foldable device of FIG. 1 according to an exemplary embodiment.

FIG. 1 is a perspective view illustrating an outer appearance of a foldable device according to an exemplary embodiment. FIG. 2 is a side view illustrating an unfolding state of the foldable device of FIG. 1 according to an exemplary embodiment. FIG. 3 is a side view illustrating a folding state of the foldable device of FIG. 1 according to an exemplary embodiment.

Referring to FIGS. 1 through 3, the foldable device may include first and second bodies 1 and 2 and a flexible display 4. The first and second bodies 1 and 2 are connected to each other and may move between an unfolding position of FIG. 2 and a folding position of FIG. 3.

Figure 4:
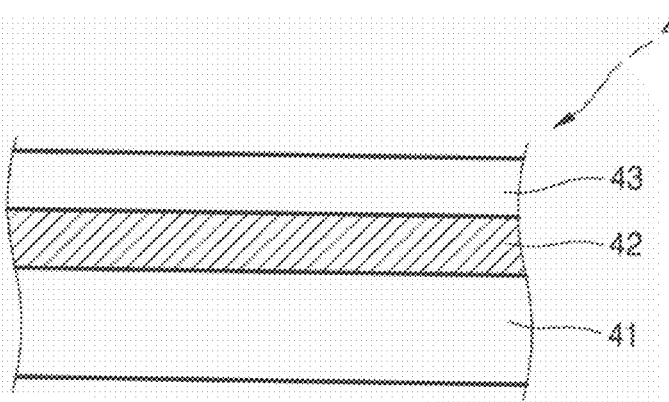
FIG. 4 is a cross-sectional view of a flexible display according to an exemplary embodiment.

FIG. 4 is a cross-sectional view of the flexible display 4 according to an exemplary embodiment. Referring to FIG. 4, the flexible display 4 may include a flexible display panel 41 that displays an image and a transparent protective panel 43 that is disposed on the flexible display panel 41. An additional panel or substrate may be disposed between the transparent protective panel 43 and the flexible display panel 41. The flexible display panel 41 may be, for example, an organic light-emitting diode (OLED) panel. When the flexible display panel 41 is an OLED panel, an organic emission layer may be disposed between an upper substrate and a lower substrate. A polarization plate may be disposed on the upper substrate from which light is emitted. Also, the flexible display 4 may further include a touch panel 42 as an input unit. For example, the touch panel 42 may be disposed between the transparent protective panel 43 and the flexible display panel 41. The flexible display panel 41, the touch panel 42, and the transparent protective panel 43 may be adhered to one another by using an optically-clear adhesive (OCA) layer. However, the present exemplary embodiment is not limited thereto, and the flexible display 4 may further include any of various other optical panels or optical films.

The flexible display 4 is partially fixed to the first body 1 and the second body 2. The flexible display 4 may be divided into a first portion 4a that is fixed to the first body 1, a second portion 4b that is fixed to the second body 2, and a third portion 4c that is formed between the first body 1 and the second body 2. The first body 1 includes a first fixed portion 1a to which the first portion 4a is fixed, and the second body 2 includes a second fixed portion 2a to which the second portion 4b is fixed. For example, the first portion 4a and the second portion 4b of the flexible display 4 may be respectively fixed to the first fixed portion 1a and the second fixed portion 2a by using an adhesive unit such as an adhesive or a double-sided tape. Alternatively or additionally, the first portion 4a and the second portion 4b be may respectively fixed to the first fixed portion 1a and the second fixed portion 2b through an interference fit or a press fit. In other words, fastening between the first portion 4a and the first fixed portion 1a may be achieved by friction after the first portion 4a and the first fixed portion 1a are pushed together. Similarly, fastening between the second portion 4b and the second fixed portion 2b may be achieved by friction after the second portion 4b and the second fixed portion 2b are pushed together. The third portion 4c of the flexible display 4 may not be fixed to the first body 1 or the second body 2. That is, the third portion 4c may not be adhered to the first and second bodies 1 and 2. When the first and second bodies 1 and 2 are located at the folding position of FIG. 3, the third portion 4c forms a curved portion 4d having a predetermined radius of curvature. Accordingly, since the flexible display 4 may not be sharply bent and the third portion 4c is bent by forming the curved portion 4d or is spread, the first and second bodies 1 and 2 may change between the folding position and the unfolding position. Also, when the foldable device folds, since the flexible display 4 may be received in a receiving space 3 in the first and second bodies 1 and 2, the foldable device may have a compact size and may be easily carried. That is, when the foldable device of the present exemplary embodiment folds, the first portion 4a and the second portion 4b of the flexible display 4 are located close to each other to face each other. At the same time, the third portion 4c may be bent from the first and second portions 4a and 4b into the first and second bodies 1 and 2 and is received in the receiving space 3 to have a droplet shape. Hence, the foldable device may have a compact size when the foldable device folds.

The first and second bodies 1 and 2 may be connected to each other. The position of the first and second bodies 1 and 2 may change between the unfolding position and the folding position due to a hinge unit 5. For example, the hinge unit 5 may include hinge shafts. The hinge shafts of the present exemplary embodiment may include first and second hinge shafts 5a-1 and 5a-2 that are spaced apart from each other in a longitudinal direction L. The first and second bodies 1 and 2 may respectively rotate about the first and second hinge shafts 5a-1 and 5a-2 to change between the unfolding position and the folding position.

The foldable device may be a portable mobile device such as a communication terminal, a game console, a multimedia device, a portable computer, or a photographing apparatus. The present exemplary embodiment is not limited thereto, and the foldable device may be any device as long as it includes the first body 1 to which the first portion 4a of the flexible display 4 is fixed and the second body 2 to which the second portion 4b of the flexible display 4 is fixed and that is foldably connected to the first body 1.

A processing unit and input/output units for performing functions according to the use of the foldable device may be provided on the first and second bodies 1 and 2. When the foldable device is a multimedia terminal that provides images and music, the processing unit may include an image information processing unit and an audio information processing unit. When the foldable device is a communication terminal, the processing unit may include a communication module. The input/output units may include an image input/ output unit, an audio input/output unit, and a manipulation unit for user manipulation. The manipulation unit may be realized by using the touch panel 42 of the flexible display 4.

Figure 5A:
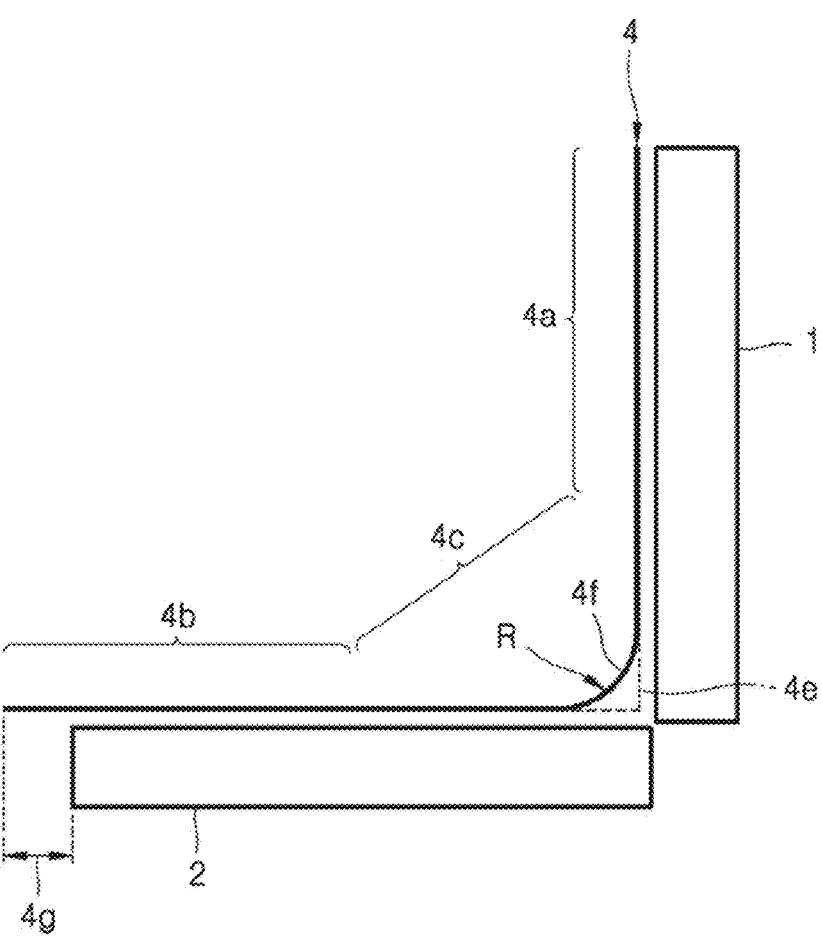
FIGS. 5A and 5B are schematic views illustrating a folding state of the foldable device at an angle of, for example, 90°.
Figure 5B:
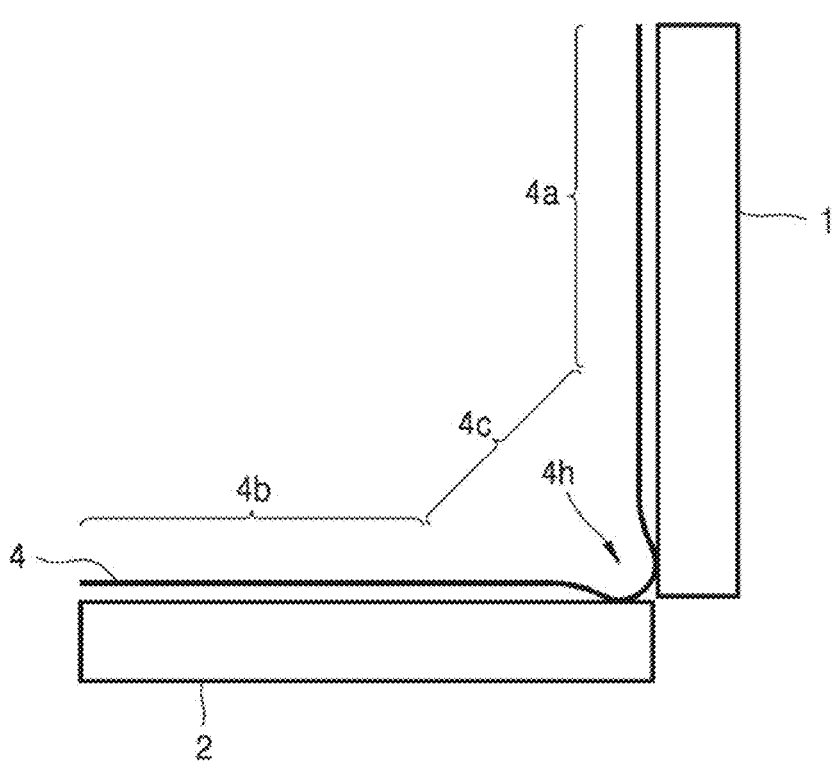

FIGS. 5A and 5B are schematic views illustrating a state wherein the foldable device is folded at an angle of, for example, 90°. Referring to FIGS. 5A and 5B, there is a difference (hereinafter, referred to as a folding/unfolding path difference) between a folding/unfolding path of the first and second bodies 1 and 2 and a folding/unfolding path of the flexible display 4 when the first and second bodies 1 and 2 are folded/unfolded. For example, assuming that the flexible display 4 is entirely fixed to the first and second bodies 1 and 2, when the first and second bodies 1 and 2 fold at an angle of 90°, the third portion 4c is bent at a right angle as marked by a dashed line 4e in FIG. 5A. In this case, the folding/unfolding path difference is "0".

However, when the flexible display 4 is sharply bent, the flexible display 4 may be permanently deformed or may lose its function. Accordingly, in order for the flexible display 4 to be smoothly bent during a folding/unfolding process, the third portion 4c of the flexible display 4 is not fixed to the first and second bodies 1 and 2. In this case, the third portion 4c of the flexible display 4 may have an arc shape having a radius of curvature R as marked by a solid line 4f in FIG. 5A due to its elasticity. A length difference 4g between a portion corresponding to the dashed line 4e and a portion corresponding to the solid line 4f is the folding/unfolding path difference. The folding/unfolding path difference may be presented as $2R-2\pi R/4$. Hereinafter, the folding/unfolding path difference is denoted by reference numeral 4g. If the second portion 4b of the flexible display 4 is fixed to the second body 2 and the first portion 4a of the flexible display 4 is not fixed to the first body 1, the flexible display 4 is pushed toward an end portion of the first body 1 by as much as the folding/unfolding path difference 4g. Accordingly, the third portion 4c of the flexible display 4 may be smoothly bent inward as marked by the solid line 4f.

If the first and second portions 4a and 4b of the flexible display 4 are respectively fixed to the first and second bodies 1 and 2, the third portion 4c of the flexible display 4 is bent both inward and outward and thus an uneven portion 4h is formed as shown in FIG. 5B. The uneven portion 4h may cause the flexible display 4 to be permanently deformed. Also, when the first and second bodies 1 and 2 are used at an opening angle ranging from, for example, about 90° to about 180°, distortion of a screen may occur at the uneven portion 4h. Also, when the third portion 4c is repeatedly bent inward and outward, the flexible display 4 may be permanently deformed or damaged at the uneven portion 4h.

A length of the first body 1 may be extended by as much as the folding/unfolding path difference 4g so that the first body 1 has an extended portion and the first portion 4a of the flexible display 4 may slide along the first body 1. However, in this case, when the first and second 1 and 2 completely unfold, the extended portion of the first body 1 may not be covered by the flexible display 4.

According to an exemplary embodiment, at least one of the first and second bodies 1 and 2 may move to or from the first and second hinge shafts 5a-1 and 5a-2 to compensate for the folding/unfolding path difference 4g during a folding/unfolding process. For example, when the first and second bodies 1 and 2 fold, the first and second bodies 1 and 2 may move away from the first and second hinge shafts 5a-1 and 5a-2. As the third portion 4c of the flexible display 4 forms the curved portion 4d and is received in the receiving space 3 in the first and second bodies 1 and 2, the first and second bodies 1 and 2 may move toward the first and second hinge shafts 5a-1 and 5a-2. When the first and second bodies 1 and 2 unfold, the first and second bodies 1 and 2 may move away from the first and second hinge shafts 5a-1 and 5a-2. As the curved portion 4d of the third portion 4c of the flexible display 4 unfolds and is separated from the receiving space 3 in the first and second bodies 1 and 2, the first and second bodies 1 and 2 may move again toward the first and second hinge shafts 5a-1 and 5a-2. Accordingly, in order to compensate for the folding/unfolding path difference 4g during the folding/unfolding process, the foldable device may include a path difference compensating unit that restricts an amount of movement of the first and second bodies 1 and 2 to or from the first and second hinge shafts 5a-1 and 5a-2. The path difference compensating unit may enable at least one of the first and second bodies 1 and 2 to move away from the first and second hinge shafts 5a-1 and 5a-2 during a period when the foldable device moves from the unfolding position to a changing position. The path difference compensating unit may enable at least one of the first and second bodies 1 and 2 to move toward the first and second hinge shafts 5a-1 and 5a-2 during a period when the foldable device moves from the changing position to the folding position. The changing position may be the same as a receiving start position of first and second support portions 1b and 2b which will be explained below. In other words, an opening angle between the first and second bodies 1 and 2 at the changing position may be equal to or less than an opening angle between the first and second bodies 1 and 2 at the receiving start position. The path difference compensating unit will be explained below in detail.

Referring to FIGS. 2 and 3, the first and second support portions 1b and 2b that partially support the third portion 4c of the flexible display 4 at the unfolding position may be respectively provided on the first and second bodies 1 and 2. When the first and second bodies 1 and 2 are located at the folding position, the first and second support portions 1b and 2b pivot to a position at which the receiving space 3 in which the curved portion 4d is received is formed in the first and second bodies 1 and 2. In this configuration, the flexible display 4 may be supported flat at the unfolding position, and may be received with a compact size in the first and second bodies 1 and 2 at the folding position.

The first and second support portions 1b and 2b may be maintained at a support position (see FIG. 2) at which the first and second support portions 1b and 2b partially support the third portion 4c of the flexible display 4 when an angle between the first and second bodies 1 and 2 ranges from 180° to a receiving start angle (of the receiving start position), and may pivot to a receiving position (see FIG. 3) at which the receiving space 3 is formed when the angle between the first and second bodies 1 and 2 is less than the receiving start angle. Since the foldable device is rarely used when the angle between the first and second bodies 1 and 2 is less than 90°, the receiving start angle may be, for example, about 90°. However, the present exemplary embodiment is not limited thereto, and the receiving start angle may be slightly greater or less than 90°. In order to stably support the flexible display 4 at an inclined position which will be explained below, the receiving start angle may be equal to or less than an opening angle at the inclined position.

Figure 6:
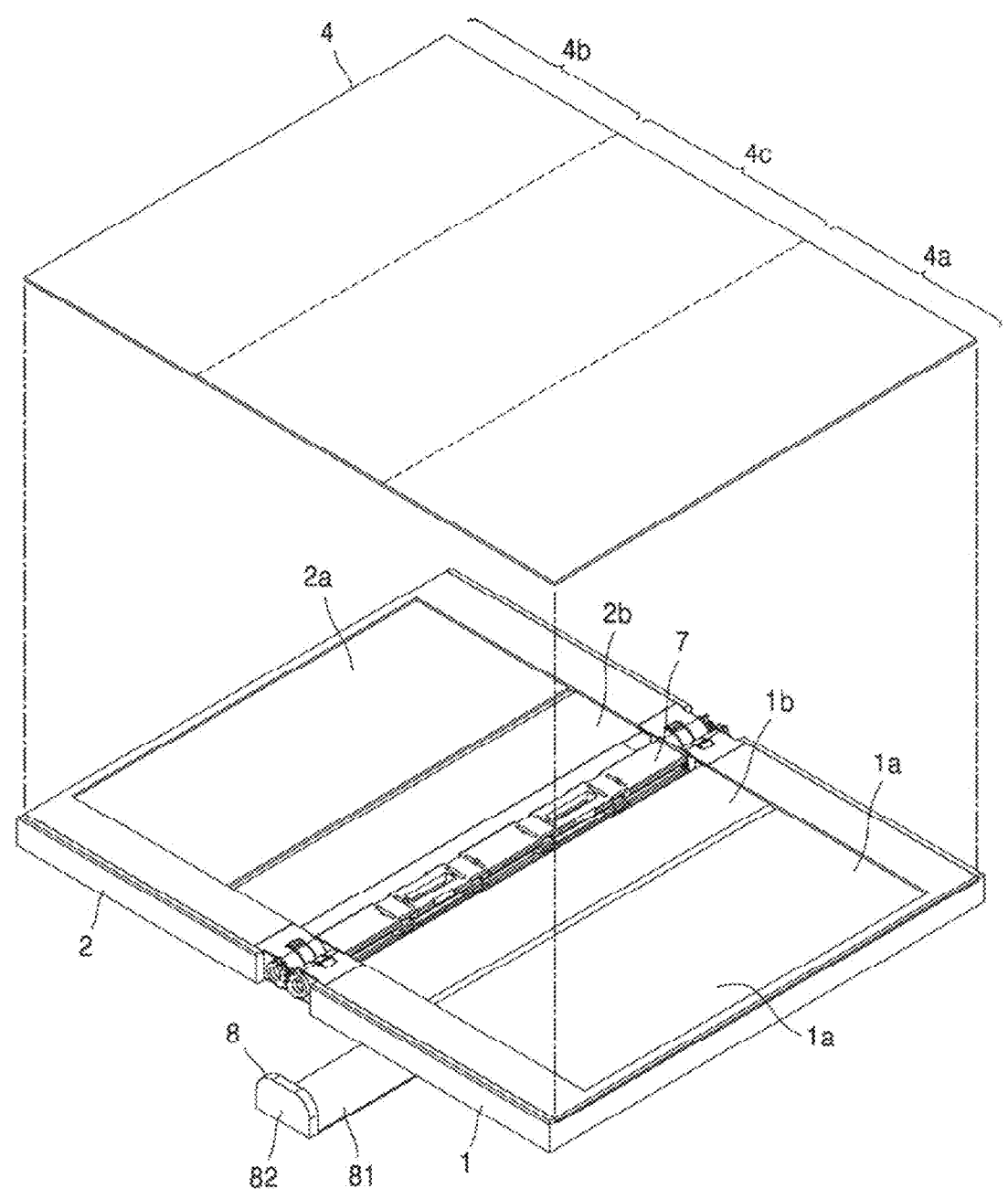
FIG. 6 is a schematic exploded perspective view of the foldable device according to an exemplary embodiment.
Figure 7:
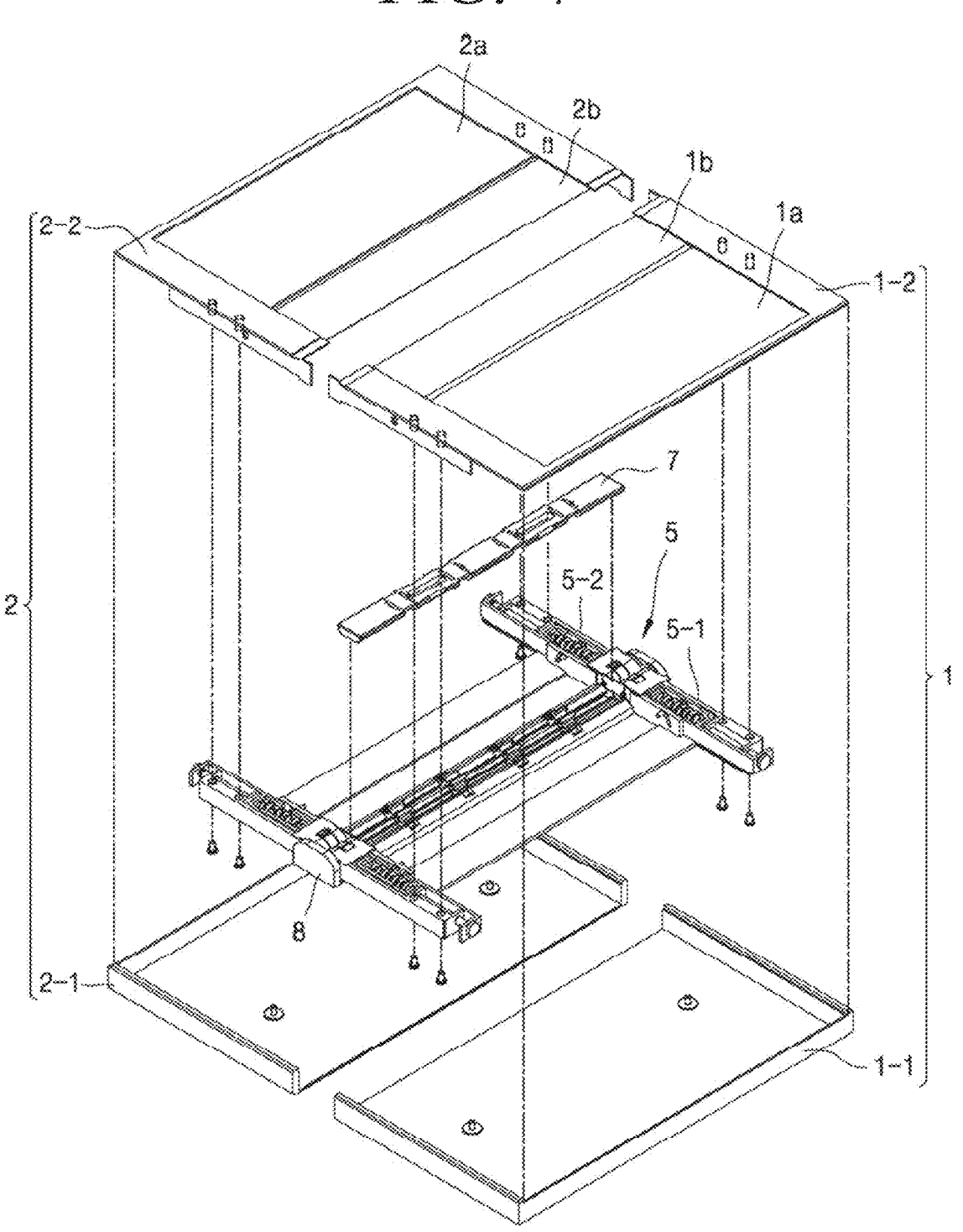
FIG. 7 is an exploded perspective view of the foldable device of FIG. 6 according to an exemplary embodiment.
Figure 8:
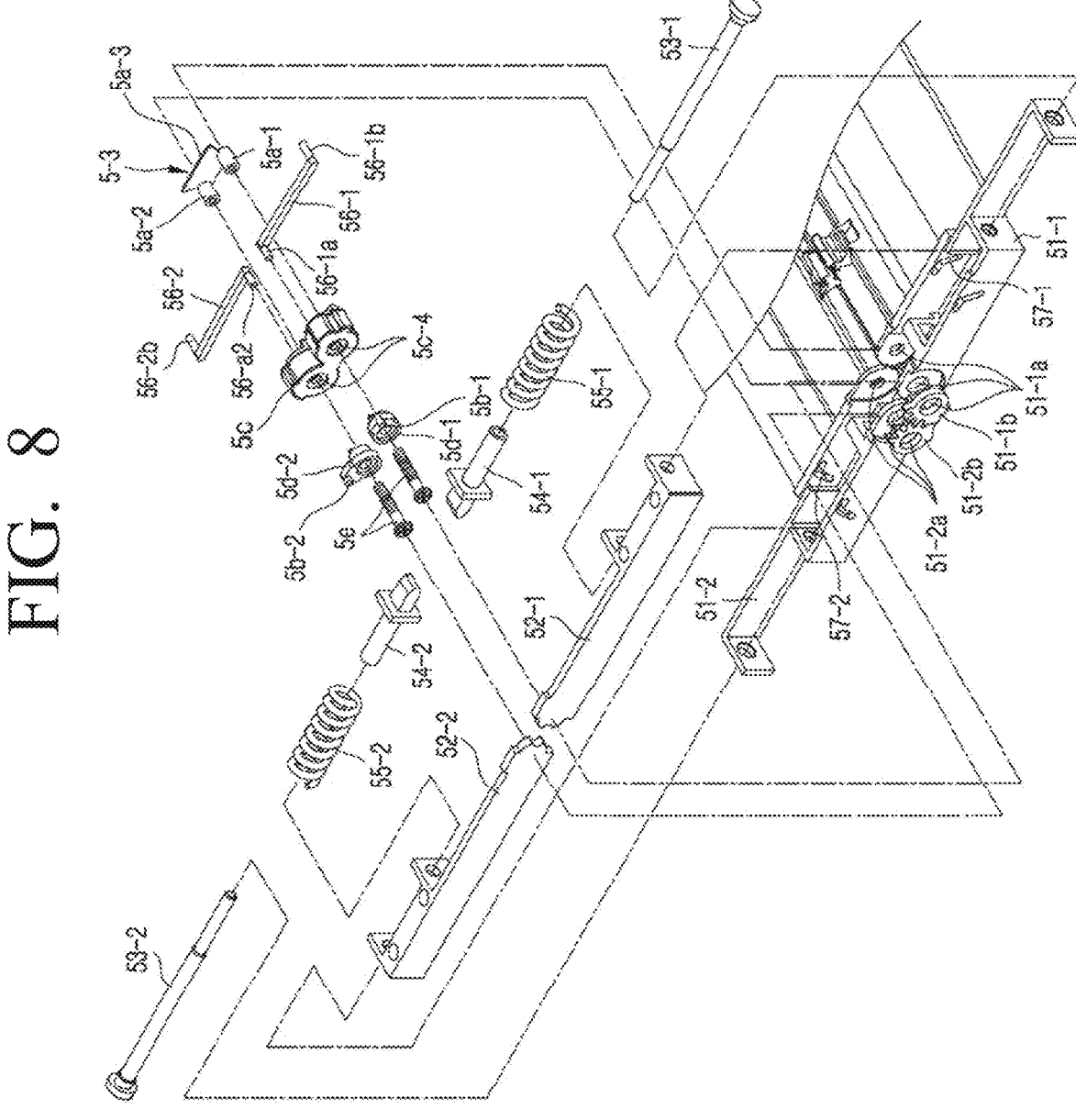
FIG. 8 is an exploded perspective view of a hinge unit according to an exemplary embodiment.

FIG. 6 is a schematic exploded perspective view of the foldable device according to an exemplary embodiment. FIG. 7 is an exploded perspective view of the foldable device of FIG. 6 according to an exemplary embodiment. FIG. 8 is an exploded perspective view of the hinge unit 5 according to an exemplary embodiment. Since the hinge unit 5 is symmetric in a width direction W of the foldable device, only one side of the hinge unit 5 in the width direction W is illustrated in FIG. 8.

Referring to FIGS. 6, 7, and 8, the hinge unit 5 includes a fixed hinge 53 including the first and second hinge shafts 5a-1 and 5a-2. The fixed hinge 5-3 is located at a fixed position without rotating or moving, The first and second bodies 1 and 2 may move to or from the fixed hinge 5-3 and may rotate around the fixed hinge 5-3. The hinge unit 5 may further include a first hinge unit 5-1 that pivots about the first hinge shaft 5a-1 and a second hinge unit 5-2 that pivots about the second hinge shaft 5a-2. The fixed hinge 5-3 includes the first and second hinge shafts 5a-1 and 5a-2. The fixed hinge 5-3 may further include a shielding plate 5a-3. The first and second hinge shafts 5a-1 and 5a-2 may be supported on the shielding plate 5a-3. The first and second hinge shafts 5a-1 and 5a-2 may be integrally formed with the shielding plate 5a-3. The shielding plate 5a-3 is located on a side portion of the flexible display 4 in the width direction W and covers a gap between an end portion of the flexible display 4 in the width direction W and the first and second bodies 1 and 2. Accordingly, the inside of the foldable device may be prevented from being exposed through the gap and foreign materials may be prevented from being introduced into the foldable device through the gap.

The first body 1 is connected to the first hinge unit 5-1 and the second body 2 is connected to the second hinge unit 5-2. The first body 1 includes a first lower case 1-1 and a first upper case 1-2. The first upper case 1-2 includes the first fixed portion 1a and the first support portion 1b. The first support portion 1b is coupled to the first upper case 1-2 so that the first support portion 1b pivots between the support position and the receiving position. The second body 2 includes a second lower case 2-1 and a second upper case 2-2. The second upper case 2-2 includes the second fixed portion 2a and the second support portion 2b. The second support portion 2b is coupled to the second upper case 2-2 so that the second support portion 2b pivots between the support position and the receiving position.

Referring to FIG. 8, the first hinge unit 5-1 includes a first hinge frame 51-1. The first hinge shaft 5a-1 is inserted into first slot holes 51-1a that are formed in the first hinge frame 51-1. A diameter of each of the first slot holes 511a is determined so that the first hinge frame 51-1 pivots about the first hinge shaft 5a-1. Accordingly, the first hinge frame 51-1 may pivot about the first hinge shaft 5a-1.

A first movable frame 52-1 is supported on the first hinge frame 51-1 so that the first movable frame 52-1 moves to or from the first hinge shaft 5a-1. For example, a first guide shaft 53-1 that extends in the longitudinal direction L is provided on the first hinge frame 51-1, and the first movable frame 52-1 is slidably supported on the first guide shaft 53-1. The first lower case 1-1 and the first upper case 1-2 may be coupled to the first movable frame 52-1 to be respectively disposed under and over the first movable frame 52-1. According to another exemplary embodiment, one of the first lower case 1-1 and the first upper case 1-2 may be coupled to the first movable frame 52-1 and the other case. The first body 1 is connected to the first hinge unit 5-1 so that the first body 1 moves to or from the first hinge shaft 5a-1.

The second hinge unit 5-2 includes a second hinge frame 51-2. The second hinge shaft 5a-2 is inserted into second slot holes 51-2a that are formed in the second hinge frame 51-2. A diameter of each of the second slot holes 512a is determined so that the second hinge frame 51-2 pivots about the second hinge shat 5a-2. Accordingly, the second hinge frame 51-2 may pivot about the second hinge shaft 5a-2.

A second movable frame 52-2 is supported on the second hinge frame 51-2 so that the second movable frame 52-2 moves to or from the second hinge shaft 5a-2. For example, a second guide shaft 53-2 that extends in the longitudinal direction L is provided on the second hinge frame 51-2, and the second movable frame 52-2 is slidably supported on the second guide shaft 53-2. The second lower case 2-1 and the second upper case 2-2 may be coupled to the second movable frame 52-2 to be respectively disposed under and over the second movable frame 52-2. Accordingly to another exemplary embodiment, one of the second lower case 2-1 and the second upper case 2-2 may be coupled to the second movable frame 52-2 and the other case. The second body 2 is connected to the second hinge unit 5-2 so that the second body 2 moves to or from the second hinge shaft 5a-2.

First and second gear portions 51-1b and 51-2b having at the center the first and second slot holes 51-1a and 51-2a are respectively provided on the first and second hinge frames 51-1 and 51-2. The first and second gear portions 511b and 51-2b are engaged with each other. In this configuration, the first and second bodies 1 and 2 may synchronously rotate about the first and second hinge shafts 5a-1 and 5a-2.

The foldable device may include a locking unit that locks the first and second bodies 1 and 2 at any of a plurality of positions. For example, the locking unit may lock the first and second bodies 1 and 2 at the unfolding position (see FIG. 2) and at the folding position (see FIG. 3). The locking unit may further lock the first and second bodies 1 and 2 at a position (inclined position) having a predetermined opening angle between the unfolding position (see FIG. 2) and the folding position (see FIG. 3). The opening angle at the inclined position may be greater than 90°. The locking unit may lock the first and second bodies 1 and 2 at any of a plurality of inclined positions having an opening angle between 180° and 90°. An opening angle of an inclined position may be, for example, 120°.

Figure 9:
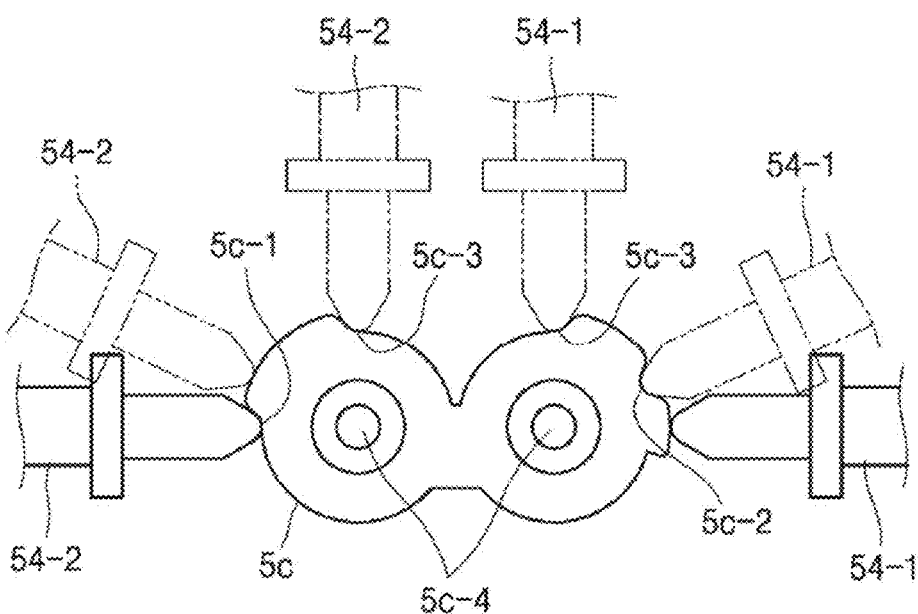
FIG. 9 is a side view for explaining an operation of a locking unit.

FIG. 8 illustrates the locking unit according to an exemplary embodiment. FIG. 9 is a side view for explaining an operation of the locking unit. Referring to FIGS. 8 and 9, the locking unit may include a locking member 5c that is located at a fixed position, and a protrusion member that is fixed by the locking member 5c while rotating along with the first and second bodies 1 and 2. The locking member 5c may include locking portions 5c-1, 5c-2, and 5c-3 that respectively lock the first and second bodies 1 and 2 at the unfolding position, the inclined position, and the folding position. The protrusion member may include first and second protrusion members 54-1 and 54-2 that are selectively fixed by the locking portions 5c-1, 5c-2, and 5c-3 according to an opening angle between the first and second bodies 1 and 2.

The locking member 5c is located at the fixed position. The locking member 5c is provided on the fixed hinge 5-3. The locking member 5c may be fixed to the first and second hinge shafts 5a-1 and 5a-2. In the present exemplary embodiment, the first and second hinge shafts 5a-1 and 5a-2 pass through slot holes 5c-4 that are formed in the locking member 5c. Accordingly, the locking member 5c has the fixed position with respect to the first and second hinge shafts 5a-1 and 5a-2.

The first and second protrusion members 54-1 and 54-2 rotate about the first and second hinge shafts 5a-1 and 5a-2 along with the first and second bodies 1 and 2. The first and second protrusion members 54-1 and 54-2 are supported on the first and second hinge frames 51-1 and 51-2 so that the first and second protrusion members 54-1 and 54-2 move toward or away from the locking member 5c. First and second elastic members 55-1 and 55-2 apply elastic forces to the first and second protrusion members 54-1 and 54-2 to hold the movement of the first and second protrusion members 54-1 and 54-2 at the locking portions 5c-1, 5c-2, and 5c-3. In the present exemplary embodiment, the first and second protrusion members 54-1 and 54-2 are fixed to the first and second guide shafts 53-1 and 53-2. The first and second guide shafts 53-1 and 53-2 are supported on the first and second hinge frames 51-1 and 51-2 so that the first and second guide shafts 53-1 and 53-2 slide toward or away from the locking member 5c.

Since the first and second bodies 1 and 2 synchronously rotate due to the first and second gear portions 51-2a and 51-2b in the present exemplary embodiment, only one of the first and second bodies 1 and 2 may need to be locked. Accordingly, once one of the first and second protrusion members 54-1 and 54-2 is fixed by the locking portions 5c-1, 5c-2, and 5c-3, the first and second bodies 1 and 2 may be locked not to rotate.

Referring to FIG. 9, when the first and second bodies 1 and 2 are located at the unfolding position, the second protrusion member 54-2 is fixed or locked by the locking portion 5c-1. Since the first and second bodies 1 and 2 synchronously rotate due to the first and second gear portions 51-2a and 51-2b as described above, once the second body 2 is locked at the unfolding position, the first body 1 is also locked at the unfolding position.

When the first and second bodies 1 and 2 begin to fold, the second protrusion member 54-2 is pushed in a direction that is opposite to a direction in which an elastic force of the second elastic member 55-2 is applied and thus is separated from the locking portion 5c-1. When the first and second bodies 1 and 2 reach the inclined position, for example, a position having an opening angle of 120°, the first protrusion member 54-1 is fixed by the locking portion 5c-2. Accordingly, the first and second bodies 1 and 2 are locked at the inclined position.

When the first and second bodies 1 and 2 continuously move to be folded, the first protrusion member 54-1 is pushed in a direction that is opposite to a direction in which an elastic force of the first elastic member 55-1 is applied and thus is separated from the locking portion 5c-2. When the first and second bodies 1 and 2 reach the folding position, the movement of the first and second protrusion members 54-1 and 54-2 are stopped and locked by one pair of locking portions 5c-3. Accordingly, the first and second bodies 1 and 2 are locked at the folding position.

As such, since the foldable device may be locked at the unfolding position and the folding position, convenience in use and portability may be improved. Also, since the foldable device may be located at a predetermined inclination angle, convenience in use may be further improved. Although the locking member 5c including one locking portion 5c-2 corresponding to an inclination angle is provided in the present exemplary embodiment, two or more locking portions 5c-2 corresponding to two or more inclination angles may be provided, and thus the foldable device may be located at positions having the two or more inclination angles.

As described above, amounts of movement of the first and second bodies 1 and 2 to or from a hinge shaft, for example, the first and second hinge shafts 5a-1 and 5a-2 are restricted during a folding/unfolding process in order to compensate for the folding/unfolding path difference 4g. To this end, the foldable device includes the path difference compensating unit. The path difference compensating unit enables at least one of the first and second bodies 1 and 2 to move away from the hinge shaft during a period when the foldable device moves from the unfolding position to the changing position. The path difference compensating unit enables at least one of the first and second bodies 1 and 2 to move toward the hinge shaft during a period when the foldable device moves from the changing position to the folding position.

For example, the path difference compensating unit may include a restriction pin that has a fixed position with respect to the first and second hinge shafts 5a-1 and 5a-2 and a restriction slot that rotates about and moves to or from the first and second hinge shafts 5a-1 and 5a-2 along with the first and second bodies 1 and 2. The restriction pin stays fixed and does not rotate around the first and second hinge shafts 5a-1 and 5a-2. The restriction slot is shaped to restrict amounts of movement of the first and second bodies 1 according to a rotation angle of the first and second bodies 1 and 2.

Figure 10A:
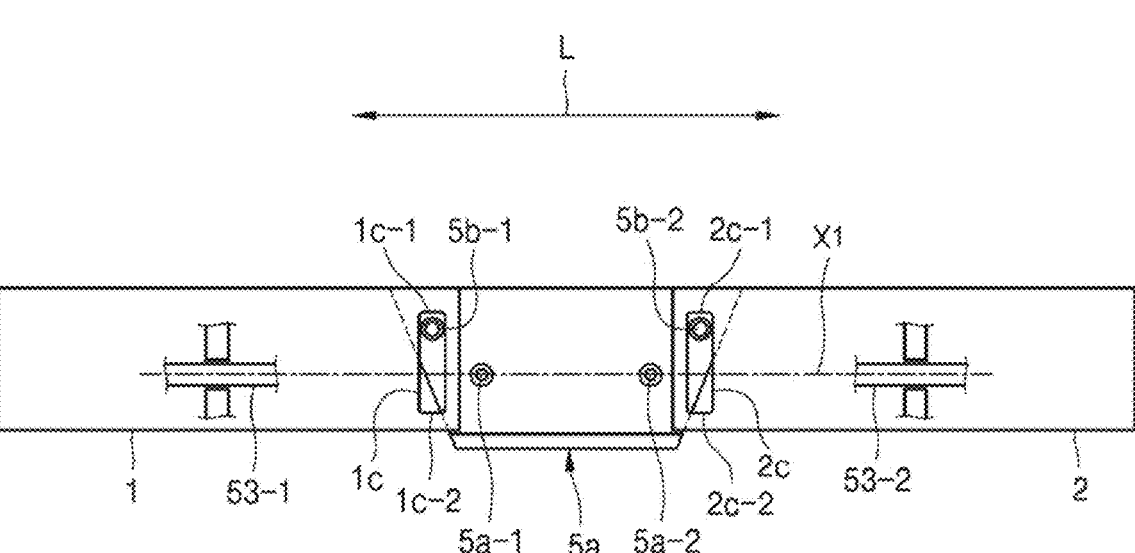
FIGS. 10A, 10B, and 10C are schematic views of a structure in which first and second bodies move to or from first and second hinge shafts according to an exemplary embodiment, respectively illustrating a state wherein the first and second bodies are unfolded, a state wherein the first and second bodies are spaced apart by a maximum distance from the first and second hinge shafts, and a state wherein the first and second bodies are folded.
Figure 10B:
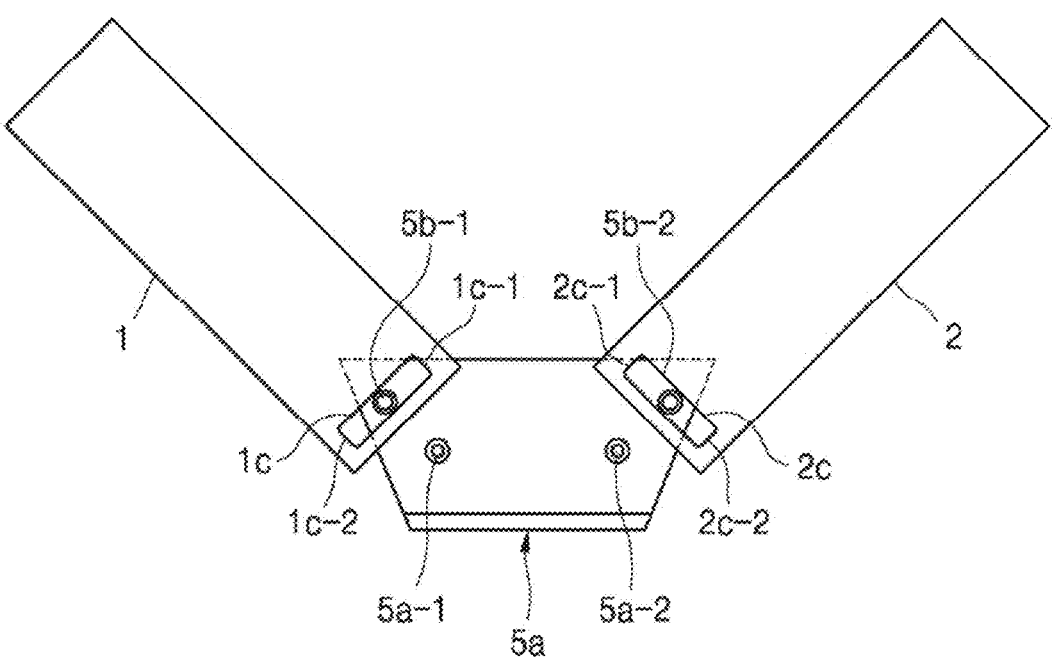
Figure 10C:
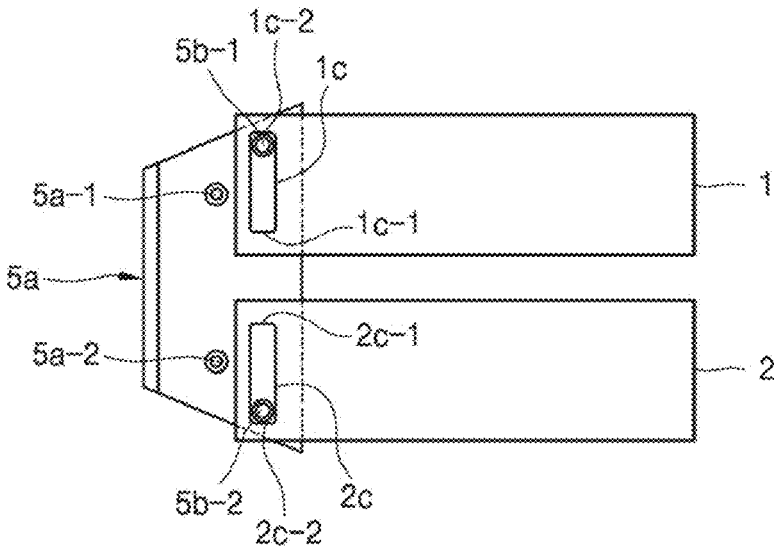
Figure 10D:
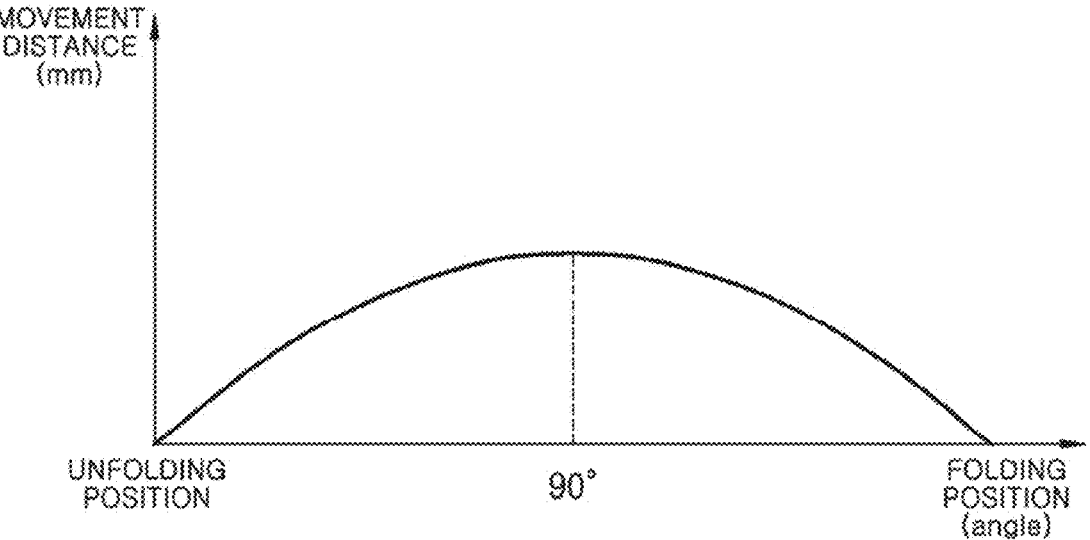
FIG. 10D is a graph showing a movement distance according to a folding angle between the first and second bodies in the structure of FIG. 10A.

FIGS. 10A, 10B, and 10C are schematic views of a structure of a hinge shaft 5a including the first and second bodies 1 and 2 that move to or from the first and second hinge shafts 5a-1 and 5a-2 according to an exemplary embodiment. FIG. 10A illustrates a state wherein the first and second bodies 1 and 2 are unfolded, FIG. 10B illustrates a state wherein the first and second bodies 1 and 2 are spaced apart by a maximum distance from the first and second hinge shafts 5a-1 and 5a-2, and FIG. 10C illustrates a state wherein the first and second bodies 1 and 2 are folded. In the foldable device according to the present exemplary embodiment, the first and second bodies 1 and 2 move to or from the first and second hinge shafts 5a-1 and 5a-2. In FIGS. 10A, 10B, and 10C, the flexible display 4 is not shown. FIG. 10D is a graph showing a movement distance according to a folding angle between the first and second bodies 1 and 2.

Referring to FIG. 10A, the first and second bodies 1 and 2 may move along the first and second guide shafts 53-1 and 53-2 as described above. Amounts of movement of the first and second bodies 1 and 2 are restricted by the path difference compensating unit. The path difference compensating unit may include first and second restriction pins 5b-1 and 5b-2 having fixed positions, and first and second restriction slots 1c and 2c that rotate and move along with the first and second bodies 1 and 2. For example, the first and second restriction slots 1c and 2c may be formed in the first and second bodies 1 and 2 or the first and second movable frames 52-1 and 52-2 (see FIG. 8). The first and second restriction pins 5b1 and 5b-2 are respectively inserted into the first and second restriction slots 1c and 2c. The first and second restriction slots 1c and 2c respectively include first end portions 1c-1 and 2c-1 and second end portions 1c-2 and 2c-2. At the unfolding position, the first and second restriction pins 5b-1 and 5b-2 are respectively located in the first end portions 1c-1 and 2c-1, and at the folding position, the first and second restriction pins 5b-1 and 5b-2 are respectively located in the second end portions 1c-2 and 2c-2. As shown in FIG. 10A, each of the first and second restriction slots 1c and 2c linearly extends in a direction that is perpendicular to the longitudinal direction L of the first and second bodies 1 and 2, and is symmetric with respect to a line X1 that connects the first and second hinge shafts 5a-1 and 5a-2. In this configuration, a movement distance of the first and second bodies 1 and 2 to or from the first and second hinge shafts 5a-1 and 5a-2 when the first and second bodies 1 and 2 fold/unfold is symmetric about an angle of 90° as shown in the graph of FIG. 10D.

When the first and second bodies 1 and 2 are completely unfolded as shown in FIG. 10A, the folding/unfolding path difference 4g between the flexible display 4 and the first and second bodies 1 and 2 is "0" and the first and second restriction pins 5b-1 and 5b-2 are located in the first end portions 1c-2 and 2c-2 of the first and second restriction slots 1c and 2c. In this state, when the first and second bodies 1 and 2 begin to pivot about the first and second hinge shafts 5a1 and 5a-2 to fold, the first and second bodies 1 and 2 are guided by the first and second restriction pins 5b-1 and 5b-2 and the first and second restriction slots 1c and 2c to gradually move away from the first and second hinge shafts 5a-1 and 5a-2. When the first and second bodies 1 and 2 form an angle of, for example, 90°, therebetween as shown in FIG. 10B, the first and second restriction pins 5b-1 and 5b-2 are located in the middle of the first and second restriction slots 1c and 2c and the first and second bodies 1 and 2 reach a farthest position from the first and second hinge shafts 5a-1 and 5a-2. When the first and second bodies 1 and 2 move continuously to be folded, the first and second bodies 1 and 2 gradually move toward the first and second hinge shafts 5a-1 and 5a-2. When the first and second bodies 1 and 2 are completely folded as shown in FIG. 10C, the first and second restriction pins 5b-1 and 5b-2 reach the second end portions 1c-2 and 2c-2 of the first and second restriction slots 1c and 2c.

As such, since the first and second bodies 1 and 2 move away from the first and second hinge shafts 5a-1 and 5a-2 and then move toward the first and second hinge shafts 5a-1 and 5a-2 during a folding/unfolding process to compensate for the folding/unfolding path difference 4g, the third portion 4c of the flexible display 4 may be bent into a smooth curved shape. Also, when the foldable device is used in a state wherein the first and second bodies 1 and 2 form a predetermined unfolding angle therebetween, the third portion 4c has a smooth curved shape, thereby reducing distortion of a screen.

The first and second restriction slots 1c and 2c are not limited to linear shapes of FIG. 10A, and may have any of various shapes as long as the folding/unfolding path difference 4g according to a folding/unfolding structure of the first and second bodies 1 and 2 may be compensated for.

Figure 11A:
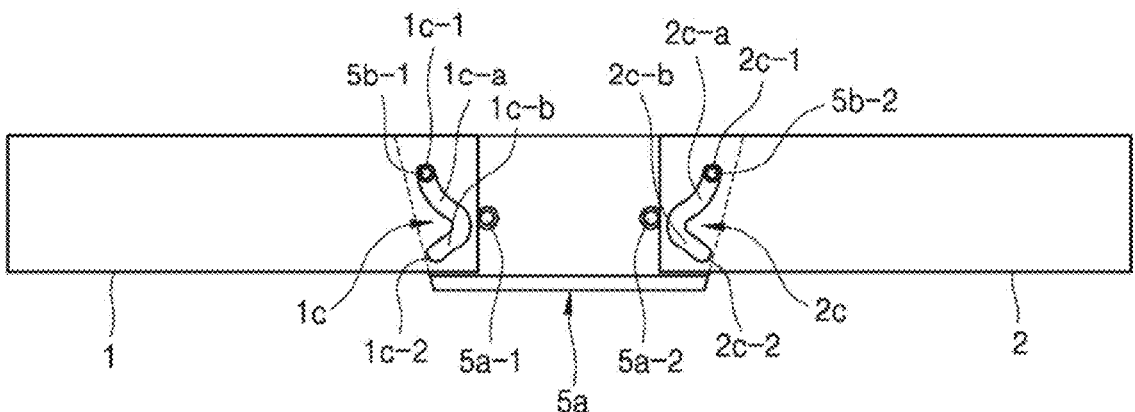
FIGS. 11A, 11B, and 11C are schematic views of a structure in which the first and second bodies move to or from the first and second hinge shafts according to an exemplary embodiment, respectively illustrating a state wherein the first and second bodies are unfolded, a state wherein the first and second bodies are spaced apart by a maximum distance from the first and second hinge shafts, and a state wherein the first and second bodies are folded.
Figure 11B:
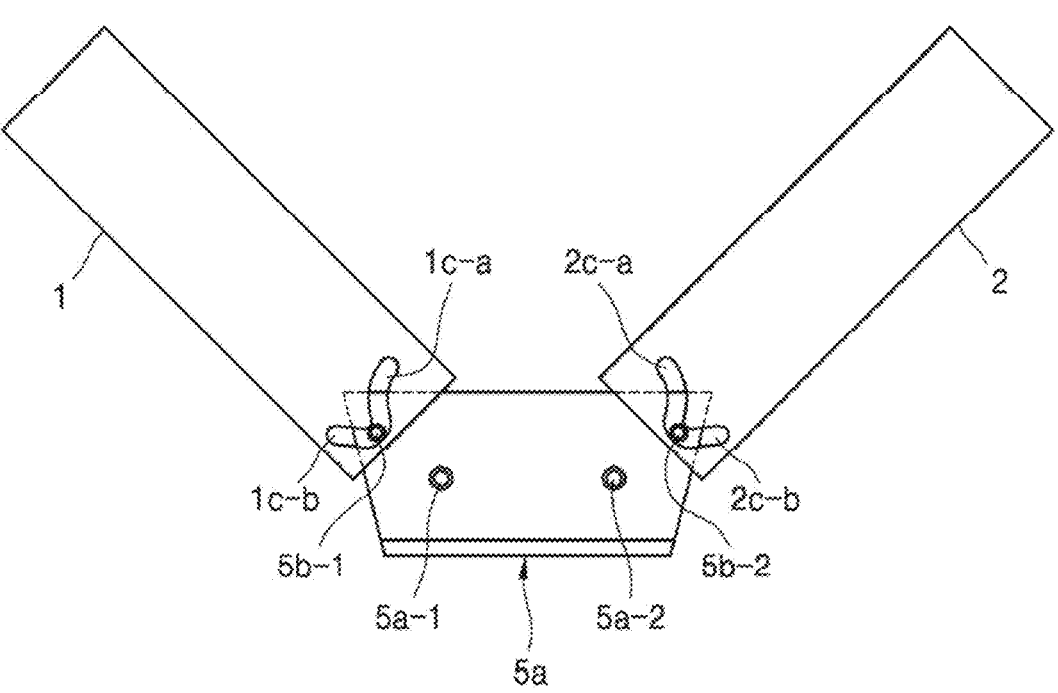
Figure 11C:
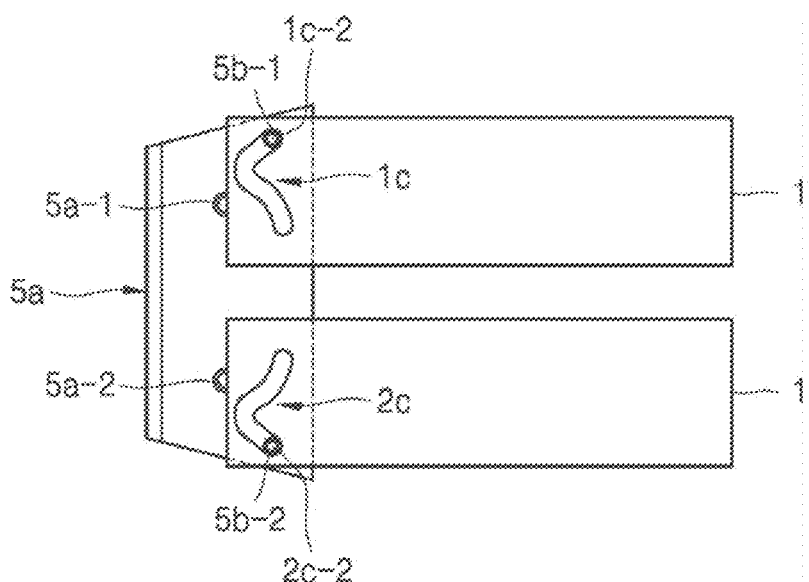
Figure 11D:
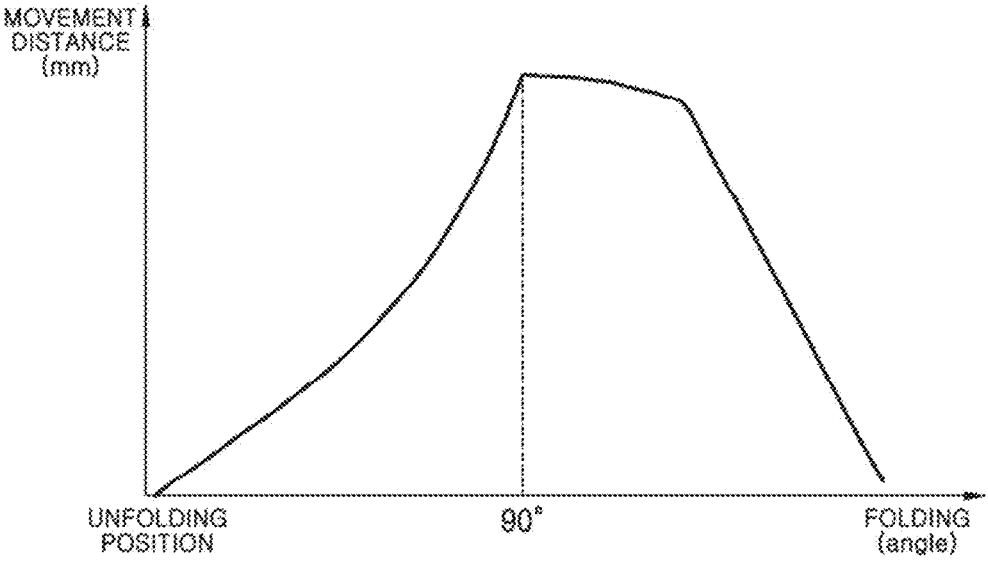
FIG. 11D is a graph showing a movement distance according to a folding angle between the first and second bodies in the structure of FIG. 11A.

FIGS. 11A, 11B, and 11C are schematic views of a structure of a hinge shaft 5a including the first and second bodies 1 and 2 that move to or from the first and second hinge shafts 5a-1 and 5a-2 according to an exemplary embodiment. FIG. 11A illustrates a state wherein the first and second bodies 1 and 2 are unfolded, FIG. 11B illustrates a state wherein the first and second bodies 1 and 2 are spaced apart by a maximum distance from the first and second hinge shafts 5a-1 and 5a-2, and FIG. 11C illustrates a state wherein the first and second bodies 1 and 2 are folded. In FIGS. 11A, 11B, and 11C, the flexible display 4 is not shown. FIG. 11D is a graph showing a movement distance according to a folding angle between the first and second bodies 1 and 2.

Referring to FIG. 11A, the first and second restriction slots 1c and 2c include first parts 1c-a and 2c-a corresponding to a folding/unfolding process from an unfolding state to a state having an angle of, for example, 90°, between the first and second bodies 1 and 2 and second parts 1c-b and 2c-b corresponding to a folding/unfolding process from the state having the angle of 90° between the first and second bodies 1 and 2 and a folding state. The first and second bodies 1 and 2 are folded or unfolded by rotating about the first and second hinge shafts 5a-1 and 5a-2. When the first and second bodies 1 and 2 are folded, the first and second bodies 1 and 2 form an obtuse angle during a period when the foldable device moves from the unfolding state to a state having the receiving start angle of, for example, 90°, and the first and second support portions 1*b* and 2*b* are maintained at the support position. As a result, the folding/unfolding path difference 4*g* may be sharply increased. When the angle between the first and second bodies 1 and 2 is less than the receiving start angle, the first and second support portions 1*b* and 2*b* may pivot to the receiving position at which the receiving space 3 is formed, thereby reducing the folding/unfolding path difference 4*g* to some extent due to the receiving space 3.

In this regard, the first parts 1*c-a* and 2*c-a* have profiles corresponding to a sharp change in the folding/unfolding path difference 4*g* during a folding/unfolding process. When the angle between the first and second bodies 1 and 2 is less than 90°, since the third portion 4*c* of the flexible display 4 is received in the receiving space 3 and thus the folding/unfolding path difference 4*g* is reduced to some extent due to the receiving space 3, the second parts 1*c-b* and 2*c-b* do not need to have strict profiles for compensating for the folding/unfolding path difference 4*g* when compared to the first parts 1*c-a* and 2*c-a*. The second parts 1*c-b* and 2*c-b* may just have profiles for moving the first and second bodies 1 and 2 so that the third portion 4*c* of the flexible display 4 smoothly forms the curved portion 4*d* and is received in the receiving space 3.

According to the first and second restriction slots 1*c* and 2*c* of FIG. 11A, a movement distance of the first and second bodies 1 and 2 to or from the first and second hinge shafts 5*a-1* and 5*a-2* when the first and second bodies 1 and 2 fold or unfold is asymmetric about an angle of 90° as shown in the graph of FIG. 11D. That is, a change in a movement distance when the first and second bodies 1 and 2 are guided by the first parts 1*c-a* and 2*c-a*, that is, a gradient of a curve indicating the movement distance in FIG. 11D, is sharply increased, and a movement distance when the first and second bodies 1 and 2 are guided by the second parts 1*c-b* and 2*c-b* is relatively moderately changed.

When the first and second bodies 1 and 2 are completely unfolded as shown in FIG. 11A, the folding/unfolding path difference 4*g* between the flexible display 4 and the first and second bodies 1 and 2 is "0" and the first and second restriction pins 5*b-1* and 5*b-2* are located in the first end portions 1*c-2* and 2*c-1* of the first and second restriction slots 1*c* and 2*c*. In this state, when the first and second bodies 1 and 2 begin to pivot about the first and second hinge shafts 5*a1* and 5*a-2* to fold, due to operations of the first and second restriction pins 5*b-1* and 5*b-2* and the first parts 1*c-a* and 2*c-a*, the first and second bodies 1 and 2 rapidly move away from the first and second hinge shafts 5*a-1* and 5*a-2*. When the first and second bodies 1 and 2 form an angle of 90° therebetween as shown in FIG. 11B, the first and second restriction pins 5*b-1* and 5*b-2* are located in the middle of the first and second restriction slots 1*c* and 2*c*, that is, a boundary between the first parts 1*c-a* and 2*c-a* and the second parts 1*c-b* and 2*c-b*, and the first and second bodies 1 and 2 reach a farthest position from the first and second hinge shafts 5*a-1* and 5*a-2*. When the first and second bodies 1 and 2 move continuously to folded, the first and second restriction pins 5*b-1* and 5*b-2* are guided by the second parts 1*c-b* and 2*c-b*, and the first and second bodies 1 and 2 gradually move toward the first and second hinge shafts 5*a-1* and 5*a-2*. When the first and second bodies 1 and 2 are completely folded as shown in FIG. 11C, the first and second restriction pins 5*b-1* and 5*b-2* reach the second end portions 1*c-2* and 2*c-2* of the first and second restriction slots 1*c* and 2*c*.

In other exemplary embodiments, the first and second restriction slots 1*c* and 2*c* may have any of various shapes for compensating for the folding/unfolding path difference 4*g* between the flexible display 4 and the first and second bodies 1 and 2 according to a folding/unfolding angle.

Figure 12A:
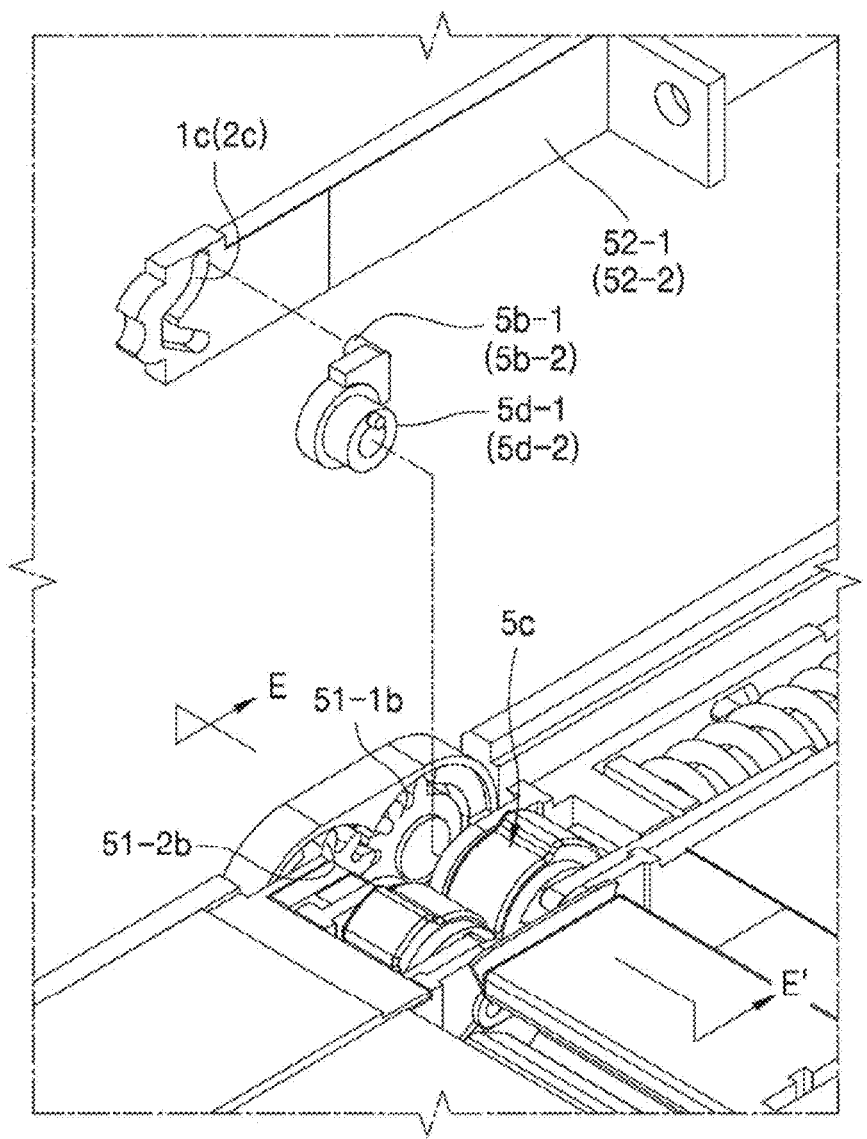
FIG. 12A is an exploded perspective view for explaining a connection relationship between a first restriction pin and a first restriction slot according to an exemplary embodiment.
Figure 12B:
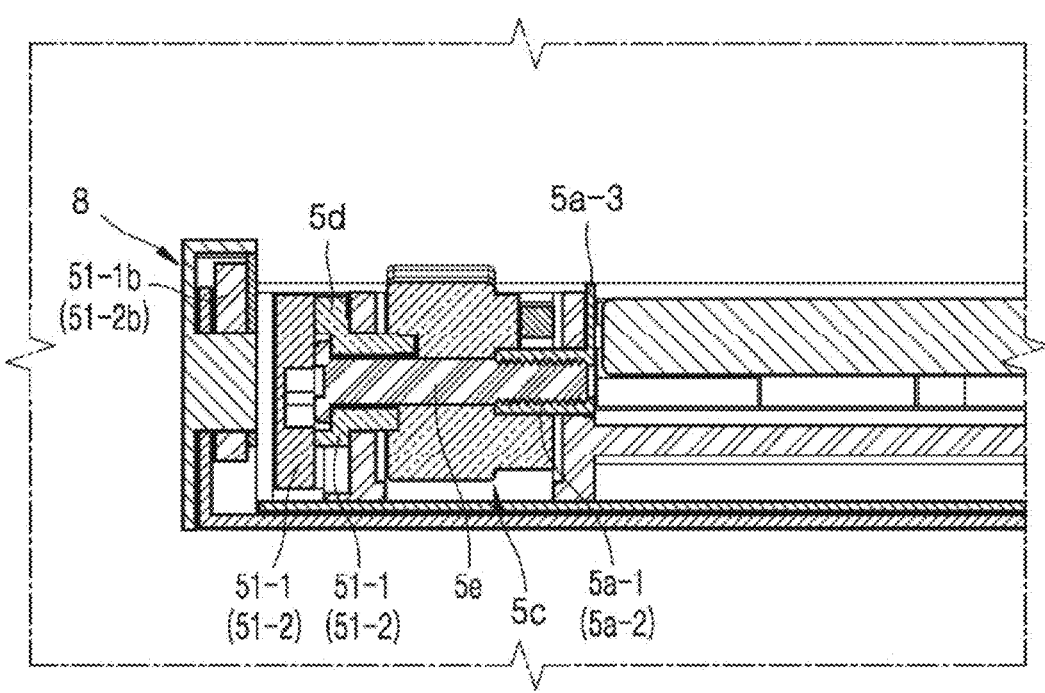
FIG. 12B is a cross-sectional view taken along line E-E' of FIG. 12A.

FIG. 12A is an exploded perspective view illustrating a connection relationship between the first restriction pin 5*b-1* and the first restriction slot 1*c* according to an exemplary embodiment. FIG. 12B is a cross-sectional view taken along line E-E' of FIG. 12A. The path difference compensating unit will now be explained with reference to FIGS. 8, 12A, and 12B.

Referring to FIGS. 8, 12A, and 12B, first and second pin members 5*d-1* and 5*d-2* are illustrated. The first and second restriction pins 5*b-1* and 5*b-2* are respectively provided on the first and second pin members 5*d-1* and 5*d-2*. The first and second pin members 5*d-1* and 5*d-2* are provided on the fixed hinge 5-3. For example, the first and second pin members 5*d-1* and 5*d-2* are inserted into slot holes 5*c-4* of the locking member 5*c* and are respectively fixed to the first and second hinge shafts 5*a-1* and 5*a-2* due to a fastening member 5*e*. Accordingly, the first and second restriction pins 5*b-1* and 5*b-2* may have fixed positions with respect to the first and second hinge shafts 5*a-1* and 5*a-2*.

The first restriction slot 1*c* including the first part 1*c-a* and the second part 1*c-b* shown in FIG. 11A is formed in an end portion of the first movable frame 52-1 that is close to the first hinge shaft 5*a-1*. The first restriction pin 5*b-1* is inserted into the first restriction slot 1*c*. As marked by brackets in FIGS. 12A and 12B, the second restriction slot 2*c* including the first part 2*c-a* and the second part 2*c-b* shown in FIG. 11A is also formed in the second movable frame 52-2. The second restriction pin 5*b-2* is inserted into the second restriction slot 2*c*.

The path difference compensating unit according to an exemplary embodiment may be realized by using the above configuration. Shapes of the first and second restriction slots 1*c* and 2*c* are not limited to those in the above, and may be determined to compensate for the folding/unfolding path difference 4*g* in consideration of the folding/unfolding path difference 4*g* during a folding/unfolding process of the first and second bodies 1 and 2.

The first and second support portions 1*b* and 2*b* may move between the support position and the receiving position as described above. The first and second support portions 1*b* and 2*b* are located at the support position when the first and second bodies 1 and 2 are located at the unfolding position, and move to the receiving position when the first and second bodies 1 and 2 are located at the folding position. In order for the first and second bodies 1 and 2 to be used at the inclined position between the unfolding position and the folding position, the first and second support portions 1*b* and 2*b* may be located at the support position when the first and second bodies 1 and 2 are in a position from the unfolding position to the inclined position, and may move to the receiving position when the first and second bodies 1 and 2 fold beyond the inclined position. Accordingly, the receiving start angle may be equal to or greater than an angle corresponding to the inclined position. Since the foldable device is rarely used at an opening angle that is less than 90°, the first and second support portions 1*b* and 2*b* may be maintained at the support position at the opening angle ranging from 180° to 90°.

The foldable device may include a restriction unit that maintains the first and second support portions 1*b* and 2*b* at the support position when the first and second bodies 1 and 2 are in a position from the unfolding position to the receiving start position corresponding to the receiving start angle, and allows the first and second support portions 1*b* and 2*b* to move to the receiving position when the first and second bodies 1 and 2 folds beyond the receiving start position.

Figure 13:
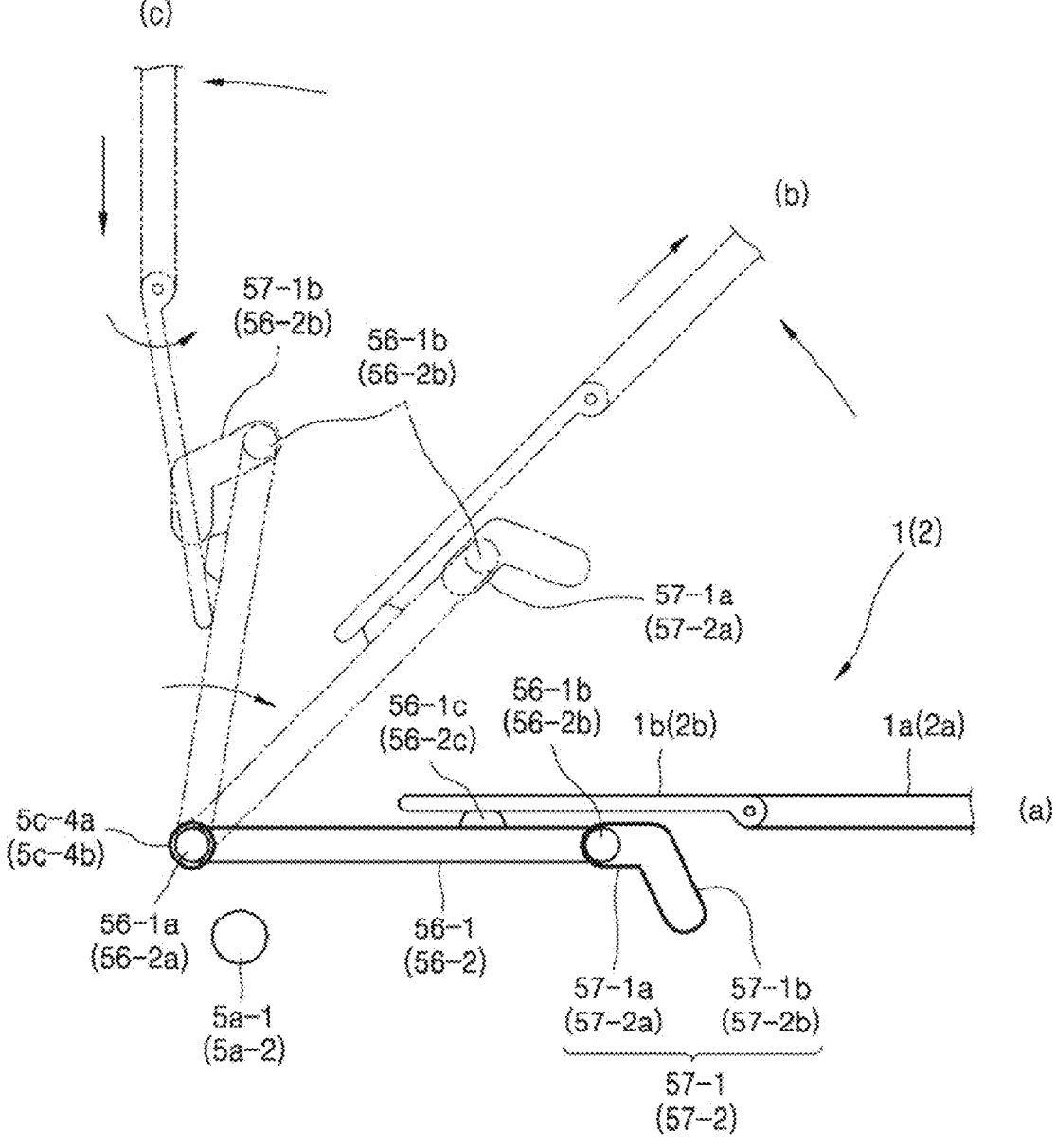
FIG. 13 is a schematic view of a restriction unit according to an exemplary embodiment.

FIG. 13 is a schematic view of the restriction unit according to an exemplary embodiment. Although only a mechanism that restricts the movement of the first support portion 1*b* is shown in FIG. 13, the same mechanism applies to a structure that restricts the movement of the second support portion 2*b*. Hence, reference numerals without parentheses in FIG. 13 denotes an element of the structure that restricts the movement of the first support portion 1*b*, and reference numerals in parentheses denotes an element of the structure that restricts the movement of the second support portion 2*b*.

Referring to FIG. 13, first and second support arms 56-1 and 56-2 that respectively support the first and second support portions 1*b* and 2*b* are illustrated. The first and second support arms 56-1 and 56-2 may respectively pivot about fixed positions with respect to the first and second hinge shafts 5*a*-1 and 5*a*-2. For example, the first and second support arms 56-1 and 56-2 may be pivotably supported on the fixed hinge 5-3.

Figure 14:
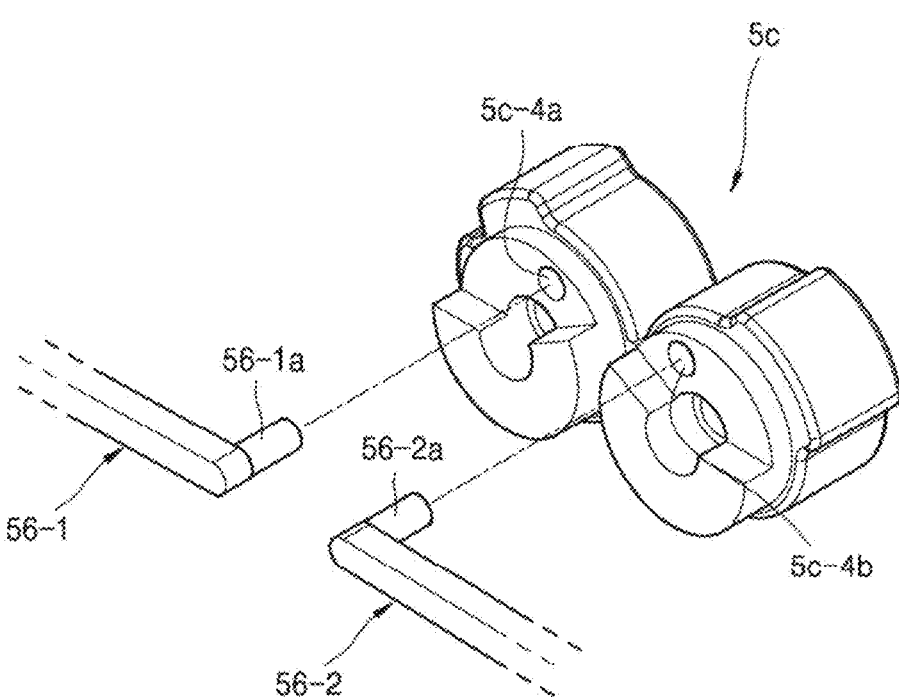
FIG. 14 is an exploded perspective view of a structure in which first and second support arms are pivotably supported according to an exemplary embodiment.

FIG. 14 is an exploded perspective view of a structure in which the first and second support arms 56-1 and 56-2 are pivotably supported according to an exemplary embodiment. Referring to FIGS. 8 and 14, first and second pivot pins 56-1*a* and 56-2*a* are respectively provided on end portions of the first and second support arms 56-1 and 56-2, and are respectively pivotably inserted into first and second pivot holes 5*c*-4*a* and 5*c*-4*b* that are formed in the locking member 5*c*.

First and second guide pins 56-1*b* and 56-2*b* are respectively provided on the first and second support arms 56-1 and 56-2. The first and second guide pins 56-1*b* and 56-2*b* are respectively inserted into first and second guide slots 57-1 and 57-2. Although the first and second guide pins 56-1*b* and 56-2*b* pass through the first and second guide slots 57-1 and 57-2, extend under the first and second support portions 1*b* and 2*b*, and support the first and second support portions 1*b* and 2*b* in the present exemplary embodiment, for convenience of explanation, FIG. 13 illustrates that support protrusions 56-1*c* and 56-2*c* that support the first and second support portions 1*b* and 2*b* are respectively provided on the first and second support arms 56-1 and 56-2.

The first and second guide slots 57-1 and 57-2 are respectively formed in the first and second hinge frames 51-1 and 51-2. The first and second guide slots 57-1 and 57-2 include support parts 57-1*a* and 57-2*a* and receiving parts 57-1*b* and 57-2*b*. The support parts 57-1*a* and 57-2*a* correspond to a period from the unfolding position to the receiving start position, and the receiving parts 57-1*b* and 57-2*b* correspond to a period from the receiving start position to the folding position. The support parts 57-1*a* and 57-2*a* are formed so that the first and second support arms 56-1 and 56-2 are maintained at a position at which the first and second support arms 56-1 and 56-2 support the first and second support portions 1*b* and 2*b* while the first and second bodies 1 and 2 pivot from the unfolding position to the receiving start position. The receiving parts 57-1*b* and 57-2*b* are formed so that the first and second support arms 56-1 and 56-2 are allowed to pivot away from the first and second support portions 1*b* and 2*b* and thus the first and second support portions 1*b* and 2*b* are allowed to pivot to the receiving position while the first and second bodies 1 and 2 pivot from the receiving start position to the folding position. Although the first and second support portions 1*b* and 2*b* pivot due to their weights from the support position to the receiving position in the present exemplary embodiment, an elastic member that applies an elastic force in a direction in which the first and second support portions 1*b* and 2*b* pivot to the receiving position may be provided, and thus the first and second support portions 1*b* and 2*b* may pivot from the support position to the receiving position due to the elastic force of the elastic member.

FIG. 13 illustrates a state (a) wherein the first and second bodies 1 and 2 are located at the unfolding position. The first and second guide pins 56-1*b* and 562*b* are located in the support parts 57-1*a* and 57-2*a*, and the first and second support portions 1*b* and 2*b* are supported by the first and second support arms 56-1 and 56-2 and are maintained at the support position. Accordingly, the flexible display 4 is supported by the first and second fixed portions 1*a* and 2*a*, the first and second support portions 1*b* and 2*b*, and a movable guide member 7 which will be explained below and is maintained flat.

In the state (a) of FIG. 13, when the first and second bodies 1 and 2 begin to fold, the first and second bodies 1 and 2 move away from the first and second hinge shafts 5*a*-1 and 5*a*-2 due to the path difference compensating unit. Until the first and second bodies 1 and 2 reach the receiving start position as in a state (b) of FIG. 13, since the first and second guide pins 56-1*b* and 56-2*b* are guided by the support parts 57-1*a* and 57-2*a*, the first and second support arms 56-1 and 56-2 are maintained at a position at which the first and second support arms 56-1 and 56-2 support the first and second support portions 1*b* and 2*b*.

When the first and second bodies 1 and 2 fold beyond the receiving start position, the first and second guide pins 56-1*b* and 56-2*b* are guided by the receiving parts 57-1*b* and 57-2*b*. The first and second support arms 56-1 and 56-2 pivot about the first and second pivot pins 56-1*a* and 56-2*a* away from the first and second support portions 1*b* and 2*b*. The first and second support portions 1*b* and 2*b* pivot away from a rear surface of the flexible display 4, and the receiving space 3 (see FIG. 3) begins to be formed in the first and second bodies 1 and 2. The first and second bodies 1 and 2 slide toward the first and second hinge shafts 5*a*-1 and 5*a*-2 due to the path difference compensating unit, and the third portion 4*c* of the flexible display 4 is moderately bent and is received in the receiving space 3.

When the first and second bodies 1 and 2 reach the folding position as in a state (c) of FIG. 13, the first and second support portions 1*b* and 2*b* reach the receiving position, and the receiving space 3 is formed in the first and second bodies 1 and 2 as shown in FIG. 3. The third portion 4*c* of the flexible display 4 forms the curved portion 4*d* and is received in the receiving space 3.

The first and second guide slots 57-1 and 57-2 are not limited to shapes in FIG. 13. Shapes of the first and second guide slots 57-1 and 57-2 may vary according to positions of the first and second pivot holes 5*c*-4*a* and 5*c*-4*b* relative to the first and second hinge shafts 5*a*-1 and 5*a*-2.

Figure 15:
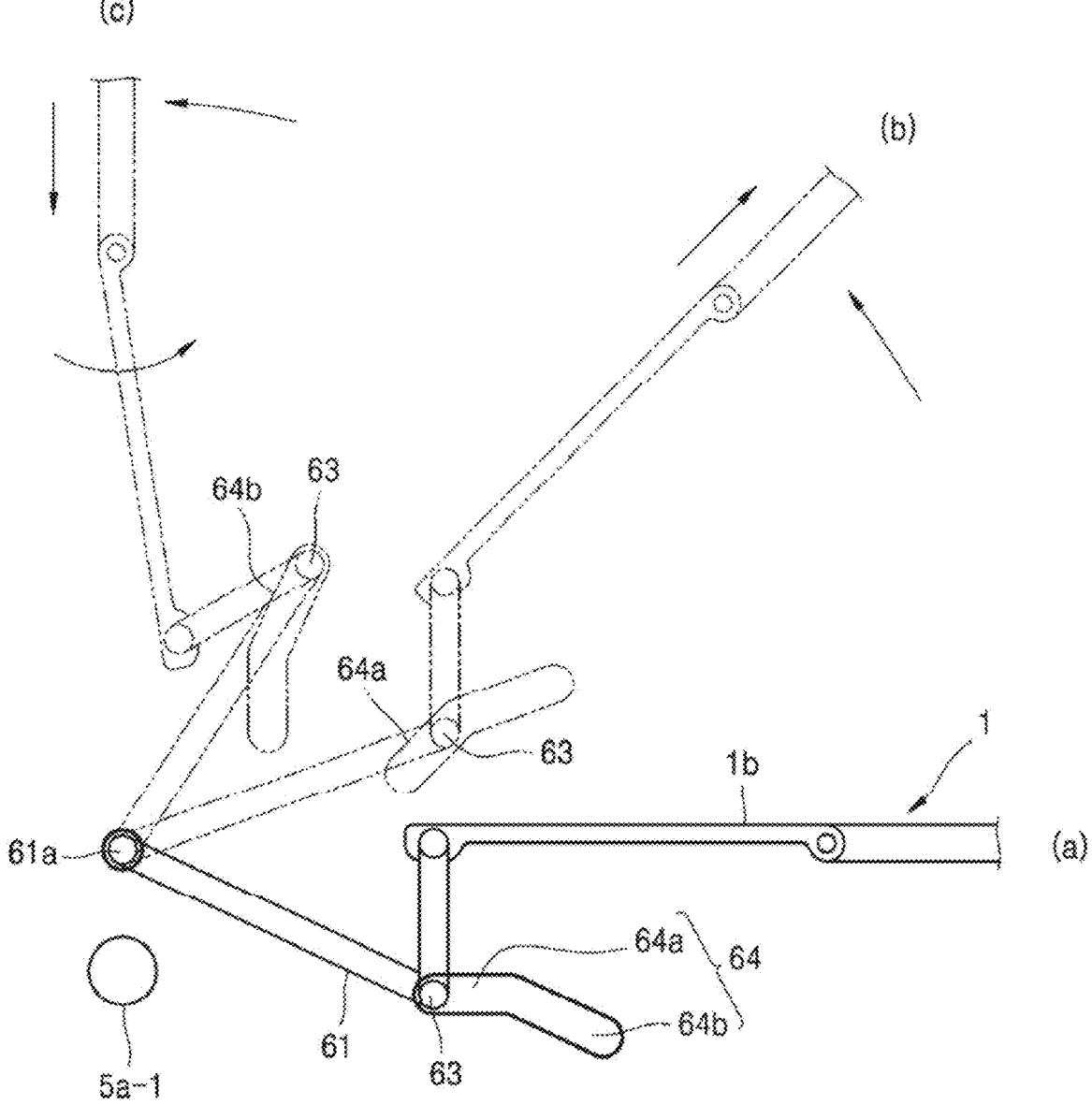
FIG. 15 is a schematic view of the restriction unit including two link arms according to an exemplary embodiment.

A structure of the restriction unit is not limited to that in FIGS. 13 and 14. The restriction unit according to an exemplary embodiment is shown in FIG. 15. The restriction unit of the present exemplary embodiment includes two link arms. Although only a mechanism that restricts the movement of the first support portion 1*b* is shown in FIG. 15, the same mechanism applies to a structure that restricts the movement of the second support portion 2*b*.

Referring to FIG. 15, first and second link arms 61 and 62 are illustrated. The first link arm 61 may pivot about a fixed position with respect to the first hinge shaft 5*a*-1. For example, the first link arm 61 may be pivotably supported on the fixed hinge 5-3. For example, a pivot pin 61*a* that is provided on one end portion of the first link arm 61 may be pivotably inserted into the first pivot hole 5c-4a of FIG. 14. One end portion of the second link arm 62 and the other end portion of the first link arm 61 are pivotably connected to each other by a guide pin 63. The other end portion of the second link arm 62 is pivotably connected to the first support portion 1b. The guide pin 63 is guided by a guide slot 64. The guide slot 64 may be formed in, for example, the first hinge frame 51-1. The guide slot 64 includes a support part 64a and a receiving part 64b. The support part 64a accommodates the guide pin 63 during a period when the foldable device moves from the unfolding position to the receiving start position. The receiving part 64b accommodates the guide pin 63 during a period when the foldable device moves from the receiving start position to the folding position.

In this configuration, the first and second link arms 61 and 62 and the first support portion 1b constitute a three-link (3-link) structure. In other words, in FIG. 13, the first and second support arms 56-1 and 56-2 respectively include the first and second link arms 61 and 62, and the first and second guide pins 56-1b and 56-2b pivotably connect the first and second link arms 61 and 62. The guide slot 64 is a modification of the first and second guide slots 57-1 and 57-2 of FIG. 13 in order to suit the 3-link structure.

FIG. 15 illustrates a state (a) wherein the first and second bodies 1 and 2 are located at the unfolding position. The guide pin 63 is located in the support part 64a and the first support portion 1b is maintained at the support position. In the state (a) of FIG. 15, when the first and second bodies 1 and 2 begin to fold, the first body 1 moves away from the first hinge shaft 5a-1 due to the path difference compensating unit. Until the first body 1 reaches the receiving start position as in a state (b) of FIG. 15, since the guide pin 63 is guided by the support part 64a, the first support portion 1b is maintained at the support position.

When the first and second bodies 1 and 2 fold beyond the receiving start position, the guide pin 63 is guided by the receiving part 64b. The first and second link arms 61 and 62 pull the first support portion 1b toward the receiving position, and thus the first support portion 1b pivots away from the rear surface of the flexible display 4 and the receiving space 3 (see FIG. 3) begins to be formed in the first and second bodies 1 and 2. The first body 1 slides toward the first hinge shaft 5a-1 due to the path difference compensating unit, and the third portion 4c of the flexible display 4 is moderately bent and is received in the receiving space 3.

When the first and second bodies 1 and 2 reach the folding position as shown in a state (c) of FIG. 15, the first support portions 1b and 2b reach the receiving position and the receiving space 3 is formed in the first and second bodies 1 and 2 as shown in FIG. 3. The third portion 4c of the flexible display 4 forms the curved portion 4d and is received in the receiving space 3.

Figure 16A:
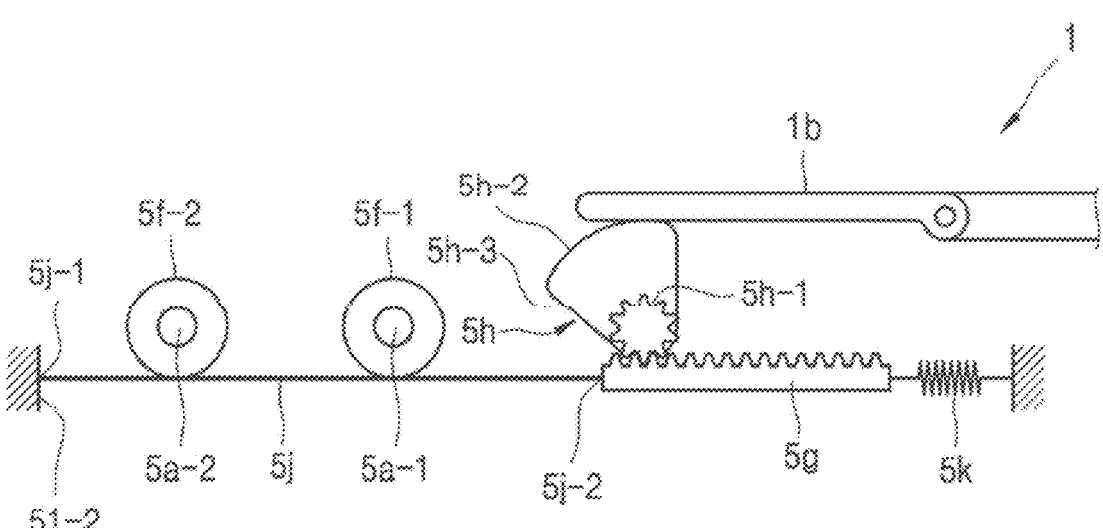
FIGS. 16A, 16B, and 16C are schematic views of the restriction unit according to another exemplary embodiment.
Figure 16B:
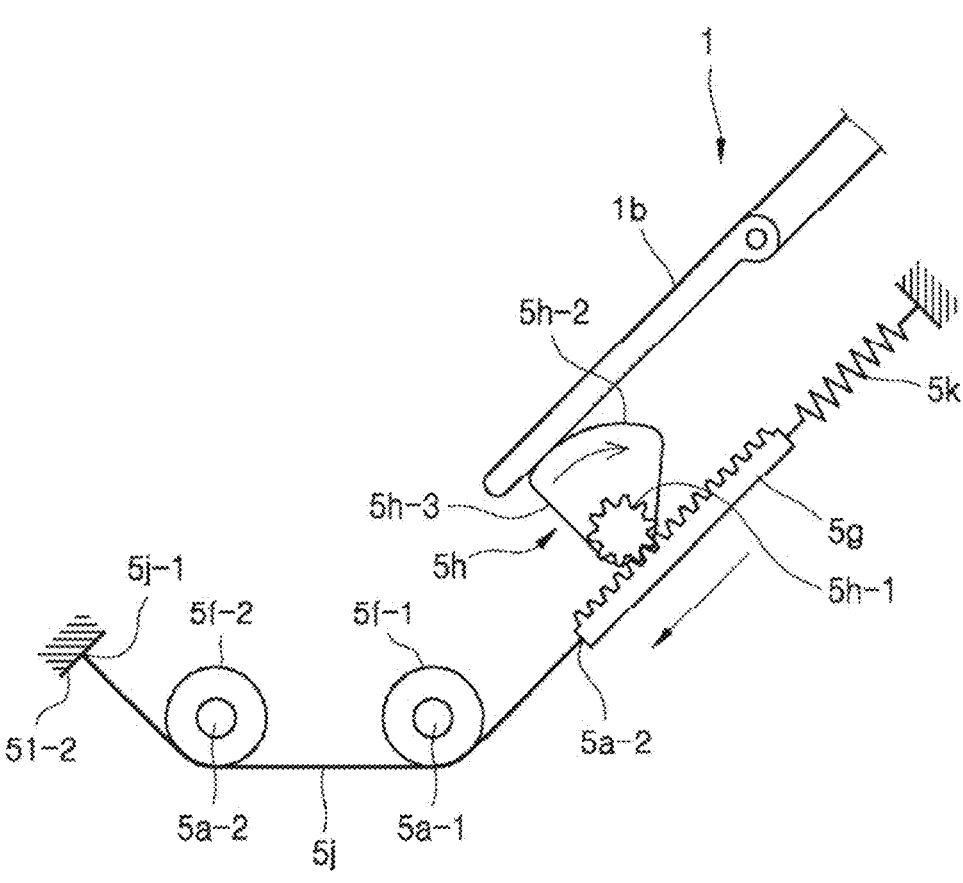
Figure 16C:
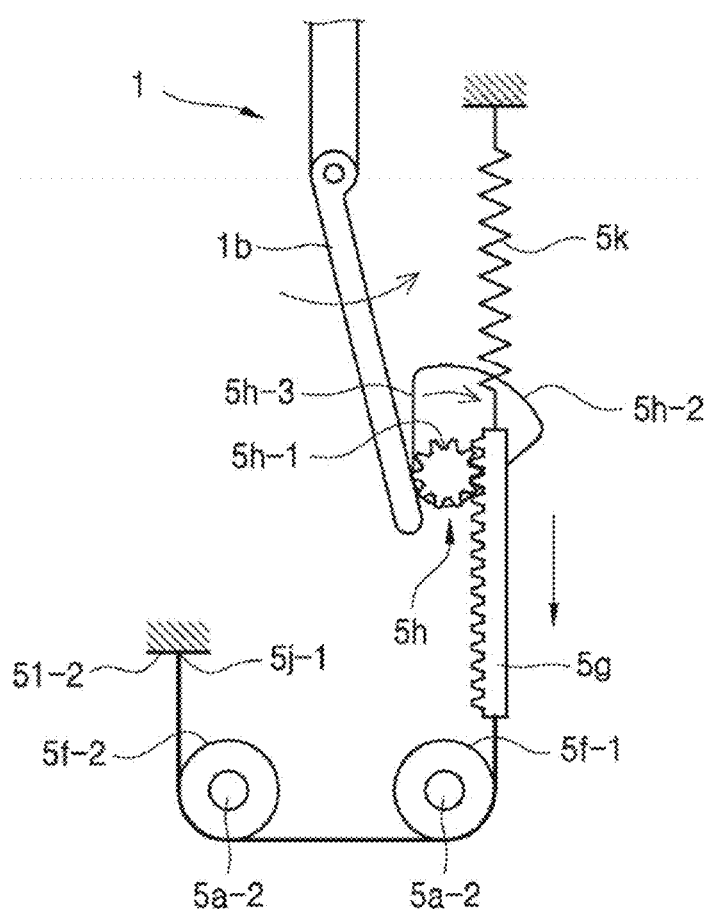

FIGS. 16A, 16B, and 16C are schematic views of the restriction unit according to another exemplary embodiment. Although a mechanism that moves the first support portion 1b between the support position and a receiving position is illustrated in FIGS. 16A, 16B, and 16C, the same mechanism applies to a structure that moves the second support portion 2b between the support position and the receiving position.

Referring to FIGS. 16A, 16B, and 16C, a connection member 5j is illustrated. The connection member 5j may be, for example, a wire. One end portion 5j-1 of the connection member 5j may be fixed to a fixed position with respect to the first hinge shaft 5a-1. The other end portion 5j-2 of the connection member 5j is connected to a rack gear 5g. The rack gear 5g may be slidably provided on, for example, the first hinge frame 51-1.

For example, the one end portion 5j-1 of the connection member 5j may be connected to the fixed hinge 5-3. A pulley 5f-1 is provided on the first hinge shaft 5a-1. The connection member 5j is in contact with the pulley 5f-1 and is wound around the pulley 5f-1 during a folding/unfolding process of the first and second bodies 1 and 2. When the connection member 5j is wound around the pulley 5f-1, a distance between a contact point between the connection member 5 and the pulley 5f-1 and the other end portion 5j-2 of the connection member 5 is changed, and the rack gear 5g slides.

When the one end portion 5j-1 of the connection member 5j is connected to the second hinge frame 51-2 and a pulley 5f-2 is provided on the second hinge shaft 5a-2, a sliding amount of the rack gear 5g may be increased by causing the connection member 5j to be wound around the pulleys 5f-1 and 5f-2 during a folding/unfolding process.

When the first and second bodies 1 and 2 unfold, a return spring 5k applies an elastic force to the rack gear 5g so that the rack gear 5g moves away from the first hinge shaft 5a-1.

The first support portion 1b is supported by a rotating cam 5h. A pinion gear 5h-1 that is engaged with the rack gear 5g is provided on the rotating cam 5h. Accordingly, as the rack gear 5g slides, the rotating cam 5h rotates. The rotating cam 5h includes a first cam path 5h-2 that has a constant distance from the center of rotation and a second cam path 5h-3 that has a reduced distance from the center of rotation. While the first support portion 1b is supported by the first cam path 5h-2, the first support portion 1b is maintained at the support position. When contact between the first support portion 1b and the first cam path 5h-2 ends, the first support portion 1b is supported by the second cam path 5h-3 and pivots to the receiving position.

FIG. 16A illustrates a state wherein the first and second bodies 1 and 2 are located at the unfolding position. The first support portion 1b is supported by the first cam path 5h-2 and is maintained at the support position.

In the state of FIG. 16A, when the first and second bodies 1 and 2 begin to fold, the connection member 5j begins to be wound around the first and second pulleys 5f-1 and 5f-2. Accordingly, the rack gear 5 slides toward the first hinge shaft 5a-1, and the rotating cam 5h rotates. Until the first and second bodies 1 and 2 reach the receiving start position as shown in FIG. 16B, since the first support portion 1b is guided by the first cam path 5h-2, the first support portion 1b is maintained at the support position.

When the first and second bodies 1 and 2 fold beyond the receiving start position, contact between the first cam path 5h-2 and the first support portion 1b ends and the first support portion 1b is supported by the second cam path 5h-3. Accordingly, the first support portion 1b pivots away from the rear surface of the flexible display 4 and the receiving space 3 (see FIG. 3) begins to be formed in the first and second bodies 1 and 2. The third portion 4c of the flexible display 4 is moderately bent and begins to be received in the receiving space 3.

When the first and second bodies 1 and 2 reach the folding position as shown in FIG. 16C, the first support portion 1b reaches the receiving position and the receiving space 3 is formed in the first and second bodies 1 and 2 as shown in FIG. 3. The third portion 4c of the flexible display 4 forms the curved portion 4d and is received in the receiving space 3.

The return spring 5*k* is connected to the rack gear 5*g* and applies a tensile force to the connection member 5*j* having a wire shape. Accordingly, when the first and second bodies 1 and 2 unfold, due to an elastic force of the return spring 5, the rack gear 5*g* slides in a direction that is opposite to a direction in which the rack gear 5*g* slides when the first and second bodies 1 and 2 fold, and the rotating cam 5*h* also rotates in an opposite direction. Accordingly, the first support portion 1*b* returns from the receiving position to the support position.

Assuming that a strip having bending elasticity is used as the connection member 5*j*, when the first and second bodies 1 and 2 unfold, the strip is spread due to elasticity and pushes the rack gear 5*g* in a direction that is opposite to a direction in which the rack gear 5*g* slides when the first and second bodies 1 and 2 fold. Accordingly, the return spring 5*k* may be omitted.

Referring back to FIG. 6, a cover member 8 surrounds an area between the first and second hinge units 5-1 and 5-2 so that a receiving space in the foldable device is prevented from being exposed to the outside. For example, the cover member 8 may include an extending portion 81 that extends along facing edges of the first and second hinge units 5-1 and 5-2 and side wall portions 82 that are located on both end portions of the extending portion 81. The cover member 8 is coupled to the hinge unit 5 by slightly opening outward the side wall portions 82 to surround the first and second gear portions 51-1*b* and 51-2*b*.

Referring back to FIGS. 6 and 7, the movable support member 7 including a support surface 71 on which the third portion 4*c* of the flexible display 4 is supported is illustrated. The movable support member 7 is located at a first position at which the movable support member 7 supports the third portion 4*c* of the flexible display 4 when the first and second bodies 1 and 2 are located at the unfolding position. The movable support member 7 supports the third portion 4*c* of the flexible display 4 between the first and second support portions 1*b* and 2*b*. When the first and second bodies 1 and 2 change to the folding position, the movable support member 7 is spaced apart from the third portion 4*c* of the flexible display 4 and is located at a second position at which the receiving space 3 for receiving the curved portion 4*d* is formed. That is, the movable support member 7 moves between the first position and the second position as the first and second bodies 1 and 2 change between the unfolding position and the folding position. As such, when the first and second bodies 1 and 2 are located at the unfolding position, the third portion 4*c* of the flexible display 4 may be supported by the movable support member 7 to be spread flat. As the foldable device changes from the folding position to the unfolding position and the movable support member 7 is raised from the second position to the first position, the movable support member 7 may adjacently support the third portion 4*c* of the flexible display 4. Accordingly, even when the foldable device is used at the inclined position having a predetermined angle, the movable support member 7 may stably support the third portion 4*c* of the flexible display 4 along with the first and second support portions 1*b* and 2*b*, thereby reducing distortion of a screen at the third portion 4*c*.

Figure 17:
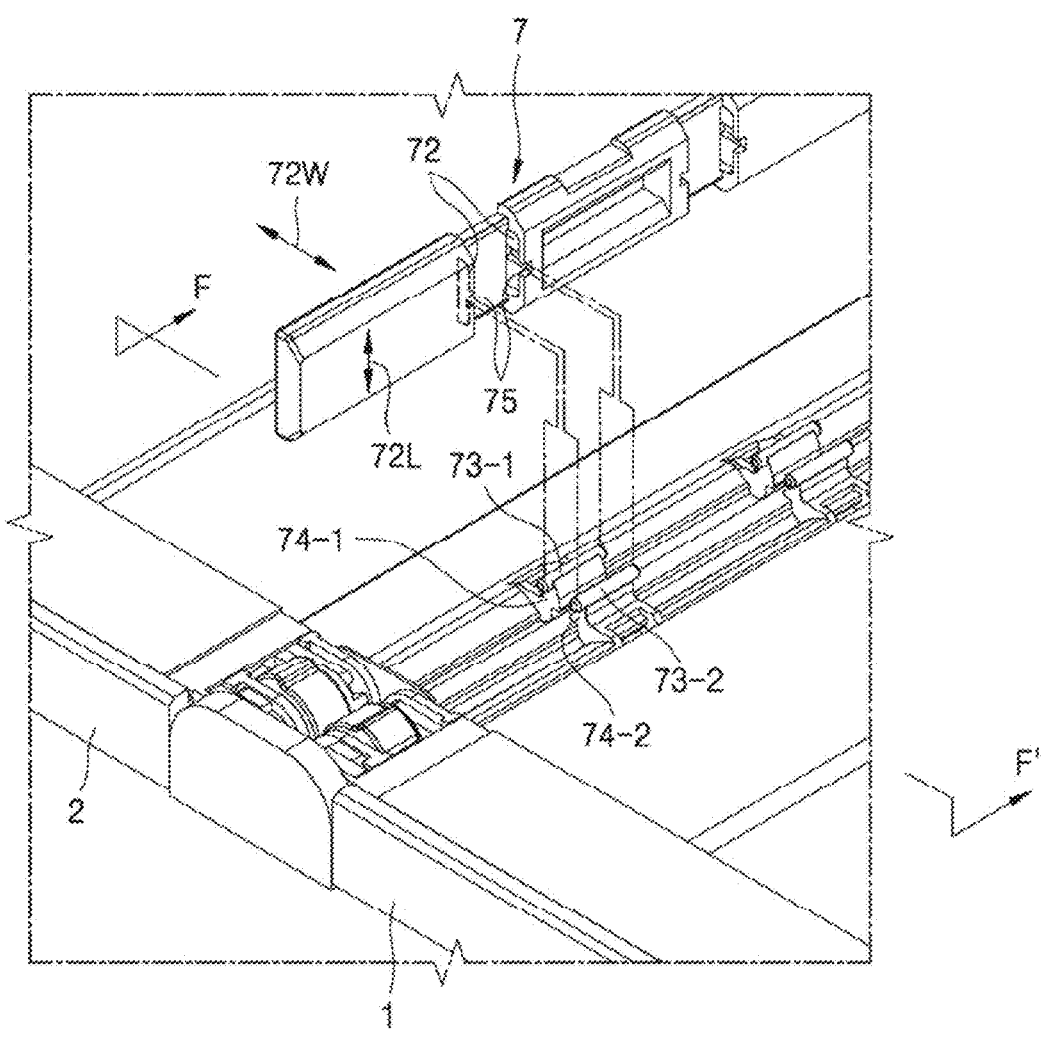
FIG. 17 is an exploded perspective view of a structure that moves a movable support member between a first position and a second position according to an exemplary embodiment.

FIG. 17 is an exploded perspective view of a structure that moves the movable support member 7 between the first position and the second position according to an exemplary embodiment. Referring to FIG. 17, slots 72 that extend in a folding/unfolding direction of the first and second bodies 1 and 2, that is, the longitudinal direction L, are formed in the movable support member 7. One pair of guide portions 73-1 and 73-2 that are inserted into the slots 72 are provided around facing edges of the first and second hinge units 5-1 and 5-2. For example, the guide portions 73-1 and 73-2 may be provided on upper ends of ribs 74-1 and 74-2 that respectively upwardly extend from the first and second hinge frames 51-1 and 51-2. Insertion grooves 75 are formed in the movable support member 7, and the guide portions 73-1 and 73-2 are inserted into the slots 72 through the insertion grooves 75. The insertion grooves 75 are formed at central portions of the slots 72 in a longitudinal direction 72L of the slots 72. While the first and second bodies 1 and 2 fold or unfold, the guide portions 73-1 and 73-1 move in the longitudinal direction 72L of the slots 72 and a movement path of the guide portions 73-1 and 73-2 does not overlap the insertion grooves 75. Accordingly, while the guide portions 73-1 and 73-2 are inserted into the slots 72 and then the movable support member 7 is raised and lowered, the guide portions 73-1 and 73-2 are not separated from the slots 72 through the insertion grooves 75.

Figure 18A:
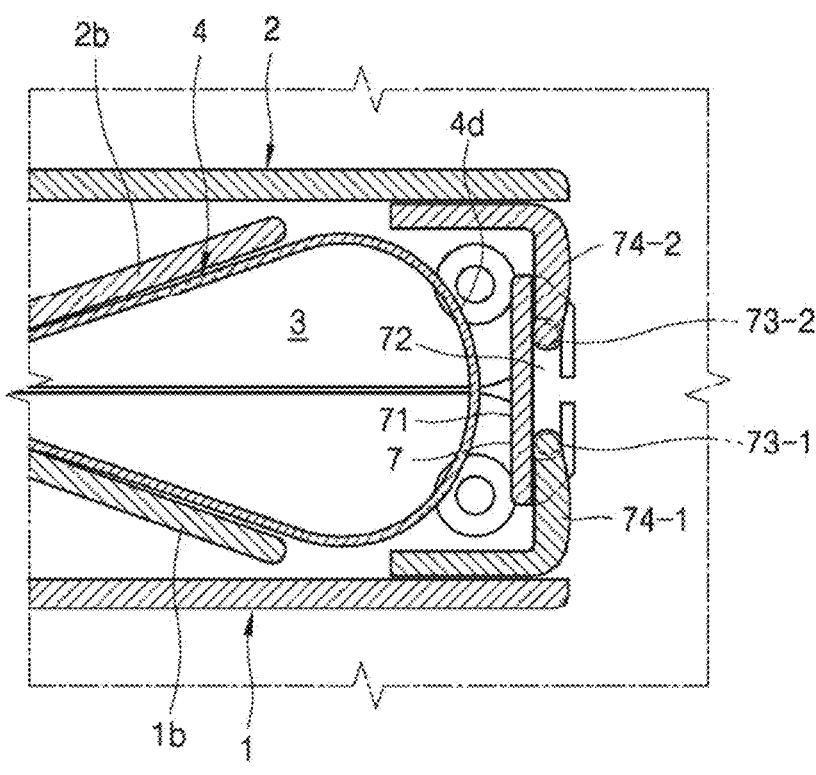
FIGS. 18A and 18B are cross-sectional views taken along line F-F' of FIG. 17, respectively illustrating a state wherein the movable support member is located at the second position and a state wherein the movable support member is located at the first position.
Figure 18B:
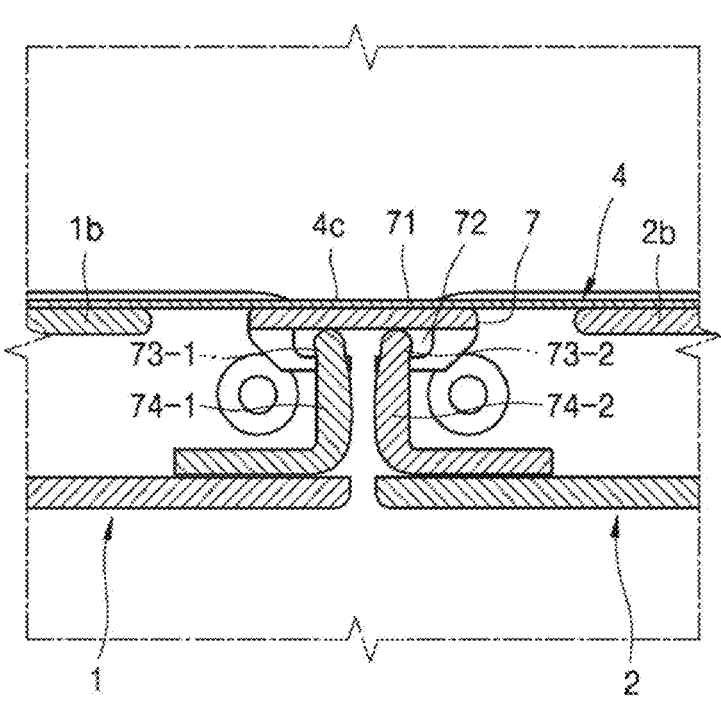

FIGS. 18A and 18B are cross-sectional views taken along line F-F' of FIG. 17, respectively illustrating a state wherein the movable support member 7 is located at the second position and a state wherein the movable support member 7 is located at the first position. Referring to FIG. 18A, the first and second bodies 1 and 2 are located at the folding position. The guide portions 73-1 and 73-2 are located at a farthest position from each other, and the movable support member 7 is located at the second position. The curved portion 4*d* of the flexible display 4 is received in the receiving space 3 that is formed due to the first and second support portions 1*b* and 2*b* and the movable support member 7.

When the first and second bodies 1 and 2 unfold in the state of FIG. 18A, the guide portions 73-1 and 73-2 slide in the slots 72 to move toward each other, and the movable support member 7 is raised toward the flexible display 4 and continuously adjacently supports the third portion 4*c* of the flexible display 4. Accordingly, even when the foldable device is used at the inclined position, the third portion 4*c* of the flexible display 4 may be stably supported by the first and second fixed portions 1*a* and 2*a*, the first and second support portions 1*b* and 2*b*, and the support surface 71 of the movable support member 7.

When the first and second bodies 1 and 2 are completely unfolded as shown in FIG. 18B, the movable support member 7 is located at the first position and the third portion 4*c* of the flexible display 4 is stably supported by the support surface 71.

The guide portions 73-1 and 73-2 and the slots 72 may be provided at two or more places in the width direction W of the foldable device in order for the movable support member 7 not to be inclined when being raised and lowered between the first and second positions.

The movement of the guide portions 73-1 and 73-2 in a width direction 72W of the slots 72 is restricted and the movement of the guide portions 73-1 and 73-2 in the longitudinal direction 72L of the slots 72 is allowed. That is, the vertical movement of the movable support member 7 is restricted by the guide portions 73-1 and 73-2. Accordingly, the movable support member 7 may be stably vertically raised and lowered without being shaken. Also, even when the first and second bodies 1 and 2 are located at the unfolding position, the support surface 71 of the movable support member 7 may not be inclined and may stably support flat the third portion 4*c* of the flexible display 4.

Hereinafter, the structure of a foldable device 20 according to another exemplary embodiment will be described in great detail.

Figure 19:
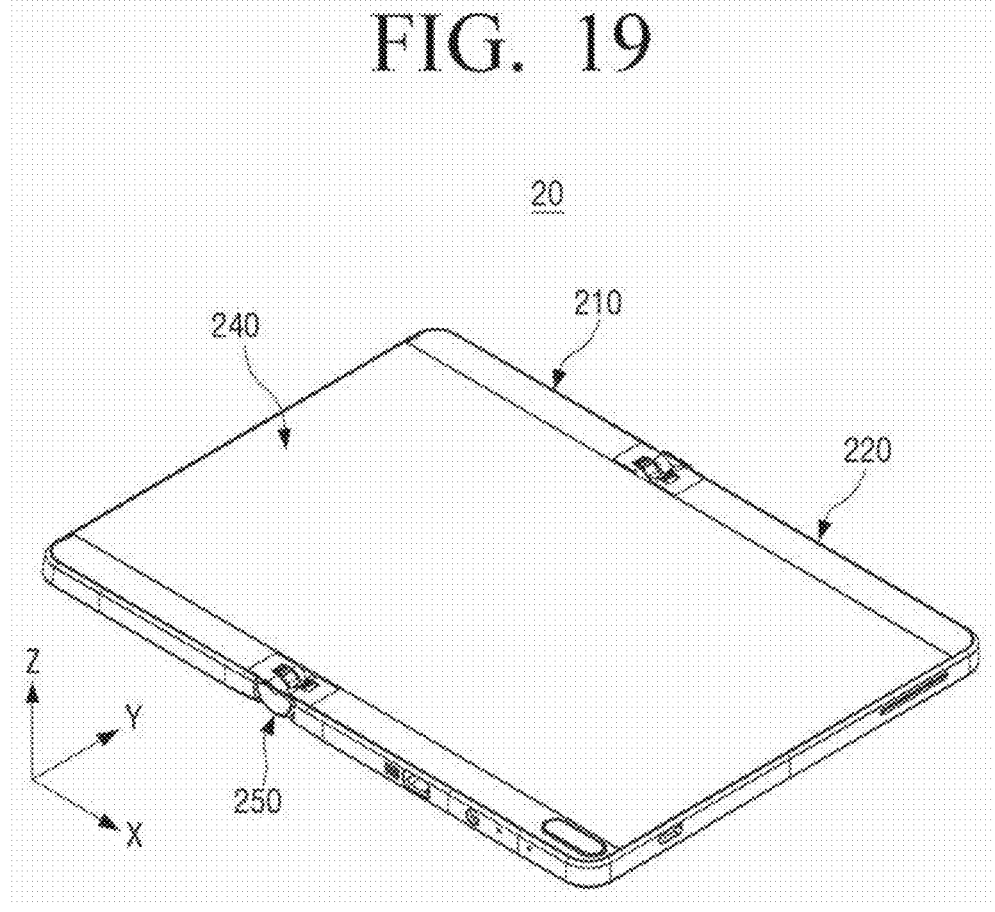
FIG. 19 is a perspective view of an unfolding state of the foldable device according to another exemplary embodiment.
Figure 20:
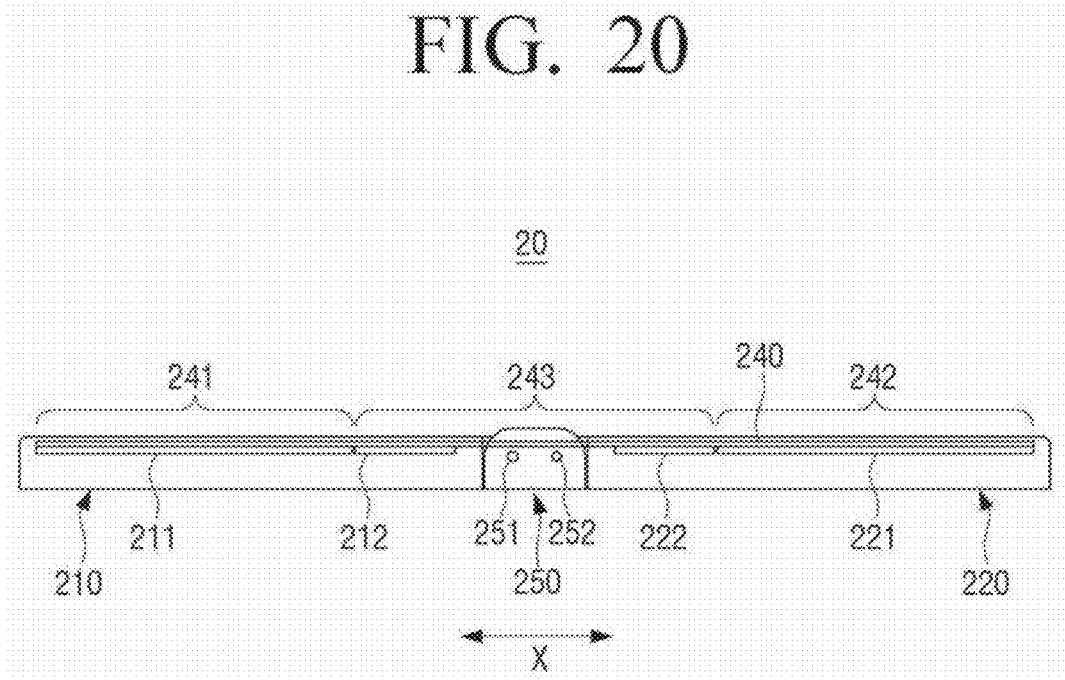
FIG. 20 is a schematic side view of a relationship between a flexible display and a fixed position of a main body in the foldable device according to another exemplary embodiment.

FIG. 19 is a perspective view indicating an unfolding state of the foldable device 20 according to another exemplary embodiment. FIG. 20 is a side sectional view which schematically illustrates a relation between the flexible display and a fixed portion of the body in the foldable device 20, and FIG. 21 is a side sectional view which schematically indicates a state of folding of the foldable device 20 of FIG. 20.

Figure 21:
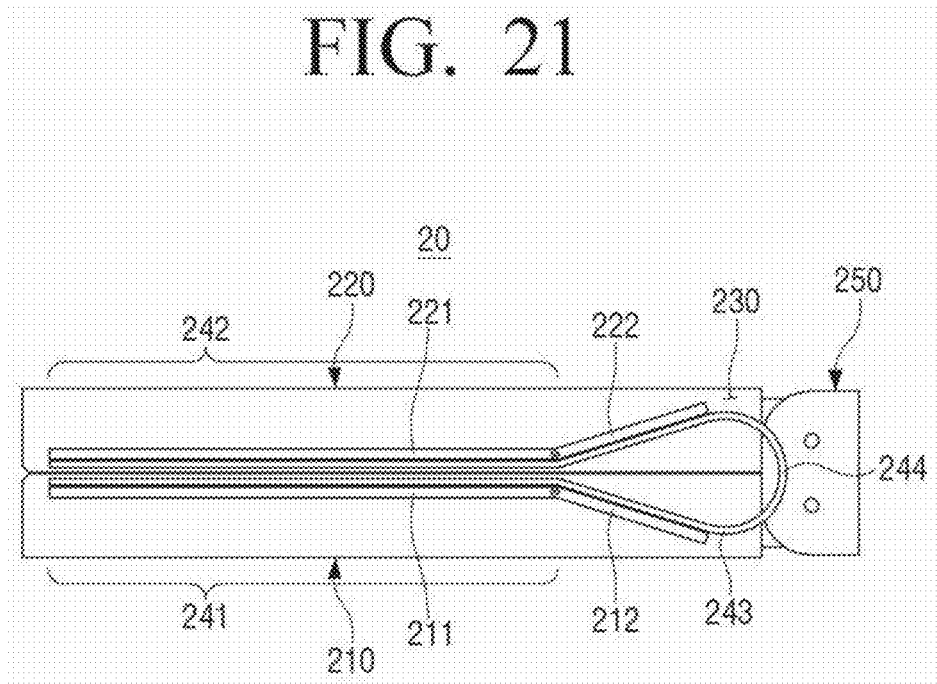
FIG. 21 is a schematic side view of a folding state of the foldable device of FIG.

Referring to FIGS. 19-21, the foldable device 20 according to another exemplary embodiment may include a first body 210, a second body 220, and a flexible display 240.

The first body 210 and the second body 220 are interconnected and integrated into one body, an as illustrated in FIGS. 19 and 20. The first body 210 and the second body 220 may be unfolded or folded as illustrated in FIG. 21. The first body 210 and the second body 220 may have a rectangular shape and an upper surface of the first body 210 and the second body 220 may fix or support the flexible display 240. Inside the first body and the second body 210, 220, a printed circuit board where various electronic parts are mounted can be installed to realize the functions of the foldable device 20.

The flexible display 240 may include a flexible display panel which displays an image and a transparent protection sheet which is installed on a front surface of the flexible display panel. For example, the flexible display panel may use an Organic Light Emitting Diode (OLED) panel. In addition, the flexible display 240 may further include a touch panel as an input means. For example, a touch panel can be disposed between a transparent protection sheet and a flexible display panel. In addition, the flexible display 240 may further include various optical panels or films.

A part of the flexible display 240 is fixed to the first body 210, and another part is fixed to the second body 220. Therefore, the flexible display 240 may be divided into the first portion 241 which is fixed to the first body 210, the second portion 242 fixed to the second body 220, and a third portion 243 between the first body 210 and the second body 220.

The first body 210 includes a first fixing portion 211 where the first portion 241 of the flexible display is fixed, and a second fixing portion 221 where the second portion 242 is fixed. The first portion 241 and the second portion 242 of the flexible display 240 are fixed to the first fixing portion 211 and the second fixing portion 221, respectively, by fixing members such as adhesive, both-sided tape. The first fixing portion 211 of the first body 210 constitutes the first support portion which supports the first portion 241 of the flexible display 240, and the second fixing portion 221 of the second body 220 constitutes the second support portion which supports the second portion 242 of the flexible display 240.

The third portion 243 of the flexible display 240 may be changed according to a relative position of the first body 210 and the second body 220. For example, the third portion 243 may not to be fixed to the first body 210 or the second body 220. As another example, a part of the third portion 243 of the flexible display 240 may be fixed to a part of the first body 210 and the second body 220. The third portion 243 is supported by the third supporting unit of the flexible display 240.

As illustrated in FIG. 21, when the first body 210 and the second body 220 are in a folded state, the third portion 243 of the flexible display 240 forms the curved portion 244 having a predetermined curvature. Therefore, when the first body 210 and the second body 220 are folded, the third portion 243 of the flexible display 240 is not folded to be angular, and the third portion 243 forms the curved portion 244 that has a curved shape.

In the folded state, the curved third portion 243 of the flexible display 240 is accommodated in the foldable device 20, and a receiving space 230 is provided inside the first body 210 and the second body 220. To be specific, while the foldable device 20 is folded, the first portion 241 and the second portion 242 of the flexible display 240 are located to be adjacent to each other or in contact with each other, and the third portion 243 is bent toward inside the first body 210 and the second body 220 and is accommodated in the receiving space 230 in a droplet shape.

A hinge unit 250 is provided between the first body 210 and the second body 220, and the first body 210 and the second body 220 are connected pivotably to the hinge unit 250. Therefore, the first body 210 and the second body 220 may be changed to a folding position that the first body 210 and the second body 220 are in contact with each other centering on the hinge unit 250, and an unfolding position that the first body 210 and the second body 220 are spaced apart from each other to form one plane. In other words, the hinge unit 250 allows the first support portion 211 and the second support portion 221 to pivot around a third support portion including the first and second support wings 121 and 222, to change the state of the flexible display 240 from an open state to a closed state or from the closed state to the open state.

As an example, the hinge unit 250 may include two hinge axes 251 and 252 which are spaced apart from each other in a length direction (X direction). The first and second bodies 210 and 220 may rotate with respect to the first and second hinge axes 251 and 252 and may change to an unfolding position and a folding position.

The flexible display 240 may not be folded with angles due to its characteristics, and when the flexible display 240 is folded, a curved portion 244 having predetermined curvature is formed on a folded part. The foldable device 20 using the flexible display 240, when the first and second bodies 210, 220 are folded from unfolded state or vice versa, may have a phase difference between the flexible display 240 and the first and second bodies 210 and 220. Here, the phase difference indicates that length of the flexible display 240 in a folded state is shorter than length of the first and second bodies 210, 220 in a folded state. Such phase difference occurs as the flexible display 240 may not be folded with angles.

In order to compensate such phase difference, the foldable device 20 may include a phase difference compensation unit. The phase difference compensation unit may move at least one of the first and second bodies 210 and 220 in a direction away from the hinge axis 251 or 252 when the state of the at least one of the first and second bodies 210 and 220 changes from the unfolded state to another position, and may move at least one of the first and second bodies 210 and 220 in a direction closer to the hinge axis 251 or 252.

The foldable device 20 may be a portable mobile device such as a communication terminal, a game device, a multimedia device, a portable computer, and a photographing device. In addition, the foldable device 20 may implemented with any device including the first body 210 in which the first portion 241 of the flexible display 240 is fixed, and the second body 220 in which the second portion 242 of the flexible display 240 is fixed, so that the flexible device 340 is foldable with respect to the first body 210.

The first and second bodies 210, 220 may include a processing unit to perform functions according to a use of the foldable device 20, input/output means, and power unit. When the foldable device 20 is a multimedia terminal from which a user may appreciate a video and music, the processing unit may include an image information processor and a sound information processor. When the foldable device 20 is a communication terminal, the processing unit may include a communication module. The input/output means may include a video inputter/outputter, a sound inputter/outputter, and a manipulator for user manipulation. The manipulator may be realized by a touch panel integrated to the flexible display 240.

Figure 22:
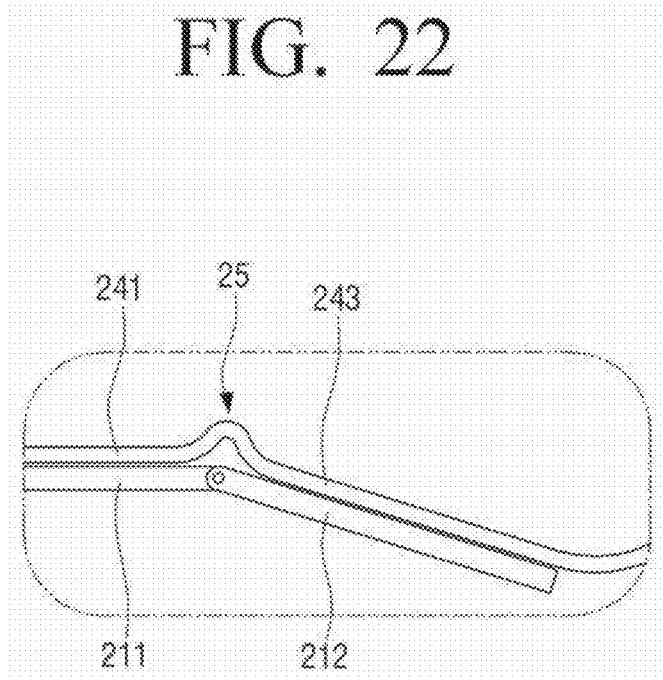
FIG. 22 is a view of a case where operation of the flexible display supported by the supporting wings in the foldable device is not restricted.

The first and second bodies 210 and 220 of the foldable device 20 may be positioned in a folded state as illustrated in FIG. 21. In particular, the third portion 243 of the flexible display 240 may form a curved portion 244 in a droplet shape. However, if movement of a third portion 243 of the flexible display 240 which is supported by the first and second support wings 212 and 222 is not restricted while the first body 210 and the second body 220 are being folded, a part of the third portion 243 which is connected to the first portion 241 and the second portion 242 of the flexible display 240 is not smoothly bent according to the first and second support wings 212 and 222 as illustrated in FIG. 21, but as in FIG. 22, it may be disposed apart from the first and second support wings 212, 222, protrude upward, and may be distorted in a wave shape. If such phenomenon occurs due to the distorted part 25, life of the flexible display 240 may decrease. Here, FIG. 22 is a view to explain a phenomenon that, when movement of the flexible display 240 supported by the first support wing 212 is not additionally controlled, the part 25 of the flexible display is distorted. Though not illustrated in FIG. 22, the part 25 of the third portion 243 of the flexible display 240 supported by the second support wing 222 is distorted in the same manner as in FIG. 22.

Therefore, in order to overcome the above problem, when the first body 210 and the second body 220 are folded, there may be a display restriction member to restrict operations of the flexible display 240.

Figure 23:
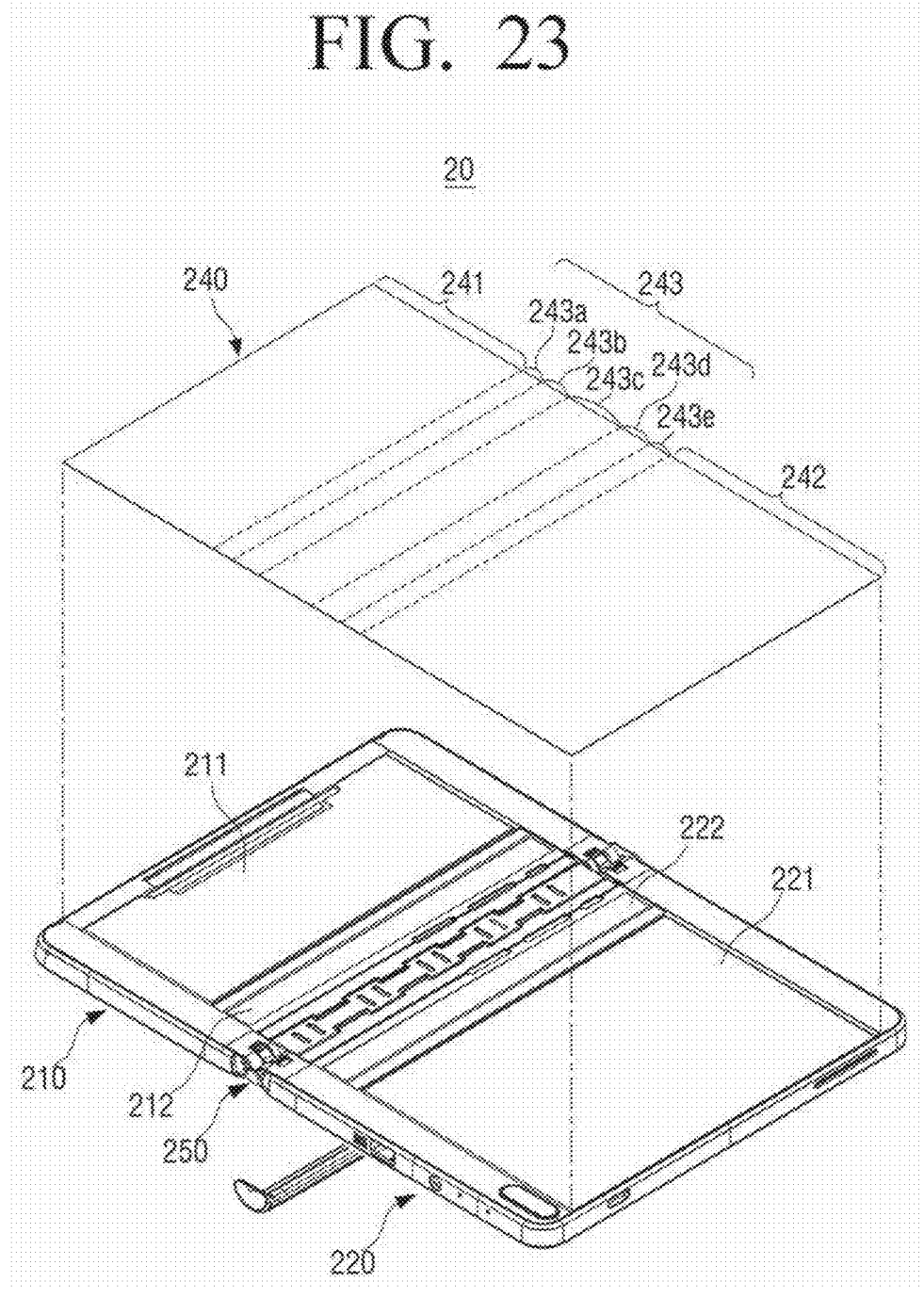
FIG. 23 is an exploded perspective view of a state where the flexible display is separated from the foldable device according to another exemplary embodiment.
Figure 24:
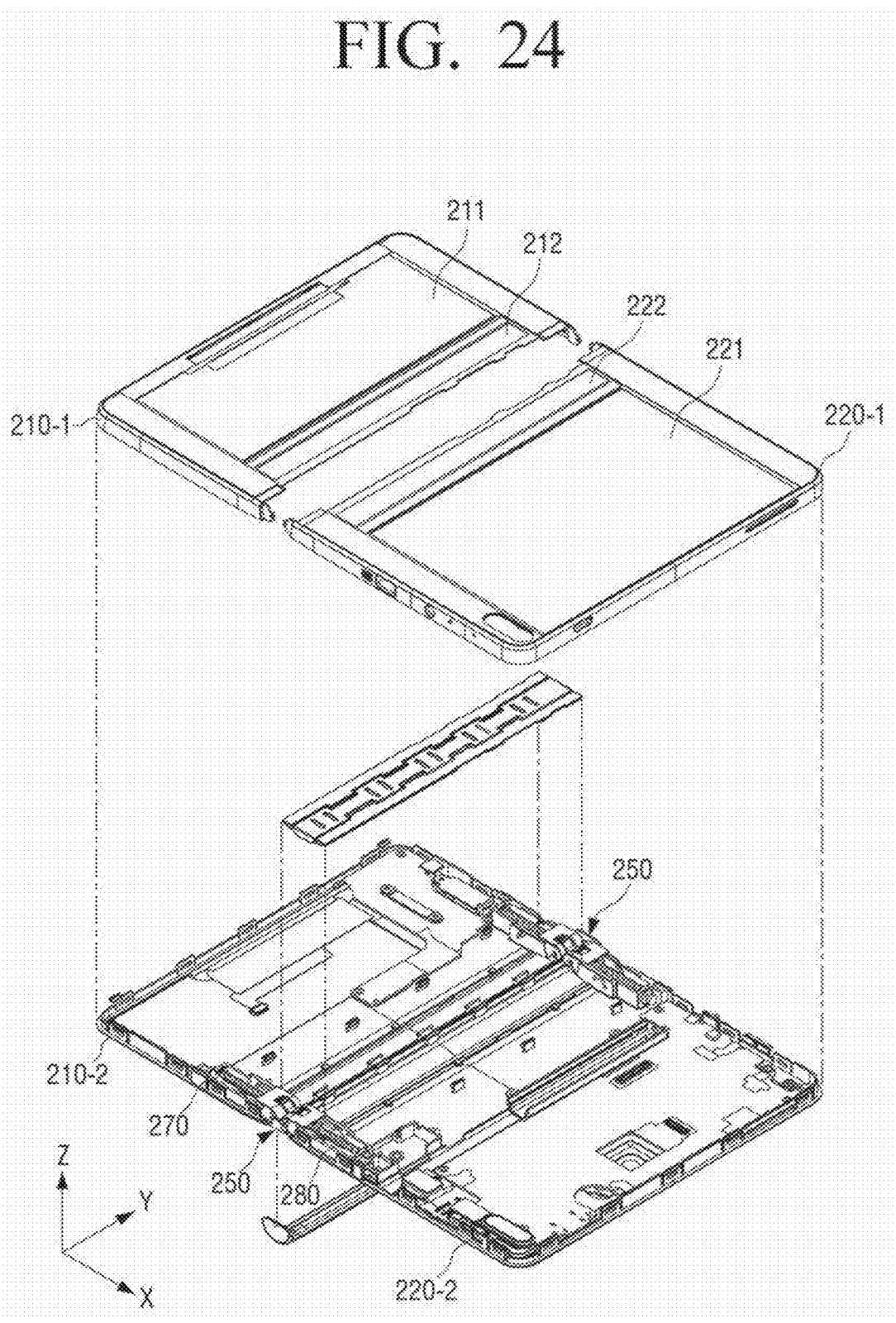
FIG. 24 is an exploded perspective view of a state where the support portion is disassembled from the foldable device of FIG. 23.
Figure 26:
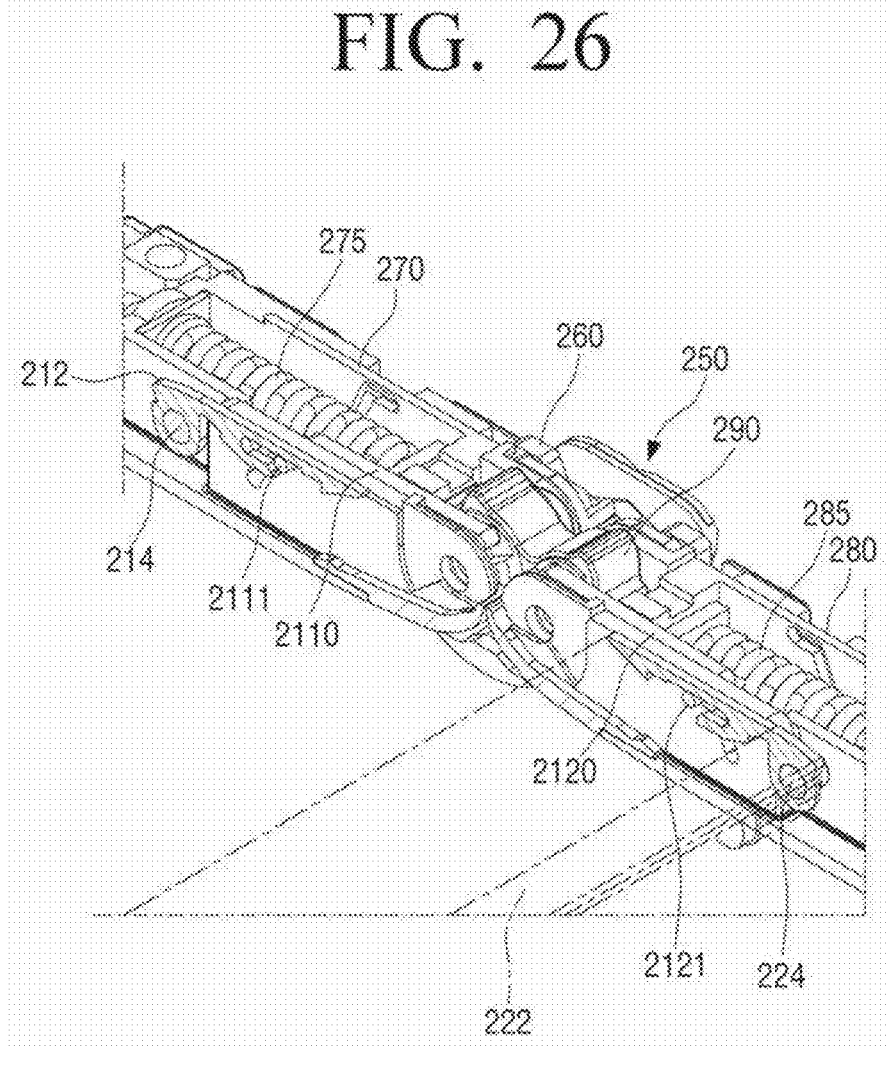
FIG. 26 is a partial perspective view of a relation between the hinge unit and the support wing in the foldable device according to another exemplary embodiment.

FIG. 23 is an exploded perspective view indicating a flexible display from a foldable device according to another exemplary embodiment. FIG. 24 is an exploded perspective view indicating a state where a support portion is divided from the foldable device, and FIG. 23 is an exploded perspective view of a hinge unit used for the foldable device of FIG. 23. The hinge unit is symmetrical in left and right directions in a width direction (Y direction) of the foldable device, and FIG. 23 illustrates the hinge unit of one side. FIG. 26 is an exploded perspective view indicating a relation between the hinge unit and the support wings in the foldable device according to another exemplary embodiment.

Referring to FIGS. 23-26, the foldable device 20 according to anther exemplary embodiment includes the first body 210, the second body 220, the hinge unit 230, and the flexible display 240.

The first body 210 includes a first upper case 210-1 and a first lower case 210-2. The first upper case 210-1 includes the first fixed portion 211 and the first support wings 212. To the first fixed portion 211, the first portion 241 of the flexible display 240 is fixed. In the first fixed portion 211, a stopper 213 which restricts rotation of the first support wing 212 may be installed at a lower part of the first support wing 212. In the present exemplary embodiment, the stopper 213 has a triangular prism shape.

Figure 27:
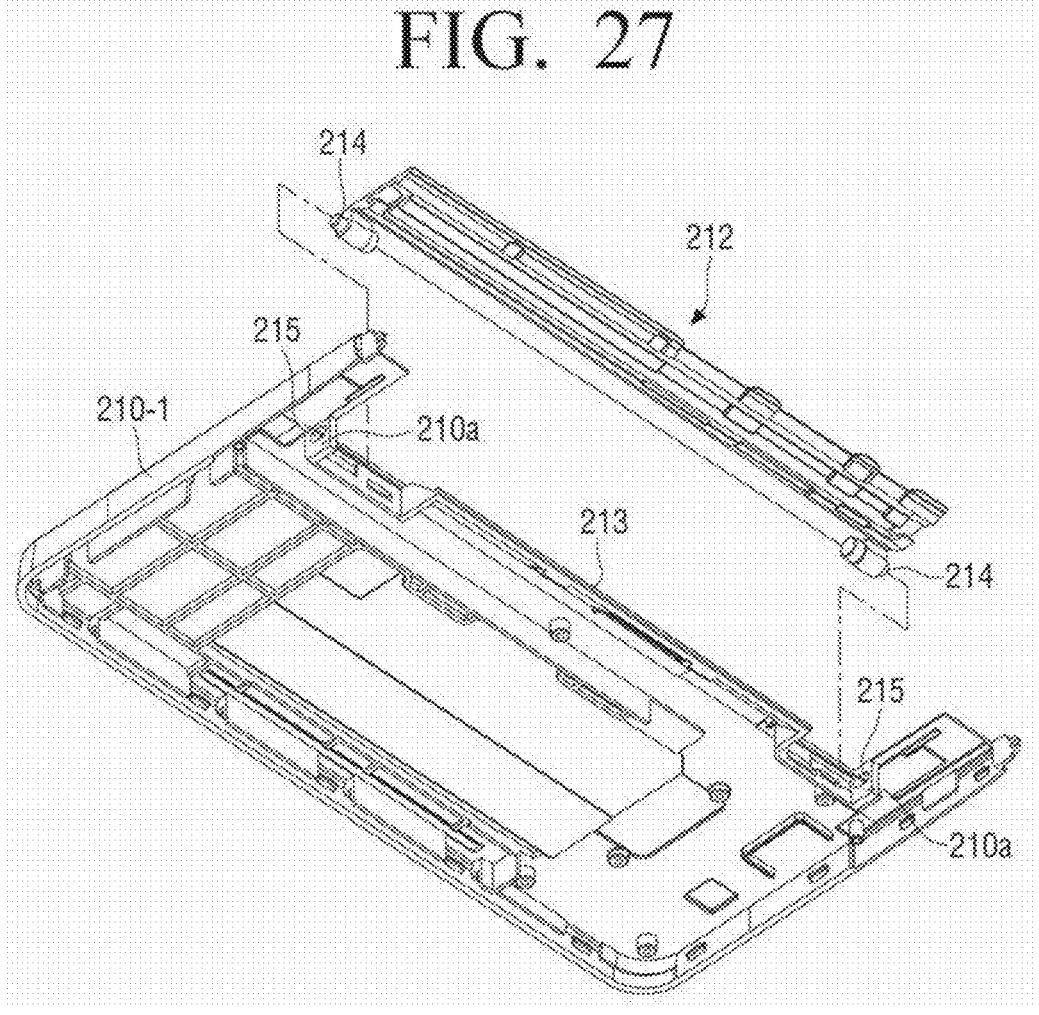
FIG. 27 is an exploded rear perspective view of supporting wings separated from the first body of the foldable device according to another exemplary embodiment.

The first support wing 212 is installed at one side of the first fixed portion 211 to be parallel with the first fixed portion 211, and rotates at a predetermined angle with respect to the first fixed portion 211. The first support wing 212 is formed to be a rectangular shape plate, and at a lower part of one side which is adjacent to the first fixed portion 211, a pair of rotation axis 214 is provided. In addition, the pair of rotation axis 214, as illustrated in FIG. 27, protrudes at both sides in a width direction of the first support wing 212 as illustrated in FIG. 27. The first support wing 212 constitutes the third support part which supports the third portion 243 of the flexible display 240.

At an upper surface of the first support wing 212, a part of the third portion 243 of the flexible display 240 is attached by a fixing member 216 and is fixed. As the fixing member 216, both-sided tape and an adhesive may be used. An area (hereinafter, a first connection part 243a) which is connected to the first portion 241 from among the third portion 243 of the flexible display 240 is not fixed to the first support wing 212 and is placed apart from it. In addition, an area 243b supported by the first support wing 212 from among the third portion 243 of the flexible display 240 is fixed to an upper surface of the first support wing 212. Accordingly, when the first support wing 212 rotates, the third portion 243 of the flexible display 240 may rotate with the first support wing 212 in an integrated manner.

FIG. 27 is an exploded rear perspective view indicating the first support wing 212 separated from the first body 210 of the foldable device 20 according to another exemplary embodiment.

Referring to FIG. 27, at an inner wall 210a of the first upper case 210-1 of the first body 210, a slot hole 215 where the rotation axis 214 of the first support wing 212 is inserted is provided at a place adjacent to the first fixing part 211. In the first upper case 210-1, there is a pair of slot holes 215 that corresponds to a pair of rotation axis 214 of the first support wing 212. The slot hole 215 is in a linear shape and has a length which is bigger than a radius of the rotation axis 214. Therefore, when the first support wing 212 is inclined downward in a horizontal state, the first support wing 212 may move as much as the difference between the length of the slot hole 215 and the diameter of the rotation axis 214 with respect to the first body 210 and thus, by phase difference between the first support wing 212 and the flexible display 240, stress applied to the flexible display 240 may be absorbed.

The first lower case 210-2 is combined with the first upper case 210-1 and constitutes the first body 210. When space is formed between the first lower case 210-2 and the first upper case 210-1, there may be a printed circuit board to embody a processing unit, input/output means, communication means, and a power unit so that the foldable device 20 may perform a function according to uses.

As shown in FIG. 24, the second body 220 includes the second upper case 220-1 and the second lower case 220-2. The second upper case 220-1 includes the second fixed portion 221 and the second support wing 222. The structure of the second fixed portion 221 and the second support wing 222 of the body 220 is the same as the first fixed portion 211 and the first support wing 212 and thus, the detailed explanation will be omitted. Therefore, in the second upper case 220-1 of the second body 220, a pair of slot holes 225 is provided to which a pair of rotation axis 224 of the second support wing 222 is inserted. The second support wing 222 constitutes the third support portion which supports the third portion 243 of the flexible display 240. Therefore, the third support portion may be composed of the first support wing 212 and the second support wing 222.

At an upper surface of the second support wing 222, a part of the third portion 243 of the flexible display 240 is fixed by a fixing member and is attached. As the fixing member, a both-sided tape and an adhesive may be used. At this time, from among the third portion 243 of the flexible display 240, a part of an area (hereinafter, the second connection part) which is connected to the second portion 242 is not fixed to the second support wing 222, but is separated. In addition, from among the third portion 243 of the flexible display 240, a part 243d which is supported by the second support wing 222 is fixed to an upper surface of the second support wing 222. Therefore, when the second wing 222 rotates, the third portion of the flexible display 240 may be rotated in an integrated manner with the second wing 222. A central part 243c of the third portion 243 of the flexible display 240 is not fixed to the first and second support wings 212, 222 and is spaced apart from it. The central part 243c of the third portion 243 of the flexible display 240 may be supported by a central support member to be described later. Therefore, the third support part which supports the third portion 243 of the flexible display 240 may include the first support wing 212, the second support wing 222, and the central support member.

The hinge unit 250 is installed between the first body 210 and the second body 220, and may convert from an unfolded state of the first body 210 and the second body 220 to a folded state, or from the folded state to the unfolded state. In addition, the hinge unit 250, when the first body 210 and the second body 220 rotate between an unfolding position and a folding position, is formed so that the first support wing 212 and the second support wing 222 are operable in association with each other. That is, when the flexible display 240 installed on a body is changed from an open state to a closed state by the hinge unit 250, or from the closed state to the open state, the first support wing 212 of the third support part rotates with respect to the first support part 211, and the second support wing 222 of the third support part rotates with respect to the second support part 221. The third support part rotating with respect to the first support part and second support parts 211, 221 may be seen as the first and second support parts 211, 221 rotating with respect to the third support part.

Figure 25:
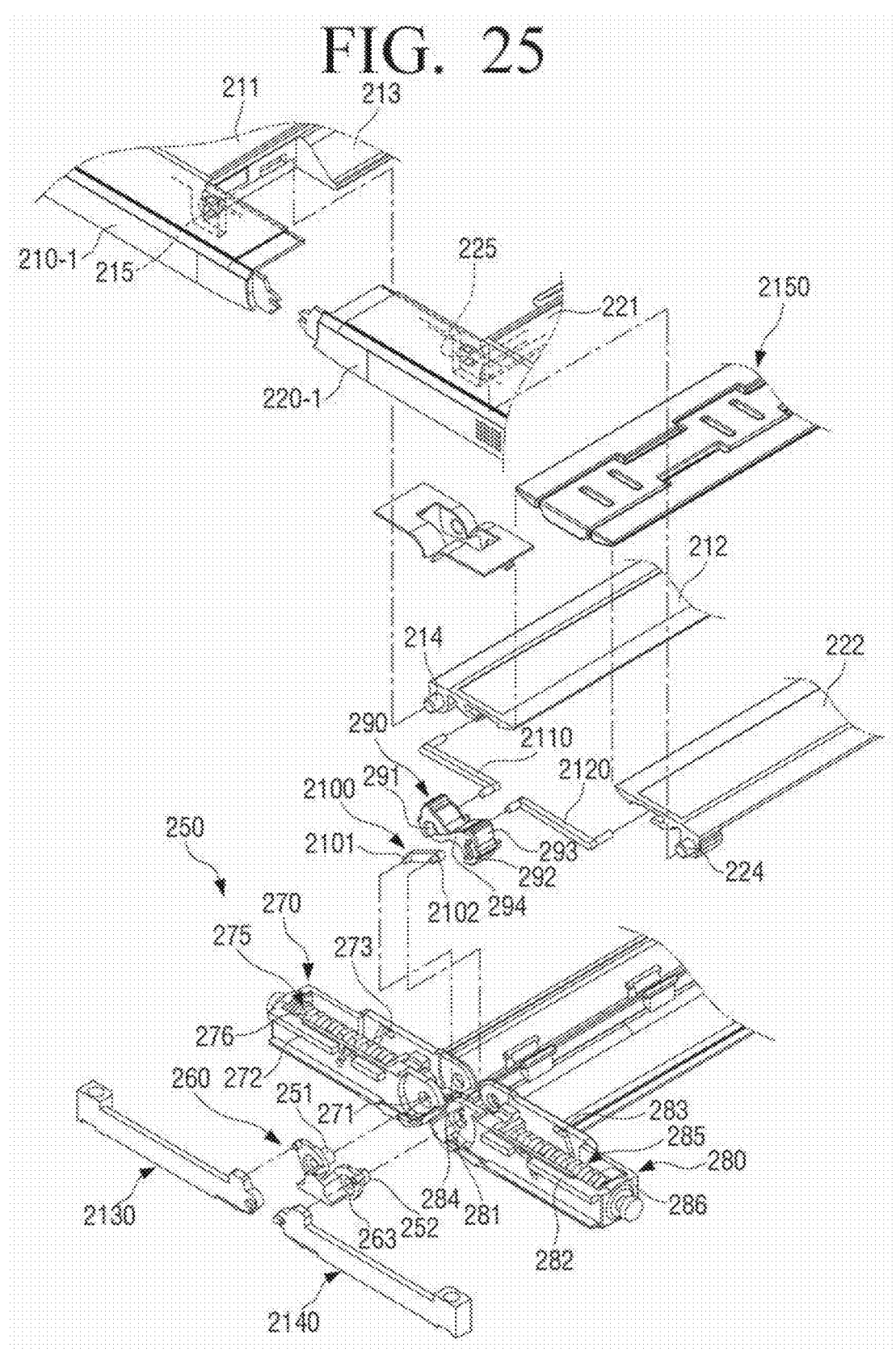
FIG. 25 is an exploded perspective view of a hinge unit used for the foldable device of FIG. 23.

Referring to FIGS. 24, 25, and 26, the hinge unit 250 may include a fixing hinge 260, first and second hinge frames 270 and 280, a locking member 290, an interlocking bar 2100, first and second support arms 2110 and 2120, first and second moving members 2130 and 2140.

The fixing hinge 260 includes the first hinge axis 251 and the second hinge axis 252 which are arranged in parallel to each other. The first and second hinge axes 251 and 252 become rotation standard in a case where the first and second bodies 210, 220 are changed from an unfolded state to a folded state or in a reverse case. At an opposite side of the hinge plate 263 where the first and second hinge axes 251 and 252 are installed, the first and second reference pins 261, 262 are installed. At this time, the first and second reference pins 261, 262 are formed so that a position relation with respect to the first and second hinge axes 251 and 252 does not change.

The first hinge frame 270 is rotatably coupled to the first hinge axis 251 of the fixing hinge 260. At an end of the first hinge frame 270, a first hinge hole 271 to which the first hinge axis 251 of the fixing hinge 260 is inserted is provided, and at the center, a place where a first engaging member 275 may be accommodated is provided. At a first side wall of the first hinge frame 270 facing the fixing hinge 260, a first guiding block 272 which may guide moving of a first moving member 2130 is provided. At a second side wall which is formed in parallel with the first side wall of the first hinge frame 270, a first guide slot 273 which guides moving of the first support arm 2110 is formed.

A second hinge frame 280 is rotatably coupled to the second hinge axis 252 of the fixing hinge 260. At an end of the second hinge frame 280, a second hinge hole 281 to which the second hinge axis 252 of the fixing hinge 260 is provided, and at the center a place where a second engaging member 285 may be accommodated is provided. At the first side wall of the second hinge frame 280 facing the fixing hinge 260, a second guiding block 282 which may guide moving of the second moving member 2140 may be provided. At the second side wall which is formed in parallel with the first side wall of the second hinge frame 280, a second guide slot 283 which guides moving of the second support arm 2120 is formed.

A locking member 290 constitutes a locking unit along with the first and second engaging members 275 and 285. The locking unit may lock the first body and the second body 210 and 220 of the foldable device 20 at multiple positions. For example, the locking unit may lock the first and second bodies 210 and 220 at a completely unfolding position (FIG. 20) and a completely folding position (FIG. 21). In addition, the locking unit may lock the first and second bodies 210 and 220 at a position (inclined position) having a predetermined open angle (i.e., obtuse angle) between the completely unfolding position (FIG. 20) and the completed folding position (FIG. 21). The open angle at the inclined position may be greater than 90 degrees. The locking unit may lock the first and second bodies 210 and 220 at multiple inclined positions between 90 degrees and 180 degrees. For example, the open angle at an inclined position may be 120 degrees.

The locking member 290 is installed at a fixed position, and the first and second engaging members 275 and 285 are formed to be engaged with the locking member 290 while rotating along with the first and second bodies 210, 220. At an outer circumference of the locking member 290, there are many locking units 293 which lock the first and second bodies 210, 220 at each of the unfolding position, inclined position, and the folding position. Therefore, the first and second engaging members 275, 285, according to an opened position of the first and second bodies 210, 220, are selectively engaged with one of the many locking units 293.

At a side of the locking member 290, there are first and second fixing holes 291, 292 to which the first and second hinge axes 251 and 252 of the fixing hinge 260 which passes through the first and second hinge holes 271, 281 of the first and second hinge frames 270, 280 and inwardly protrudes of the first and second hinge frames 270 and 280 may be inserted. When the first and second hinge axes 251 and 252 of the fixing hinge 260 are inserted to the first and second fixing holes 291, 292, the locking member 290 are fixed with respect to the fixing hinge 260 regardless of rotation of the first and second bodies 210, 220.

The first and second engaging members 275 and 285 rotate along with the first and second bodies 210 and 220 with respect to the first and second hinge axes 251 and 252. The first and second engaging members 275 and 285 are supported by the first and second hinge frames 270 and 280, so that the first and second engaging members 275 and 285 move in an approaching direction or distant direction from the locking member 290. The first and second elastic members 276 and 286 add elastic power to the first and second engaging members 275 and 285 so that the first and second engaging members 275 and 285 are in contact with the locking unit 293.

At a side of the locking member 290, an interlocking groove 294 is formed where an interlocking bar 2100 is accommodated. The interlocking bar 2100 connects the first hinge frame 270 and the second hinge frame 280 so that the first and second hinge frames 270 and 280 are synchronized and rotated. At both ends of the interlocking bar 2100, the first connecting protrusion and the second connecting protrusion 2101 and 2102 are formed. The first connecting protrusion 2101 is inserted to the first connection hole which is formed on the first hinge frame 270, and the second connection hole 2102 is inserted to the second connection hole 284 which is formed on the second hinge frame 280. When the first and second connection protrusion 2101 and 2012 of the interlocking bar 2100 are combined with the first and second connection holes 284 of the first and second hinge frames 270 and 280, the first and second bodies 210 and 220 are synchronized and rotated. Accordingly, when one of the first and second engaging members 275 and 285 is engaged with the locking unit 293, the first and second bodies 210 and 220 are locked so that they are not rotated.

The first support arm 2110 moves the first support wing 212 according to movement of the first body 210. The second support arm 2120 moves the second support wing 222 according to movement of the second body 220. As described above, the first and second support wings 212 and 222 may move between a support position and a receiving position. When the first and second bodies 210 and 220 are in an unfolding position, the first and second support wings 212 and 222 are positioned at a support position, and when the first and second bodies 210 and 220 are in a folding position, the first and second support wings 212 and 222 are positioned at a receiving position. So that the first and second bodies 210 and 220 may be used at an inclined position between an unfolding position and a folding position, at a position from an unfolding position to an inclined position, the first and second support wings 212 and 222 are maintained at a support position, and when they are folded in excess of the inclined position, the first and second support wings 212 and 222 may be moved to a receiving position. Therefore, a receiving start angle that the first and second support wings 212 and 222 begin to move from a support position to a receiving position may be greater than an angle corresponding to the inclined position. For example, the foldable device 20 is used at an open angle (i.e., obtuse angle) greater than 90 degrees, and the first and second support wings 212, 222 may be formed so that the first and second support wings 212 and 222 are maintained at a support position in the range of the open angle between 90 degrees and 180 degrees.

When the first and second support arms 2110 and 2120 are placed at a position between an unfolding position and a receiving start position corresponding to receiving start angle, the first and second support arms 2110 and 2120 maintain the first and second support wings 212 and 222 at a support position, and move the first and second support wings 212, 222 to a receiving position in a folding position in excess of the receiving start position. To do this, the first and second support arms 2110 and 2120 may be formed to rotate around a fixed position with respect to the first and second hinge axes 251 and 252 and support the first and second support wings 212, 222.

Figure 25A:
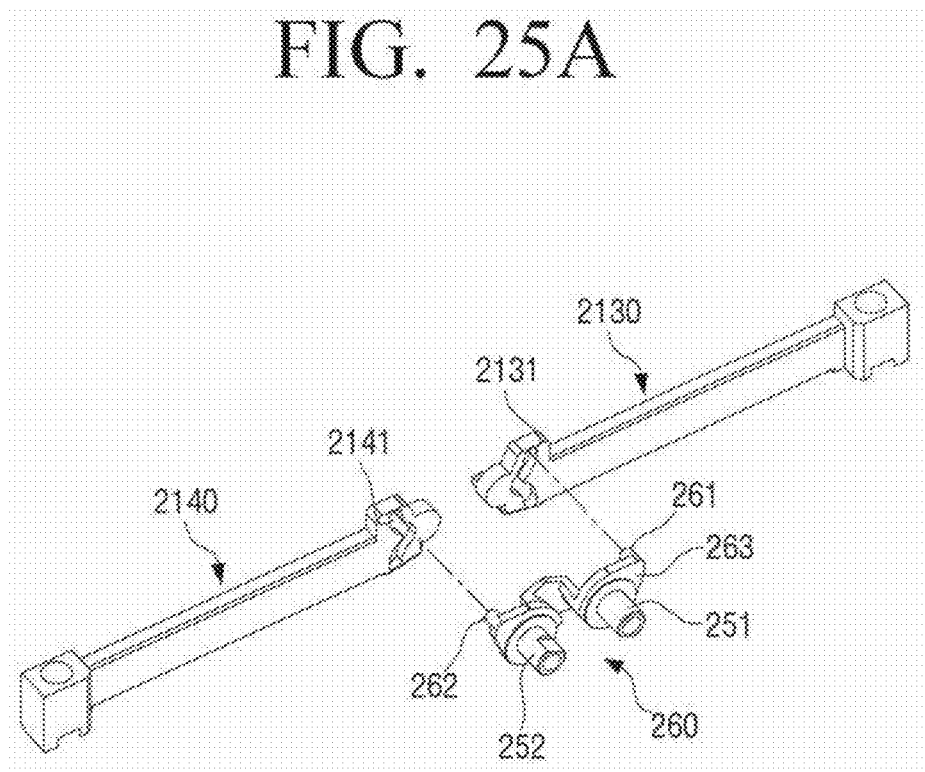
FIG. 25A is a perspective view of a fixed hinge of the hinge unit and the first and second restriction slots of FIG. 23.
Figure 25B:
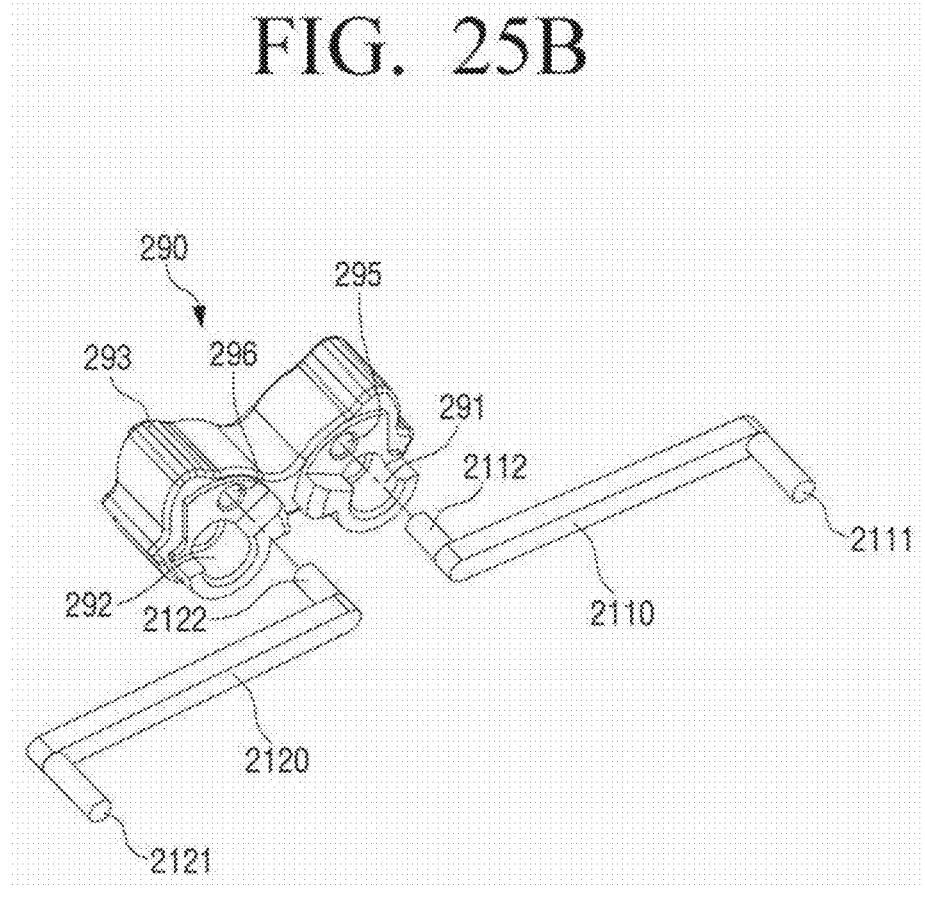
FIG. 25B is a perspective view of a locking member of the hinge unit and the first and second support arms of FIG. 23.
Figure 25C:
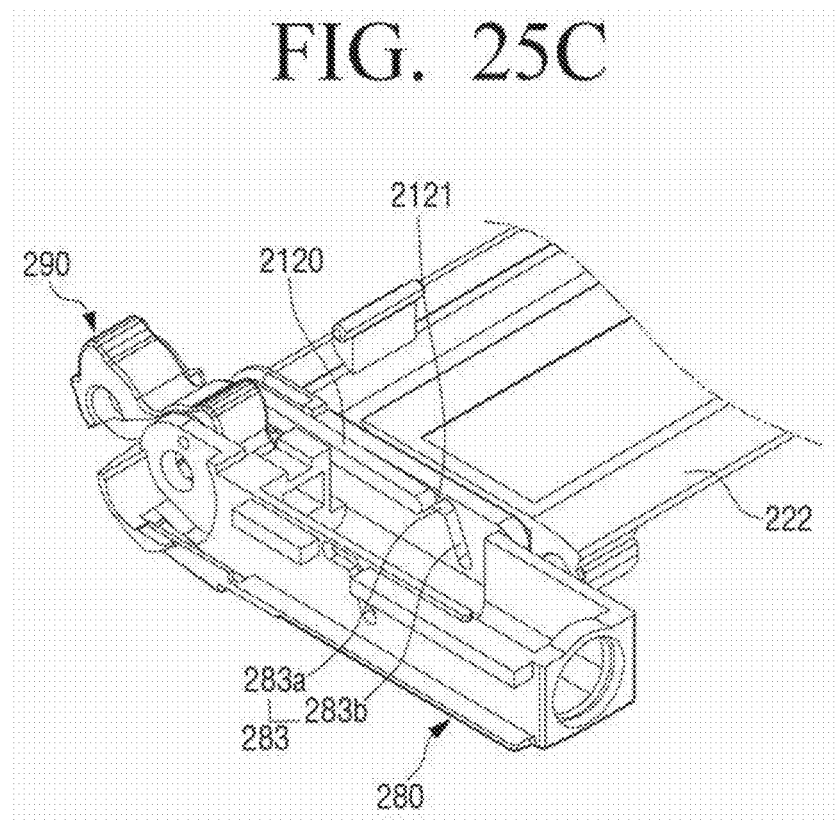
FIG. 25C is a perspective view of a state where the second support arm of the hinge unit of FIG. 23 is installed in the second hinge frame and supports the second support wing.

To be specific, as illustrated in FIGS. 25, 25B, and 25C, at both ends of the first support arm 2110, there are the first guide pin 2111 and the first pivot pin 2112, and at both ends of the second support arms 2120, there are the second guide pin 2121 and the second pivot pin 2122. The first and second pivot pins 2112 and 2122 are pivotably installed on the locking member 290. In case of the locking member 290, as illustrated in FIG. 25B, there are first and second pivot holes

295 and 296 to which the first and second pivot pins 2112 and 2122 are pivotably inserted. The first and second guide pins 2111 and 2121 are inserted to the first and second guide slots 273 and 283 formed respectively at one side of the first and second hinge frames 270 and 280. The first guide pin 2111 penetrates into the first guide slot 273, extends below the first support wing 212, and supports the first support wing 212. Therefore, when the first guide pine 2111 moves by the first guide slot 273, the first support wing 212 rotates at the rotation axis 214.

As such, the second guide pin 2121 penetrates into the second guide slot 283, extends below the second support wing 222, and supports the second support wings 222. Therefore, when the second guide pin 2121 moves by the second guide slot 283, the second support wing 222 rotates at the rotation axis 224.

Figure 28A:
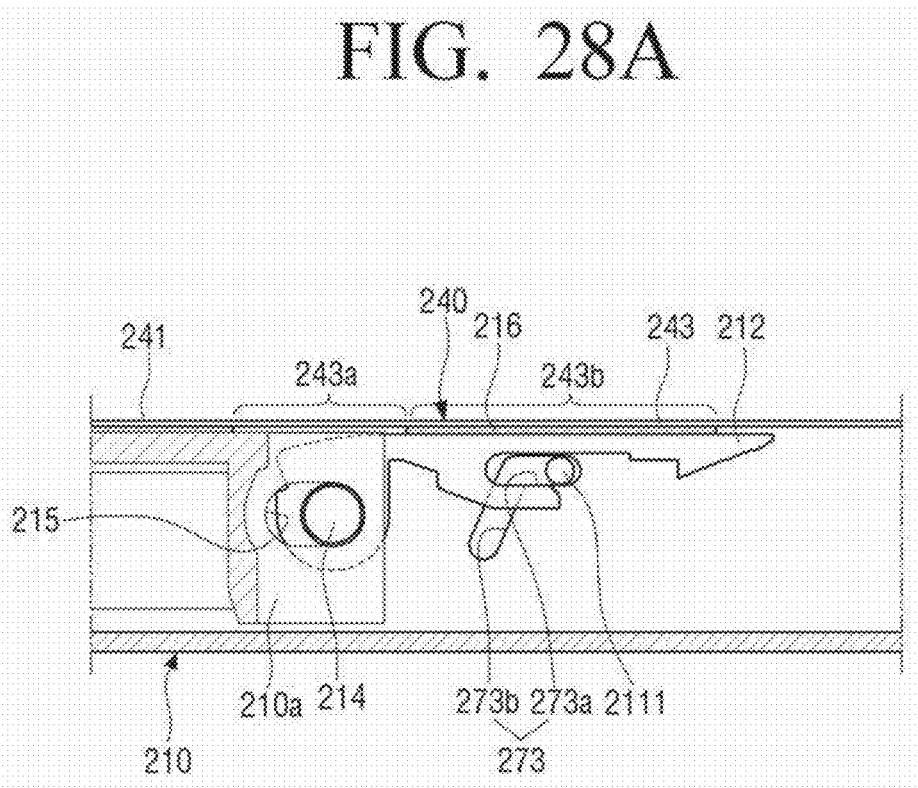
FIG. 28A is a view of a relation between supporting wings and a guide pin, when the foldable device is in an unfolding state.

The first and second guide slots 273 and 283 provided on one side wall of each of the first and second hinge frames 270 and 280 include a support section 273a and a receiving section 273b (see FIG. 28A). The support section 273a corresponds to a section from an unfolding position to a receiving start position, and the receiving section 273b corresponds to a receiving start position to the folding position. While the first and second bodies 210 and 220 rotate from the unfolding position of the first and second bodies 210 and 220 to the receiving start position, the support section 273a maintains a position at which the first and second guide pins 2111 and 2121 of the first and second support arms 2110 and 2120 supports the first and second support wings 212 and 222. While the first and second bodies 210 and 220 rotate from the receiving start position to the folding position, the first and second support arms 2110 and 2120 rotate so that the first and second guide pins 2111 and 2121 move in a direction in which the first and second guide pins 2111, 2121 become distant from the first and second support wings 212 and 222. Then, the first and second support wings 212 and 222 move from the support position to the receiving position by self-load.

FIG. 28A illustrates the first support wing 212, when the first and second bodies 210, 220 of the foldable device 20 are in an unfolding position. The second support wing 222 operates in the same manner as the first support wing 212, and FIG. 28A illustrates the first support wing 212 only.

Referring to FIG. 28A, the first guide pin 2111 is positioned at the support section 273a of the first guide slot 273, and the first support wing 212 is supported by the first guide pin 2111 of the first support arm 2110 and is maintained at a support position. The second support wing 222 is maintained by the second guide pin 2121 of the second support arm 2120. To be specific, the second guide pin 2121 of the second support arm 2120 is positioned at the support section 283a (see FIG. 25C) of the second guide slot 283, and the second support wing 222 is supported by the second support pin 2121 and maintained at a support position. Therefore, the flexible display 240 is supported by the first and second fixed portions 211 and 221, the first and second support wings 212 and 222, and a central support member 2150 to be described later and, and is maintained to be flat.

In FIG. 28A, when the first and second bodies 210, 220 begin to be folded, the first and second bodies 210, 220 move in a direction which becomes distant from the first and second hinge axes 251 and 252 by the phase difference compensation unit. Until the first and the second bodies 210 and 220 reach a receiving start position, the first and second guide pins 251 and 252 are guided by the support section 273a and 283a of the second guide slot 273 and 283, and the first and second support arms 2110, 2120 are maintained at a position to support the first and second support wings 212, 222.

When the first and second bodies 210 and 220 are folded beyond the receiving start position, the first and second guide pins 2111 and 2121 are guided by the receiving space 273*b* and 283*b* of the first and second guide slots 273 and 283. The first and second support arms 2110 and 2120 move in a direction away from the first and second support wings 212, 222 centering on the first and second pivot pins 2112 and 2122. Therefore, the first and second support wings 212 and 222 rotate toward a bottom surface of the first and second bodies 210 and 220 and form the receiving space 230 (see FIG. 21) within the first and second bodies 210 and 220. At this time, on an upper surface of the first and second support wings 212 and 222, the parts 243*b* and 243*d* of the third portion 243 of the flexible display 240 are fixed, and while the third portion 243 of the flexible display 240 is slightly bent toward a bottom surface of the first and second bodies 210 and 220 along with the first and second support wings 212 and 222, forms a curved portion 244, and is received in the receiving space 230.

Figure 28B:
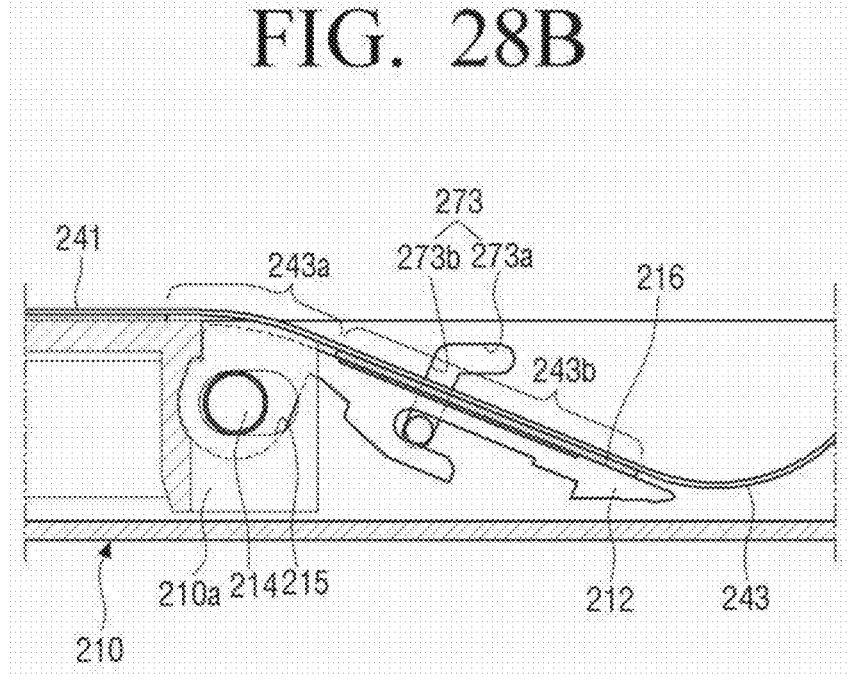
FIG. 28B is a view of a relation between supporting wings and a guide pin, when the foldable device is in a folding state.

The rotation axes 214 and 224 of the first and second support wings 212 and 222 move toward the first and second fixed portions 211 and 221 along with the slot hole 215 and 225 provided on the side wall 210*a* and 220*a* of the first and second bodies 210 and 220 as illustrated in FIG. 28B, and the phase difference between the flexible display 240 and the first and second support wings 212 and 222 is reduced or removed. That is, so as to reduce or remove the phase difference between the flexible display 240 and the first and second support wings 212 and 222, the rotation axes 214 and 224 of the first and second support wings 212 and 222 move to a specific position along with the slot holes 215 and 225 provided on the side walls 210*a* and 220*a* of the first and second bodies 210 and 220. Therefore, distortion of the flexible display 240 which occurs when the movement of the flexible display 240 is not restricted may be prevented, and stress applied on the flexible display 240 may be minimized. Here, FIG. 28B is a view illustrating a relation between the first support wing and the first guide pin when a foldable device is in a folded state according to another exemplary embodiment.

Therefore, in the above exemplary embodiment, when the first and second support wings 212 and 222 move between a support position and a receiving position, the display restriction member which moves the third portion 243 of the flexible display 240 along with the first and second support wings 212 and 222 may be embodied by the fixing member 216 which fixes the part 243*b* and 243*d* of the third portion 243 of the flexible display 240 on each upper surface of the first and second support wings 212 and 222, and also by a pair of first and second slot holes 215 and 225 which are formed in each of the first and second bodies 210 and 220 and to which a pair of first and second rotation axis 214 and 224 of the first and second support wings 212 and 222 is inserted.

A shape of the first and second guide slots 273 and 283 are not restricted to an example illustrated in FIGS. 28A and 28B. A shape of the first and second guide slots 273 and 283 may be different according to a position of the first and second pivot holes 295 and 296.

The first and second moving members 2130 and 2140 are installed on a first sidewall of the first and second hinge frames 270 and 280 to move with respect to each of the first and second hinge frames 270 and 280. In addition, the first and second moving members 2130 and 2140 are installed to move integrally with the first and second bodies 210 and 220. Therefore, the first and second moving members 2130, 2140 restrict a moving amount with respect to the first and second hinge axes 251 and 252 of the first and second bodies 210, 220.

FIG. 25A is a perspective view illustrating the fixing hinge 260 of the hinge unit 250 and first and second restriction slots 2131 and 2141 of FIG. 23.

Referring to FIG. 25A, there are first and second restriction slots 2131 and 2141 on the first and second moving members 2130 and 2140. The first and second restriction slots 2131 and 2141 have a shape to restrict a moving amount of the first and second bodies 210 and 220 according to a rotation angle of the first and second bodies 210 and 220. To the first and second restriction slots 2131 and 2141, the first and second reference pins 261 and 262 of the fixing hinge 260 are inserted. In the exemplary embodiment, the first and second restriction slots 2131 and 2141 of the first and second moving members 2130 and 2140 and the first and second reference pins 261 and 262 of the fixing hinge 260 constitute a phase difference compensation unit.

As described above, the first and second support wings 212 and 222, may move between the support position and the receiving position as the first and second bodies 210 and 220 move between the unfolding position and the folding position. The first and second support wings 212 and 222 are rotated by the first and second guide pins 2111 and 2121 of the first and second support arms 2110 and 2120 of which an end is rotatably installed on the locking member 290 fixed on the fixing hinge 260, and the first and second guide slots 273 and 283 formed on a second sidewall of the second hinge frames 270 and 280. Therefore, according to movement of the first and second bodies 210 and 220, so that the first and second support wings 212 and 222 may move between the support position and the receiving position, an operation unit to operate the first and second support wings 212 and 222 may be embodied by the first and second guide slots 273 and 283 of the first and second hinge frames 270 and 280 which move along with the first and second bodies 210 and 220, and the first and second support arms 2110 and 2120 which rotate with respect to the locking member 290 and of which movement is restricted by the first and second guide slots 273 and 283.

The flexible display 240 is installed on an upper surface of the first and second bodies 210, 220, including a first portion 241 fixed to the first fixed portion 211, a second portion 242 fixed to the second fixed portion 221, and a third portion 243 located between the first portion 241 and the second portion 242. The flexible display 240 has been described and will not be further described.

Figure 29A:
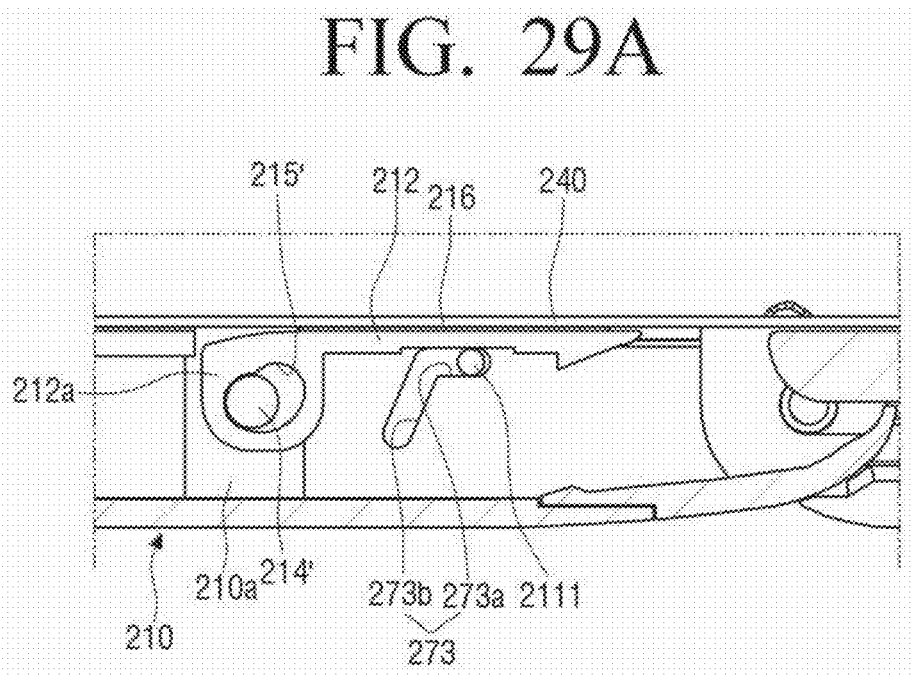
FIG. 29A is a view of a relation between supporting wings and a guide pin, when the foldable device is in an unfolding state according to still another exemplary embodiment.

When the first and second bodies 210 and 220 are folded, a pair of slot holes 215 and 225 formed on the first and second bodies 210 and 220 may prevent distortion of the flexible display 240 which occurs at a connection portion of the first and second fixed portions 211 and 221 and the first and second support wings 212 and 222, and may minimize stress on the flexible display 240. However, in still another exemplary embodiment, a pair of slot holes may be formed on the first and second support wings, and may form a pair of rotation axis on the first and second bodies. Referring to FIGS. 29A and 29 B, this configuration is described.

Figure 29B:
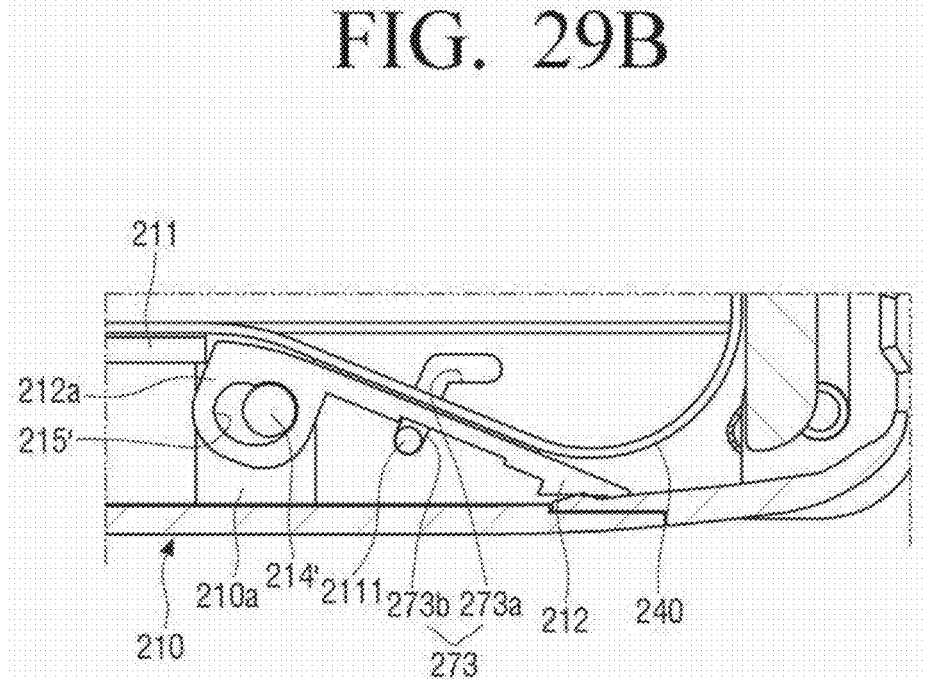
FIG. 29B is a view of a relation between supporting wings and a guide pin, when the foldable device is in a folding state according to still another exemplary embodiment.

FIG. 29A is a view illustrating a position of a support wing when the foldable device according to still another exemplary embodiment is unfolding state, and FIG. 29B is a view illustrating a position of a support wing, when the foldable device according to still another exemplary embodiment is folding state.

Referring to FIG. 29A, the rotation axis 214' is installed on a side wall 210a of the first body 210, and the slot hole 215' is formed on a support plate 212a which is extended from the first support wing 212 downward. The slot hole 215' may have a curved shape. In addition, the first guide pin 2111 is located on the support space 273a of the first guide slot 273, and the first support wing 212 is supported by the first guide pin 2111 of the first support arm 2110 and is maintained at a support position. The second support wing 222 is maintained by a support position by the second guide pin 2121 which moves by the second guide slot 283. Therefore, the flexible display 240 is supported by the first and second fixed portions 211 and 221, the first and second support wings 212 and 222, and the central supporting member 2150 stay flat.

When the first and second bodies 210, 220 are folded, as illustrated in FIG. 29B, the first guide pin 2111 is positioned at the receiving space 273b of the first guide slot 273. Therefore, the first support wing 212 rotates downward to a bottom side of the first body 210 and forms a receiving space 230 within the first body 210. In addition, the second support wing 222 is positioned at a receiving space by the second guide pin 2121 which moves by the second guide slot 283. Accordingly, the second support wing 222 rotates toward a bottom side of the second body 220, and forms the receiving space 230 within the second body 220. In particular, on an upper surface of the first and second support wings 212 and 222, a part of the third portion 243 of the flexible display 240 is fixed. Thus, the third portion of the flexible display 240 is gently curved toward a bottom side of the first and second bodies 210 and 220 along with the first and second support wings 212 and 222, forms a curved portion, and is received in the receiving space 230.

The first and second slot holes 215' formed on the first and second support wings 212 and 222 move toward the first and second fixed portions 211 and 221 along with the first and second rotation axis 214' provided on the sidewall 210a of the first and second bodies 210 and 220 as illustrated in FIG. 29B, and mitigate the phase difference which occurs between the flexible display 240 and the first and second support wings 212 and 222. Therefore, distortion of the flexible display 240 which occurs when the flexible display 240 is not restricted may be prevented, and stress applied on the flexible display 240 may be minimized.

Accordingly, when a body is folded, the slot holes 115 and 225, which are disposed on the first and second support portions (i.e., the first and second bodies 210 and 220) and on the third support portion (i.e., the first and second support wings 212 and 222), and the rotation axis 214 and 214' disposed on a counter member, may prevent distortion of the flexible display 240 which occurs at a connection portion of the first and second support portions 211 and 221 and the first and second support wings 212 and 222, and may minimize stress exerted on the flexible display 240.

Figure 37:
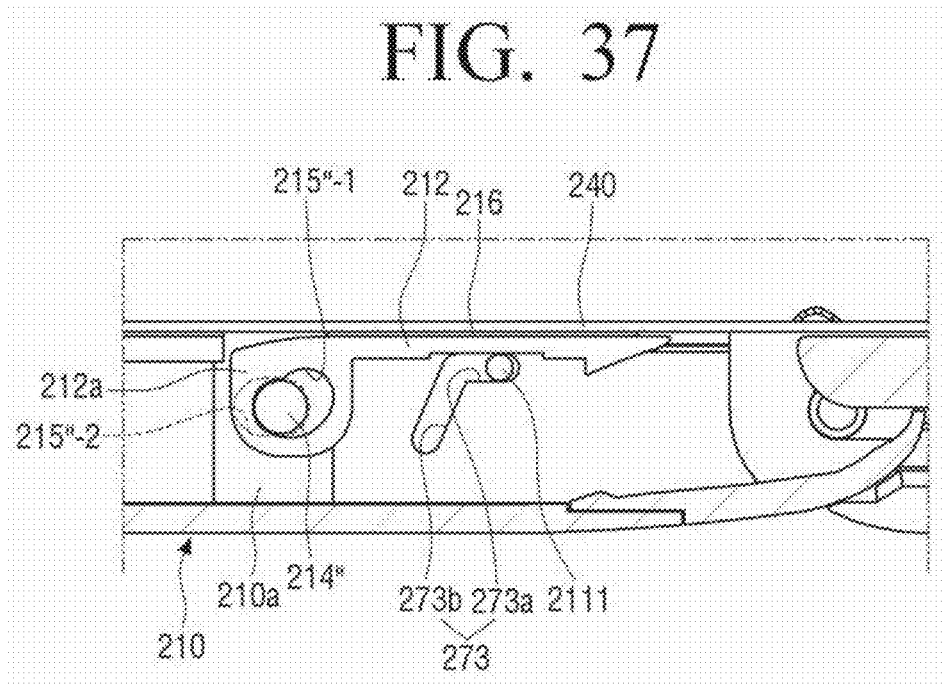
FIG. 37 is a view of another example of installation of a rotational axis and slot hole of the foldable device according to another exemplary embodiment.

As still another exemplary embodiment, as illustrated in FIG. 37, slot holes 215"-1 and 215"-2 may be formed on both of the first and second bodies which constitute of the first and second support wings 212 and 222 and the first and second support portions 211 and 221, and a rotation axis 214" is separately formed to be inserted to the slot holes 215"-1 and 215"-2. The second support wing 222 operates in the same manner as the first support wing 212, and FIG. 37 illustrates the slot holes 215"-1 and 215"-2 which are installed on one side of the first support wing 212 and one side of the first support portion 211.

To be specific, each of the first slot hole 215"-1 and second slot hole is disposed on the first support wing 212 and the second support wing 222 of the third support portion, the third slot hole 215"-2 corresponding to the first slot hole 215"-1 is disposed in the first support portion 211, and the fourth slot hole corresponding to the second slot hole is disposed on the second support portion 221 where the second support wing 222 is disposed. In addition, the first rotation axis 214" of the first slot hole 215"-1 and the third slot hole 215"-2 is inserted to the first support wing 212 of the first support portion 211 and the third support portion to install the first support portion 211 and the third support portion rotatably with each other. In addition, the second rotation axis of the second slot hole and the fourth slot hole is inserted to the second support wing 222 of the second support portion 221 and the third support portion to install the second support portion 221 and the third support portion rotatably with each other.

Figure 30A:
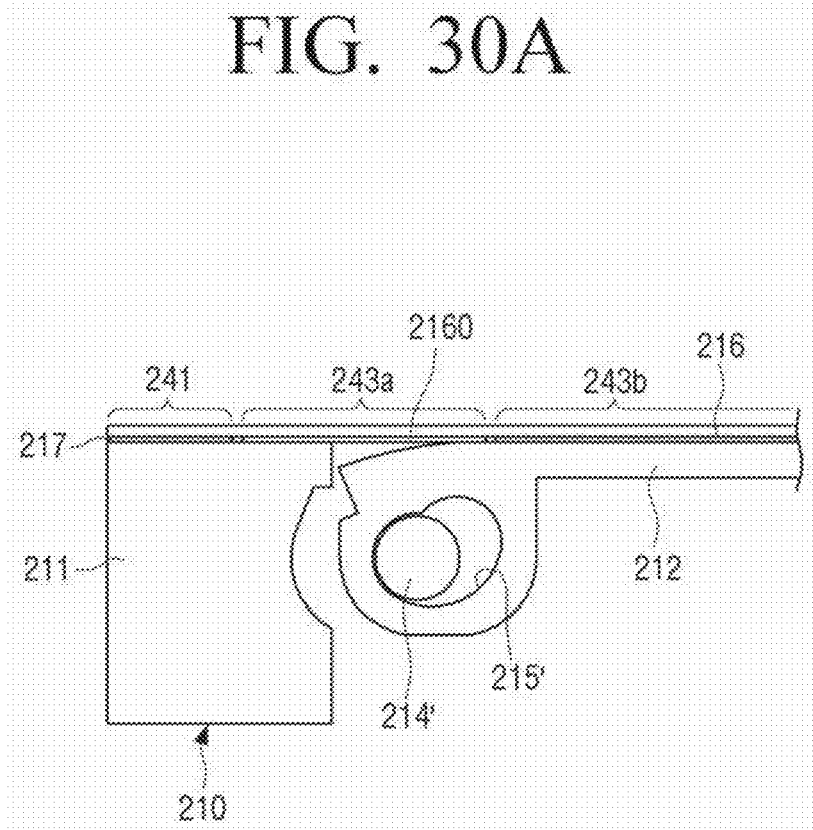
FIGS. 30A and 30B are views of a case where a reinforcing plate on a rear side of the flexible display.
Figure 30B:
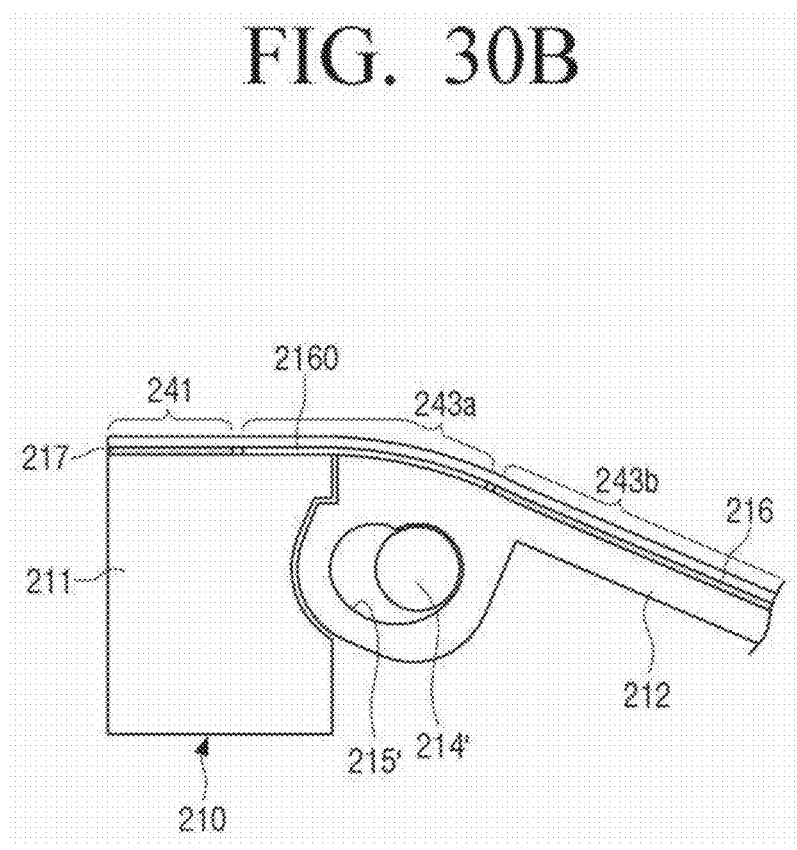

FIGS. 30A and 30B are views illustrating that a reinforcing plate is installed on a rear side of the flexible display.

Referring to FIGS. 30A and 30B, a reinforcing plate may be disposed at a position where an end of a fixed portion (e.g., the first fixed portion 211) and a support wing (e.g., the first support wing 212) are adjacent to each other, and a rear side of the flexible display area corresponding to a part of the fixed portion and the support wing.

For example, when the first portion 241 of the flexible display 240 is fixed to the first fixed portion 211 of the first body 210, and the third portion 243 of the flexible display 240 is fixed on an upper side of the first support wing 212, a reinforcing plate 2160 may be installed on a rear side of the first fixed portion 211 and the part 243a of the flexible display 240 which is not fixed on the first support wing 212. Therefore, the reinforcing plate 2160, so as to cover an area near an end of the first fixed portion 211 and a partial area of the first support wing 212, is formed to have a width corresponding to interval between the adhesive portion 217 of the first fixed portion 211 and the fixing member 216 of the first support wing 212, and a length corresponding to the width of the first support wing 212. The reinforcing plat 2160 may be formed as thin stainless steel plate. FIGS. 30A and 30B only illustrate a part of the flexible display 240 which is supported by the first support wing 212, but on the part of the flexible display 240 supported by the second support wing 222, the reinforcing plate 2160 may be installed in the manner in which the part supported by the first support wing 212 is installed.

The reinforcing plate 2160 has greater stiffness than the flexible display 240, and if the first and second bodies 210 and 220 are in a unfolding position as illustrated in FIG. 30A, when a user presses a part of the flexible display 240 corresponding to a space between the first and second fixed portions 211 and 221 and the first and second support wings 212 and 222, the flexible display 240 may be supported not to be bent.

In addition, as illustrated in FIG. 30B, when the first and second bodies 210 and 220 are in a folding position, the first and second support wings 212 and 222 are inclined downward. When the first and second support wings 212 and 222 are rotated in a downward direction, the reinforcing plate 2160 is not extended and is merely bent, and tensile stress which the flexible display 240 which is located on an upper side of the reinforcing plate 2160 receives may be minimized.

When the first and second bodies 210 and 220 of the foldable device 20 are in a folding position, the first and second support wings 212 and 222 are rotated downward, and the third portion 243 of the flexible display 240 is bent with a predetermined curvature, forming the curved portion

244. In particular, on the first and second fixed portions 211 and 221 of the first and second bodies 210 and 220 and a part of the first and second support wings 212 and 222, a curved side corresponding to curving of the flexible display 240 is formed. A method of forming the curve will be explained in reference to FIGS. 31A and 31B.

Figure 31A:
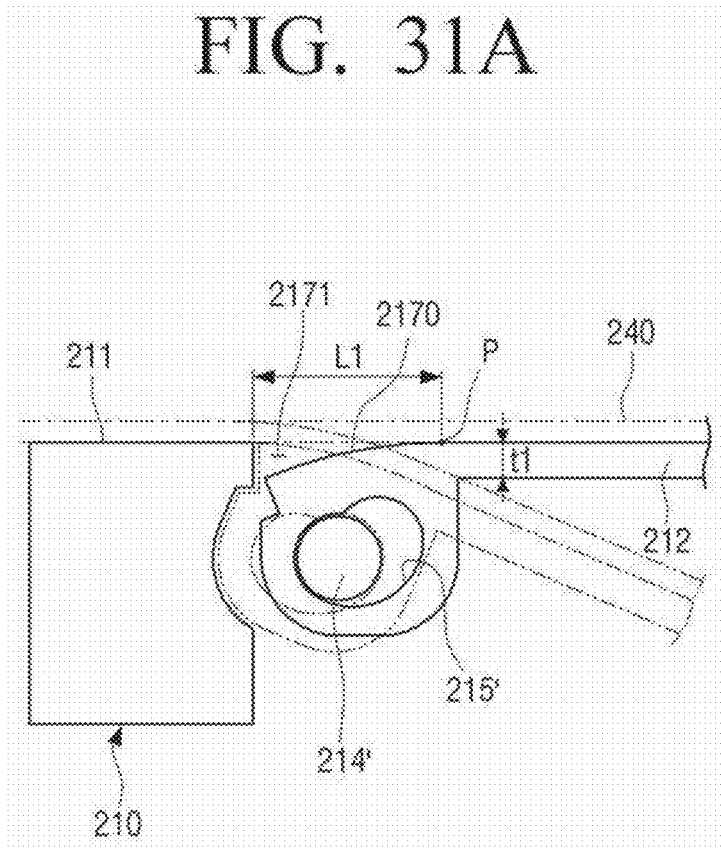
FIG. 31A is a view of a case where a curve corresponding to a radius of curvature of the flexible display is formed only on supporting wings.
Figure 31B:
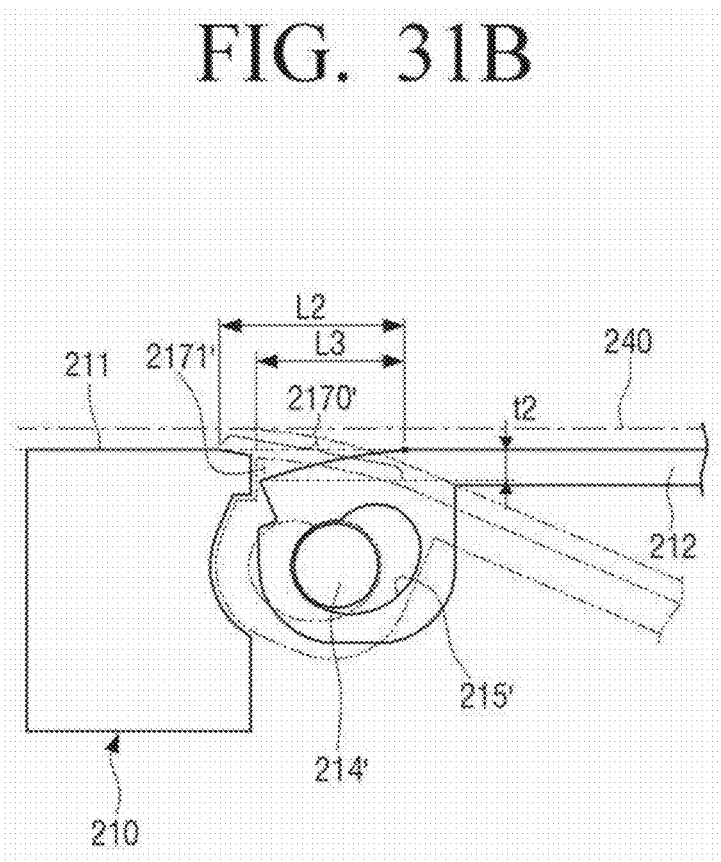
FIG. 31B is a view of a case where a curve corresponding to a radius of curvature of the flexible display is formed on a part of the body where supporting wings are installed and the supporting wings.

FIG. 31A is a view illustrating a case where a curve corresponding to bending of the flexible display is formed on a support wing only, and FIG. 31B is a view illustrating a case where a curve corresponding to bending of the flexible display is formed from a part of the body where a support wing is installed.

As illustrated in FIG. 31A, the curve corresponding to a bent portion of the flexible display 240 may be formed on the first support wing 212 only. A curve 2170 is formed on a part of an upper surface of the first support wing 212 which is adjacent to an end of the first fixed portion 211. That is, the curve 2170 is formed on an upper side of the rotation axis 214' which is a rotation center of the first support wing 212 or a part where the slot hole 215' is formed. When distance from an end of the first fixed portion 211 to a point (P) of the first support wing 212 where the curve 2170 ends is L1, depth of groove 2171 formed by the curve 2170 is t1.

As illustrated in FIG. 31B, the curve 2170' corresponding to the bent portion of the flexible display 240 may be extended from a part of an end of the first fixed portion 211 to the first support wing 212. Therefore, a part of the curve 2170' is formed near an end of the first fixed portion 211, and remaining part of the curve 2170' is formed on the first support wing 212. Therefore, length of the curve formed on the first support wing 212 is reduced. When the first support wing 212 is in a horizontal position, horizontal length corresponding to the curve 2170' may be L2. When length of L2 is the same as L1, distance L3 from an end of the first fixed portion 211 to the point (P) of the first support wing 212 where the curve 2170' ends is less than L2 (L3<L2). In addition, depth (t2) of the groove 2171' formed by the curve 2170' is less than the groove depth (t1) where the curve 2170 is formed on the first support wing 212. That is, t2 is less than t1 (t2<t1).

FIGS. 31A and 31B illustrate and describe the first support wing 212 installed on the first body 210, but the second support wing 222 installed on the second body 220 may have the same curve as described above.

Since the curve 2170' which corresponds to the bent portion of the flexible display 240 is engaged with the first and second fixed portions 211 and 221 and also with the first and second support wings 212 and 222, when the first and second bodies 210 and 220 are unfolded, length and depth of an area of the flexible display 240 which is not supported by the first and second support wings 212, 222 may be reduced.

Hereinabove, it is described that, as an example of a display restriction member to prevent distortion of the flexible display 240, when the first and second bodies 210 and 220 of the foldable device 20 are in a folding position, a case where a part of the third portion 243 of the flexible display 240 is fixed to the first and second support wings 212 and 222, and the rotation axis 214, 224 of the first and second support wings 212 and 222 is supported by the slot hole 215, 225 are described. However, this is merely exemplary, and when the first and second support wings 212 and 222 move to a receiving position, many methods may be used to prevent distortion of the flexible display 240.

Figure 32:
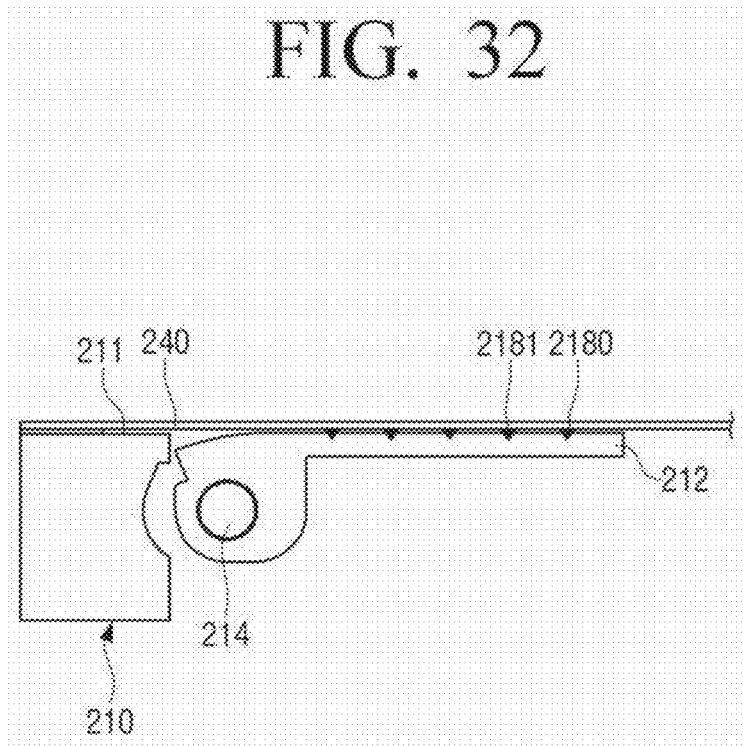
FIG. 32 is a view of an example of a display restriction member of the foldable device according to another exemplary embodiment.

FIG. 32 is a view illustrating an example of a display restriction member used for a foldable device according to another exemplary embodiment.

Referring to FIG. 32, the display restriction member may include a plurality of slot groove 2180 formed on an upper surface of the first support wing 212 and a sliding gel 2181 accommodated on the plurality of slot groove 2180.

The first support wing 212 is installed on one side of the first fixed portion 211 of the first body 210 rotatably. The first support wing 212 may be positioned in a horizontal position and an inclined position downward by the operation unit as described above. On the upper surface of the first support wing 212, a plurality of slot grooves 2180 are formed. The plurality of slot grooves 2180 are formed on an upper surface of the first support wing 212 in a parallel manner with a predetermined depth which does not pass the first support wing 210. The plurality of slot grooves 2180, as illustrated in FIG. 32, may be formed in a width direction of the first support wing 212. The plurality of slot grooves 2180 may be formed in a length direction of the first support wing 212.

In the plurality of grooves 2180, a sliding gel 2181 is charged. The sliding gel 2181 may enable a part of the flexible display 240 supported by the first support wing 212 to slidably move with respect to the first support wing 212. At the same time, fluid having viscosity may enable the flexible display 240 not to be separated from an upper surface of the first support wing 212. For example, the sliding gel 2181 may use lubricating oil or grease having appropriate level of viscosity. Therefore, in the exemplary embodiment of the present application, the flexible display 240 is attached to the first support wing 212 by viscosity of the sliding gel 2181. In addition, the flexible display 240 may move in a direction parallel to an upper surface of the first support wing 212.

A part of the flexible display 240 which is not supported by the first support wing 212 is fixed on the first fixed portion 211 of the first body 210. In addition, a structure of the first support wing 212 is similar to the first support wing 212 of the foldable device 20 by the aforementioned exemplary embodiment and thus, detailed explanation will be omitted.

FIG. 32 illustrates the first support wing 212 only, but the second support wing 222 may be formed in the same manner as the first support wing 212.

Therefore, according to the above-described exemplary embodiment, the third portion 243 of the flexible display 240 which is attached to an upper surface of the first and second support wings 212 and 222 slidably moves with respect to the first and second support wings 212 and 222. Thus, distortion of the flexible display 240 which occurs when folding the first and second bodies 210 and 220 may be prevented and stress exerted to the flexible display 240 may be absorbed.

Figure 33:
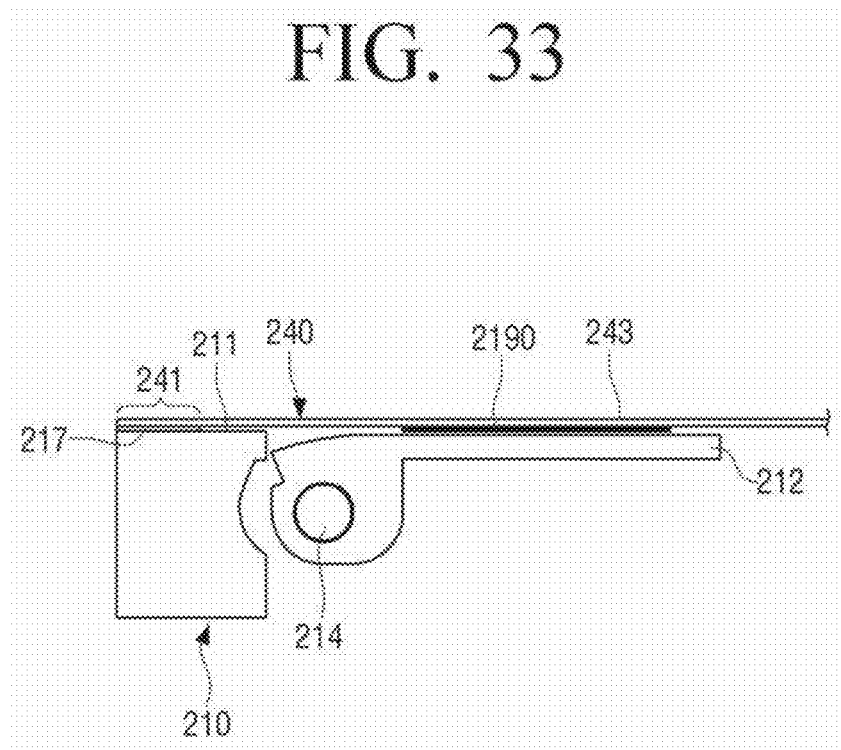
FIG. 33 is a view of another example of a display restriction member of the foldable device according to another exemplary embodiment.

FIG. 33 is a view illustrating another example of the display restriction member used for the foldable device according to another exemplary embodiment.

Referring to FIG. 33, the display restriction member may include a first stiffener 2190 attached to a rear side of the flexible display 240.

The first support wing 212 is rotatably installed on one side of the first fixed portion 211 of the first body 210. The first support wing 212 may be positioned in a horizontal state or inclined state downward by the aforementioned operation unit. The flexible display 240 is located at an upper side of the first fixed portion 211 and the first support wing 212. The first portion 241 of the flexible display 240 corresponding to the first fixed portion 211 is fixed on the first fixed portion 211 by the fixing member 217 such as double-sided tape. A part of the third portion 243 of the flexible display 240 corresponding to the first support wing 212 is slidably installed on the first support wing 212. Therefore, when the first and second bodies 210 and 220 are folded, a part of the third portion 243 of the flexible display 240 slides with respect to an upper surface of the first support wing 212.

The first stiffener 2190 according to another exemplary embodiment is fixed on a rear side of the flexible display 240 which slides with respect to the first support wing 212. The first stiffener 2190 has a relatively high strictness compared to the flexible display 240, and supports that the flexible display 240 slides with respect to the first support wing 212, and prevents distortion of the flexible display 240. The first stiffener 2190 has a size corresponding to an upper surface of the first support wing 212.

In the area of the third portion 243 of the flexible display 240 corresponding to the second support wing 222, a second stiffener is installed. The second stiffener is attached to a rear side of the flexible display 240 in the same type as the first stiffener 2190 illustrated in FIG. 33.

In the above exemplary embodiment, while the first and second stiffener 2190 are attached to a lower surface corresponding to the first and second support wings 212 and 222 of the third portion 243 of the flexible display 240, the third portion 243 of the flexible display 240 slidably moves with respect to the first and second support wings 212 and 222, and thus, distortion of the flexible display 240 which occurs when folding the first and second bodies 210 and 220 may be prevented.

In the meantime, between the first and second bodies 210 and 220 of the foldable device 20, a central support member 2150 may be installed to support a central portion of the third portion 243. Hereinafter, referring to FIGS. 34-36, an example of the central support member which may be used for the foldable device according to another exemplary embodiment will be described.

Figure 34:
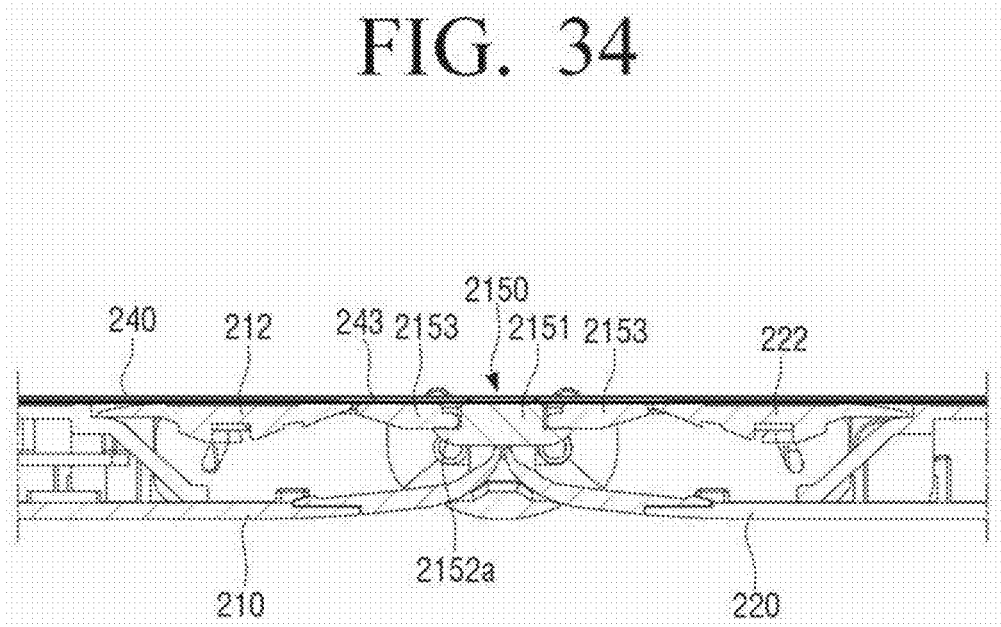
FIG. 34 is a partial sectional view indicating a state that a central support member supports the flexible display while the foldable device according to another exemplary embodiment is unfolded.
Figure 35:
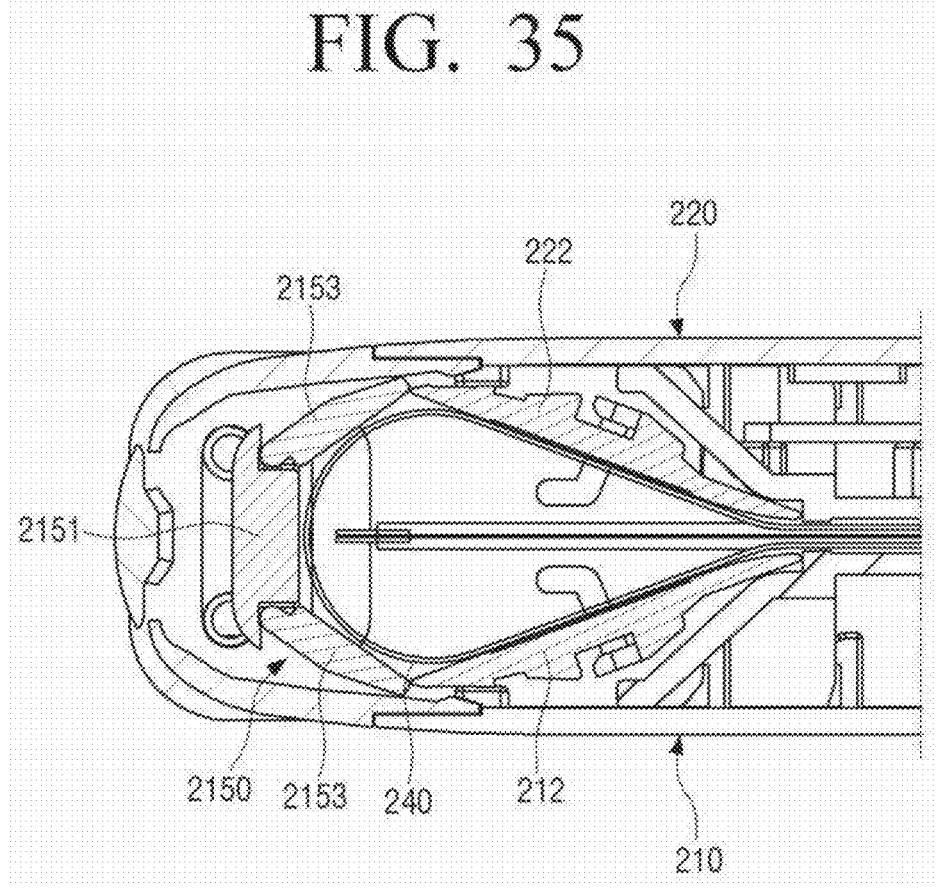
FIG. 35 is a partial sectional view indicating a state of the central support member, while the foldable device is being folded by another exemplary embodiment.
Figure 36:
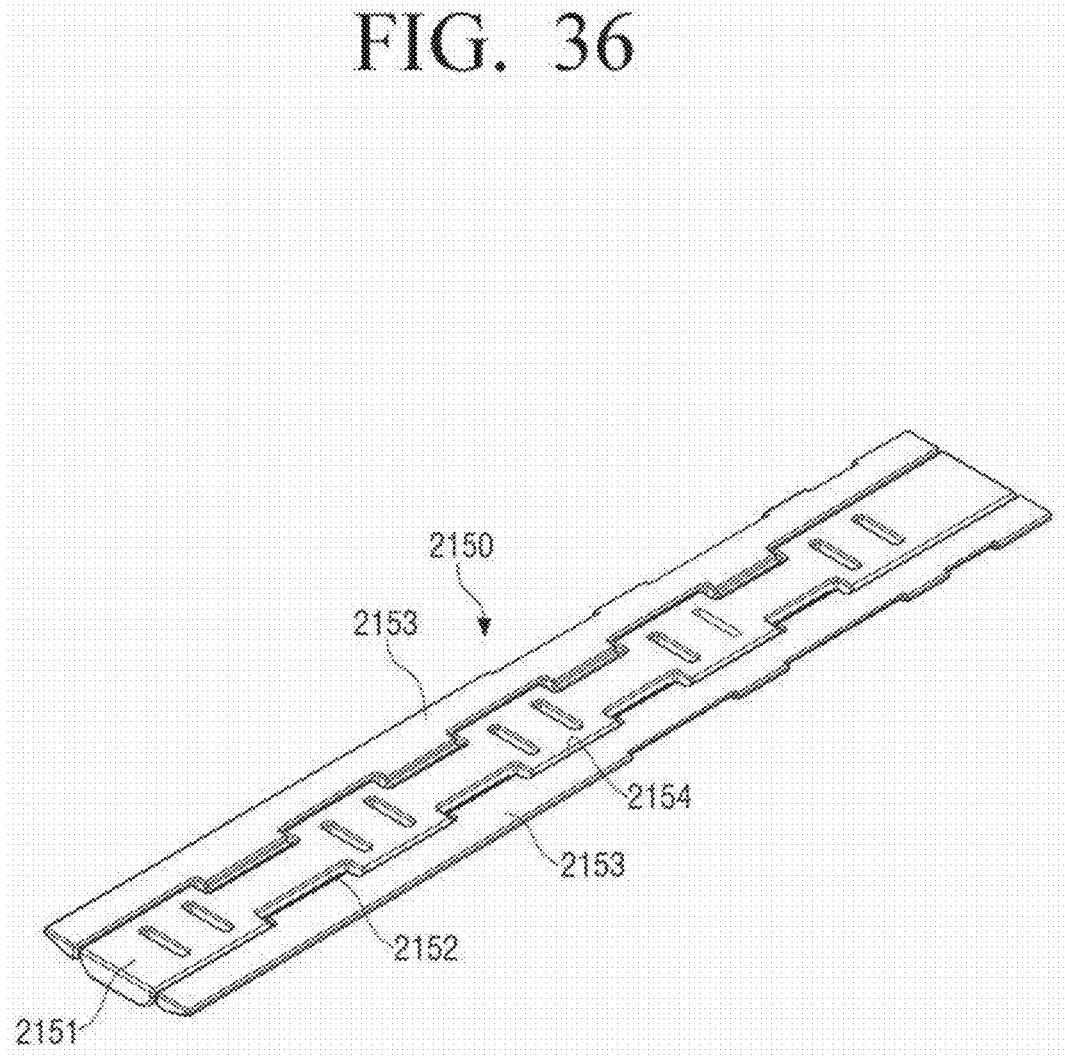
FIG. 36 is a perspective view indicating the central support member of the foldable device according to another exemplary embodiment.

FIG. 34 is a partial sectional view illustrating a state that the central support member 2150 supports the flexible display 240, when the first and second bodies 210 and 220 of the foldable device 20 are unfolded according to another exemplary embodiment. FIG. 35 is a partial sectional view indicating a position of the central support member when the foldable device is folded according to another exemplary embodiment. FIG. 36 is a perspective view indicating the central support member used for the foldable device according to another exemplary embodiment.

Referring to FIG. 34, when the first and second bodies of the foldable device 20 are in an unfolding position, the central support member 2150 supports the central portion of the third portion 243 of the flexible display 240. To be specific, when the first and second bodies 210 and 220 are in an unfolding position, the central support member 2150 is formed to support a part of the flexible display 240 which corresponds to an interval between the first and second support wings 212 and 222. Therefore, when a user adds power to the central portion of the third portion 243 of the flexible display 240, the flexible display 240 is stably supported without being pressed downward.

An example of the central support member 2150 is illustrated in FIG. 36. Referring to FIG. 36, the central support member 2150 includes the main support portion 2151 and the sub support portion 2153.

The main support portion 2151 which is in a rectangular bar shape has a length corresponding to width of the flexible display 240. At both sides of the main support portion 2151, a plurality of engaging grooves 2152 where the sub support member 2153 is installed are formed at a predetermined interval. Bottoms of each of a plurality of engaging grooves 2152 function as a support spot 2152a to prevent the sub support portion 2153 from rotating in an opposite direction.

There are two sub support portions 2153 so as to be installed at both sides of the main support portion 2151. The sub support portion 2153 has a rectangular bar shape, and has a length corresponding to the main support portion 2151. At one side of the sub support portion 2153, a plurality of engaging grooves 2154 which may be engaged with a plurality of engaging grooves 2152 of the main support portion 2151 are provided. The engaging groove 2152 of the main support portion 2151 and the engaging groove 2154 of the sub support portion 2153 are coupled by a hinge structure. Therefore, the sub support portion 2153 may be rotated at a predetermined angle with respect to the main support portion 2151. The rotation of the sub support portion 2153 is restricted by bottom 2152a of the main support portion 2151, and thus, the sub support portion 2153 may rotate in an upper side with respect to the main support portion 2151 and may not rotate in a downward direction.

Accordingly, when the foldable device 20 having the central support member 2150 according to another exemplary embodiment is in an unfolding state, as illustrated in FIG. 34, the central support member 2150 is located at a space between the first and second support wings 212 and 222, and supports the flexible display 240, and thus, a user may use the central portion of the flexible display 240 stably.

In addition, when the first and second bodies 210 and 220 are in a folding position, as illustrated in FIG. 35, the main support portion 2151 of the central support member 2150 moves downward, and two sub support portions 2153 are in an inclined state so that they are not interfered with the curved portion of the flexible display 240 which is curved in a droplet shape.

Therefore, when the first and second bodies 210 and 220 are in an unfolding state, the foldable device 20 having the central support member 2150 may stably support the central portion of the flexible display 240, and when the first and second bodies 210 and 220 are in an unfolding state, they are not interfered with the curved portion of the flexible display 240.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A foldable device comprising:
   a flexible display comprising a first portion, a second portion, and a third portion between the first portion and the second portion;
   a first body comprising:
      a first fixed portion configured to support the first portion of the flexible display; and
      a first support portion configured to partially support the third portion of the flexible display;
   a second body comprising:
      a second fixed portion configured to support the second portion of the flexible display; and
      a second support portion configured to partially support the third portion of the flexible display; and
   a hinge unit comprising:
      a first hinge shaft coupled to the first body; and
      a second hinge shaft coupled to the second body:

wherein the first body is configured to move away from the first hinge shaft of the hinge unit and the second body is configured to move away from the second hinge shaft of the hinge unit while the foldable device moves from an unfolding position to a folding position, such that a receiving space for receiving the third portion of the flexible display is formed between the first support portion of the first body and the second support portion of the second body, wherein the first support portion and the second support portion respectively partially support the third portion of the flexible display, and the receiving space is formed by pivoting the first support portion and the second support portion with respect to the first fixed portion and the second fixed portion when an angle between the first body and the second body is less than a receiving start angle.

2. The foldable device as claimed in claim 1, further comprising:

a compensating unit configured to restrict an amount of movement of the first body and the second body while the first body and the second body respectively move away from the first hinge shaft and the second hinge shaft.

3. The foldable device as claimed in claim 1, wherein the receiving space is configured to receive a curved portion of the flexible display.

4. The foldable device as claimed in claim 1, wherein the third portion comprises an uneven portion that is bent both inward and outward.

5. The foldable device as claimed in claim 3, further comprising:

a movable support member that is spaced apart from the third portion of the flexible display and is located at a second position at which the receiving space for receiving the curved portion is formed.

6. The foldable device as claimed in claim 1, further comprising:

a locking unit that is configured to lock the first body and the second body at any of a plurality of positions;

wherein the locking unit comprises:

a locking member that is located at a fixed position; and a protrusion member that is fixed by the locking member while rotating along with the first body and the second body.

7. The foldable device as claimed in claim 6, further comprising:

wherein the first hinge shaft and the second hinge shaft pass through slot holes that are formed in the locking member.

* * * * *